US012061476B2

(12) United States Patent
Zhou et al.

(10) Patent No.: US 12,061,476 B2
(45) Date of Patent: Aug. 13, 2024

(54) RETURNING METHOD OF SELF-MOVING DEVICE, SELF-MOVING DEVICE, STORAGE MEDIUM, AND SERVER

(71) Applicant: Positec Power Tools (Suzhou) Co., Ltd, Jiangsu (CN)

(72) Inventors: Chang Zhou, Jiangsu (CN); Yiyun Tan, Jiangsu (CN); Yong Shao, Jiangsu (CN); Fangshi Liu, Jiangsu (CN); Ka Tat Kelvin Wong, Jiangsu (CN)

(73) Assignee: Positec Power Tools (Suzhou) Co., Ltd, Suzhou (CN)

( * ) Notice: Subject to any disclaimer, the term of this patent is extended or adjusted under 35 U.S.C. 154(b) by 188 days.

(21) Appl. No.: 17/525,154

(22) Filed: Nov. 12, 2021

(65) Prior Publication Data

US 2022/0075376 A1 Mar. 10, 2022

Related U.S. Application Data

(63) Continuation of application No. 16/442,428, filed on Jun. 14, 2019, now abandoned, which is a
(Continued)

(30) Foreign Application Priority Data

Dec. 15, 2016 (CN) .......................... 201611157425.9
Jan. 18, 2017 (CN) .......................... 201710034583.3

(51) Int. Cl.
*G05D 1/00* (2024.01)
*A01K 15/02* (2006.01)

(52) U.S. Cl.
CPC ......... *G05D 1/0088* (2013.01); *A01K 15/023* (2013.01); *G05D 1/0212* (2013.01); *G05D 1/0278* (2013.01)

(58) Field of Classification Search
CPC .. A01K 15/023; A01K 15/021; A01K 11/006; A01K 11/008; A01K 29/005; G05D 1/0088; G05D 1/0212
(Continued)

(56) References Cited

U.S. PATENT DOCUMENTS 5,794,569 A * 8/1998 Titus .................... A01K 15/023
119/721
5,868,100 A * 2/1999 Marsh .................. A01K 15/023
340/573.3
(Continued)

FOREIGN PATENT DOCUMENTS

CA 2953477 A1 10/2016
CN 102929280 A 2/2013
(Continued)

OTHER PUBLICATIONS

U.S. Appl. No. 16/442,428, filed Jun. 14, 2019.

*Primary Examiner* — Timothy D Collins
*Assistant Examiner* — Maria E Graber
(74) *Attorney, Agent, or Firm* — Lee & Hayes, P.C.

(57) ABSTRACT

A returning method of a self-moving device, a self-moving device are provided. In the returning method, a self-moving device autonomously moves inside a working region based on a map. Specifically, the method includes: acquiring a current position of the self-moving device in the working region; selecting a return path to a target position according to the current position; determining a reuse status of the return path, determining, based on the reuse status of the return path, whether to reselect a return path; and enabling the self-moving device to return to the target position along the selected return path.

20 Claims, 36 Drawing Sheets

Related U.S. Application Data continuation of application No. PCT/CN2017/116684, filed on Dec. 15, 2017.

(58) Field of Classification Search
USPC .......................................................... 119/721
See application file for complete search history.

(56) References Cited

U.S. PATENT DOCUMENTS

| | | | | |
|---|---|---|---|---|
| 5,949,350 | A * | 9/1999 | Girard | A01K 15/023 340/8.1 |
| 6,043,748 | A * | 3/2000 | Touchton | A01K 15/023 340/10.5 |
| 6,067,018 | A * | 5/2000 | Skelton | A01K 27/009 119/908 |
| 6,232,916 | B1 * | 5/2001 | Grillo | G07C 9/28 119/908 |
| 6,271,757 | B1 * | 8/2001 | Touchton | A01K 15/023 119/908 |
| 6,441,778 | B1 * | 8/2002 | Durst | G06Q 10/08 701/519 |
| 7,328,671 | B2 * | 2/2008 | Kates | G01S 1/7034 119/908 |
| 8,115,642 | B2 * | 2/2012 | Thompson | A01K 15/023 340/573.3 |
| 8,761,987 | B2 | 6/2014 | Olinger et al. | |
| 8,839,744 | B1 * | 9/2014 | Bianchi | A01K 15/021 340/573.3 |
| 8,851,019 | B2 * | 10/2014 | Jesurum | A01K 15/04 119/721 |
| 8,922,363 | B2 * | 12/2014 | So | G08B 21/0269 340/539.2 |
| 8,955,462 | B1 * | 2/2015 | Golden | H04W 4/021 119/721 |
| 9,226,479 | B2 * | 1/2016 | Bianchi | A01K 11/008 |
| 9,258,982 | B1 * | 2/2016 | Golden | A01K 15/021 |
| 9,277,734 | B1 * | 3/2016 | Paradis | A01K 27/009 |
| 9,648,849 | B1 * | 5/2017 | Vivathana | A01K 27/009 |
| 9,693,536 | B1 * | 7/2017 | Dana | A01K 27/001 |
| 10,426,140 | B2 * | 10/2019 | Kelly | A01K 29/005 |
| 2004/0181896 | A1 | 9/2004 | Egawa | G05D 1/0219 15/319 |
| 2008/0276879 | A1 * | 11/2008 | Marsh | A01K 15/023 119/719 |
| 2010/0324736 | A1 | 12/2010 | Yoo | G05D 1/0234 700/259 |
| 2012/0154154 | A1 * | 6/2012 | Troxler | G08B 21/0261 340/573.3 |
| 2012/0312250 | A1 * | 12/2012 | Jesurum | A01K 15/023 119/721 |
| 2013/0008391 | A1 * | 1/2013 | Berntsen | A01K 15/023 119/721 |
| 2013/0207803 | A1 * | 8/2013 | Charych | A01K 15/023 340/539.11 |
| 2013/0211646 | A1 | 8/2013 | Yamamura et al. | |
| 2013/0214726 | A1 | 8/2013 | Teng | G05D 1/0225 320/107 |
| 2014/0020635 | A1 * | 1/2014 | Sayers | A01K 15/021 348/143 |
| 2014/0121876 | A1 | 5/2014 | Chen et al. | |
| 2015/0040840 | A1 * | 2/2015 | Muetzel | A01K 11/008 342/450 |
| 2016/0227704 | A1 | 8/2016 | Yamamura | |
| 2017/0168501 | A1 | 6/2017 | Ogura | G05D 1/0038 |
| 2017/0193434 | A1 | 7/2017 | Shah | G06K 9/00664 |
| 2019/0146513 | A1 | 5/2019 | Tomita | G05D 1/0278 701/50 |
| 2019/0281794 | A1 * | 9/2019 | Ehrman | A01K 27/009 |
| 2022/0312730 | A1 * | 10/2022 | Templeton | G01S 19/26 |

FOREIGN PATENT DOCUMENTS

| | | | |
|---|---|---|---|
| CN | 102929280 A | * | 2/2013 |
| CN | 103324191 A | | 9/2013 |
| CN | 103324191 A | * | 9/2013 |
| CN | 105094126 | | 11/2015 |
| CN | 105511456 A | | 4/2016 |
| CN | 105511456 A | * | 4/2016 |
| EP | 1412828 A1 | | 4/2004 |
| EP | 3084541 A0 | | 10/2016 |
| EP | 3171133 A1 | | 5/2017 |
| EP | 3171133 A1 | * | 5/2017 |
| EP | 3084541 B1 | * | 5/2019 |
| EP | 4029372 A1 | * | 7/2022 |
| JP | 2009025974 A | * | 2/2009 |
| JP | 2009025974 A | | 2/2009 |
| WO | 201509454 A1 | | 6/2015 |
| WO | WO-2015094054 A1 | * | 6/2015 |

* cited by examiner

RETURNING METHOD OF SELF-MOVING DEVICE, SELF-MOVING DEVICE, STORAGE MEDIUM, AND SERVER

CROSS-REFERENCE TO RELATED APPLICATIONS

This application is a continuation of U.S. application Ser. No. 16/442,428, filed Jun. 14, 2019, which is a continuation of PCT International Application No. PCT/CN2017/116684 filed on Dec. 15, 2017, which claims priority to Chinese Patent Application Nos. 201611157425.9, filed on Dec. 15, 2016, and 201710034583.3, filed on Jan. 18, 2017, all of which are incorporated by reference in their entirety herein.

BACKGROUND

Technical Field

The present invention relates to the field of robot technologies, and specifically, to a returning method of a self-moving device, a self-moving device, a memory, and a server.

Related Art

With rapid development of big data, cloud computing, and artificial intelligence, autonomous robots gradually enter and play an increasingly important role in various fields of people's life.

As a robot, an autonomous lawn mower can implement automatic grass cutting and bring great convenience to people's life. For a conventional autonomous lawn mower system, to prevent the autonomous lawn mower from moving beyond a boundary of a working region, a boundary line may be set around the working region and electrified, so that the autonomous lawn mower may determine the boundary. When needing to return to a charging station to be recharged, the autonomous lawn mower first locates the boundary line. After finding the boundary line, the autonomous lawn mower moves along the boundary line to return to the charging station. The robot is controlled to move over the boundary line, so that the machine can be approximately aligned with the charging station to implement precise docking.

An automatic working system such as an autonomous lawn mower system can automatically complete a lawn maintenance task or the like, and becomes increasingly popular among users. In the automatic working system, a self-moving device such as an autonomous lawn mower is restricted to a working region. In the prior art, a mobile station generates a map of a working region. Next, the mobile station navigates the self-moving device according to the working region defined by the map.

In this manner, after a base station moves, position coordinates output by the mobile station have an offset, and the map of the working region needs to be regenerated, resulting in relatively complex steps.

With development of electronic information technologies, electronic pet collars are applied increasingly widely. Particularly, virtual electronic pet collars for which boundary leads do not need to be arranged are highly popular among people. However, during positioning of a conventional virtual electronic pet collar, precision of satellite positioning can reach only approximately 10 meters under the influence of factors such as an atmospheric error, a satellite clock error, a satellite ephemeris error, and a multipath effect caused by blockage by an obstacle such as a tall building. Therefore, the conventional virtual electronic pet collar has technical problems of easy susceptibility to interference and low positioning precision. As a result, a pet may get lost, and it is difficult to keep the pet safe.

SUMMARY

In view of this, embodiments of the present invention provide a returning method of a self-moving device, a self-moving device, a storage medium, and a server. For the self-moving device, the self-moving device inside a working region may reliably return to a target position.

An aspect of the present invention provides a returning method of a self-moving device, a self-moving device autonomously moving inside a working region based on a map, and the returning method includes: acquiring a current position of the self-moving device in the working region; selecting a return path to a target position according to the current position; determining a reuse status of the return path, determining, based on the reuse status of the return path, whether to reselect a return path; and enabling the self-moving device to return to the target position along the selected return path.

In an embodiment, the determining a reuse status of the return path includes: determining a reuse length and/or reuse frequency of the return path, and if the reuse length and/or reuse frequency of the return path exceeds a preset threshold, determining to reselect a return path.

In an embodiment, the currently selected return path is taken as a first return path, and when the reuse length and/or reuse frequency is greater than a preset first threshold, a second return path that does not coincide with the first return path is selected as the return path.

In an embodiment, the currently selected return path is taken as a first return path, and when the reuse length and/or reuse frequency is greater than a preset second threshold, a second return path that does not intersect with the first return path is selected as the return path.

In an embodiment, the determining a reuse length and/or reuse frequency of the return path includes: storing use information of at least a part of the return path, and determining the reuse length and/or reuse frequency of the return path according to the information.

In an embodiment, the selecting a return path to a target position according to the current position includes: computing an optimal path between the current position and the target position, and using the optimal path as the return path.

In an embodiment, the computing an optimal path between the current position and the target position includes: computing a shortest path between the current position and the target position.

In an embodiment, the returning method further includes: presetting several preset return paths; and the selecting a return path to a target position according to the current position includes: selecting one of the several preset return paths as the return path.

In an embodiment, after the acquiring a current position of the self-moving device in the working region, the method further includes: computing an optimal path between the current position and the preset return path; and the enabling the self-moving device to return to the target position along the selected return path includes: enabling the self-moving device to move to the preset return path along the optimal path.

In an embodiment, the preset return paths include a plurality of closed patterns inside the working region and a straight line connecting the plurality of closed patterns and the target position; and the enabling the self-moving device to return to the target position along the selected return path includes: enabling the self-moving device to move in a current movement direction or any direction, and when the self-moving device comes into contact with one of the plurality of closed patterns, enabling the self-moving device to move to the straight line along a border of the one of the plurality of closed patterns and return to the target position along the straight line.

In an embodiment, the plurality of closed patterns is a plurality of closed rings.

In an embodiment, the returning method further includes: presetting a virtual boundary line of the working region; and the selecting a return path to a target position according to the current position includes: selecting a path along the virtual boundary line or near the virtual boundary line as the return path.

In an embodiment, after the enabling the self-moving device to return to the target position along the selected return path, the method further includes: enabling the self-moving device to be docked to a charging pile for charging.

In an embodiment, the enabling the self-moving device to be docked to a charging pile for charging includes:

enabling the self-moving device to adjust an attitude at the target position to dock a charging part of the self-moving device to the charging pile for charging.

In an embodiment, the enabling the self-moving device to be docked to a charging pile for charging includes: enabling the self-moving device to reverse from the charging pile by a preset distance at the target position and completing adjustment of an attitude within the preset distance, and enabling the self-moving device to move to the charging pile with the attitude to be docked to the charging pile for charging.

In an embodiment, before the self-moving device starts to work, the self-moving device is enabled to record the target position and the attitude.

Another aspect of the present invention provides a self-moving device, including an acquisition module and a control module, where the acquisition module is configured to acquire a current position of the self-moving device in a working region; and the control module is configured to: select a return path to a target position according to the current position; determine a reuse status of the return path, determine, based on the reuse status of the return path, whether to reselect a return path; and control the self-moving device to return to the target position along the selected return path.

In an embodiment, the control module includes a first calculation unit and a control unit, where the first calculation unit is configured to calculate a reuse length and/or reuse frequency of a first return path, and if the reuse length and/or reuse frequency of the return path exceeds a preset threshold, the control unit determines to reselect a return path.

In an embodiment, the control unit takes the currently selected return path as a first return path, and when the reuse length and/or reuse frequency is greater than a preset first threshold, the control unit selects a second return path that does not coincide with the first return path as the return path.

In an embodiment, the control module further includes a first storage unit, where the first storage unit is configured to store use information of at least a part of the return path, and the first calculation unit is further configured to determine the reuse length and/or reuse frequency of the return path according to the information.

In an embodiment, the control module further includes a first computation unit and a control unit, where the first computation unit is configured to compute an optimal path between the current position and the target position, and the control unit controls to select the optimal path as the return path.

In an embodiment, the control module further includes a first preset unit and a control unit, where the first preset unit is configured to preset several preset return paths, and the control unit is configured to select one of the several preset return paths as the return path.

In an embodiment, the control module further includes a second computation unit, where the second computation unit is configured to compute an optimal path between the current position and the return path, so that the control unit controls the self-moving device to move to the return path along the optimal path.

In an embodiment, the first preset unit is further configured to preset a virtual boundary line of the working region, and the control unit controls the self-moving device to return to the target position along a path along the virtual boundary line or near the virtual boundary line.

In an embodiment, the control module further includes an attitude determining unit and an adjustment unit, where the attitude determining unit is configured to: when the self-moving device moves to the target position, determine an attitude of the self-moving device, and the attitude adjustment unit is configured to adjust the attitude of the self-moving device to enable the self-moving device to be docked to a charging pile for charging.

In an embodiment, the control module further includes a second preset unit and a comparison unit, where the second preset unit is configured to set a standard distance/relative position with respect to the charging pile and a charging attitude of the self-moving device, and the comparison unit is configured to: compare a current attitude of the self-moving device with the charging attitude, and adjust the attitude of the self-moving device to the charging attitude.

Still another aspect of the present invention provides a storage medium, storing a computer readable instruction, where when being invoked, the computer readable instruction performs the foregoing method.

Yet another aspect of the present invention provides a server, including a memory and a processor, where the memory stores a computer readable instruction, and the processor is configured to invoke the computer readable instruction to perform the foregoing method.

For the returning method of a self-moving device, the self-moving device, the memory, and the server provided in the embodiments of the present invention, a return path of the self-moving device is selected to enable the self-moving device to reliably return to a target position.

The embodiments of the present invention further provide an automatic working system, including: a self-moving device, moving and working within a working region defined on a map; a navigation module, configured to: record position coordinates of the working region, and generate a map of the working region, where the navigation module includes an offset calibration apparatus configured to assist in positioning.

In one embodiment, the offset calibration apparatus includes a laser beam emitter configured to: emit a laser beam, and form a light dot on the ground.

In one embodiment, a preset position is preset, and it is determined whether the light dot of the laser beam on the ground is at the preset position to determine whether the position coordinates recorded by the navigation module is accurate to assist in positioning.

In one embodiment, the offset calibration apparatus further includes an attitude detection module and a laser ranging module configured to correct an error caused by a tilt of the navigation module.

In one embodiment, the attitude detection module obtains a tilt angle α and a tilt angle β of the navigation module in two different directions, and the laser ranging module is configured to measure a distance L from the light dot of the laser beam on the ground.

In one embodiment, the offset calibration apparatus obtains, according to the tilt angle α and the tilt angle β that are obtained by the attitude detection module and the distance L obtained by the laser ranging module, corresponding offset correction values ΔX and ΔY to correct an error caused by a tilt of the navigation module, and the offset correction values are computed by using the following formulas: $\Delta X = L \cdot \sin\alpha$, and $\Delta Y = L \cdot \sin\beta$.

The embodiments of the present invention further provide an automatic working system, including: a self-moving device, moving and working within a working region defined on a map; and a navigation module, configured to: record position coordinates of the working region, and generate a map of the working region, where the navigation module includes a mobile station and at least two base stations that can communicate with the mobile station, and the mobile station may select one of the at least two base stations to perform communication to transmit a differential message.

In one embodiment, the at least two base stations communicate with the mobile station via a same channel to transmit the differential message.

In one embodiment, the at least two base stations include one primary base station and at least one backup base station, when the primary base station is faultless, the primary base station communicates with the mobile station via the channel, and when the primary base station is faulty, the backup base station communicates with the mobile station via the channel.

In one embodiment, the at least two base stations communicate with the mobile station via different channels to transmit the differential message.

In one embodiment, the at least two base stations include a first base station and a second base station, a first channel for communication with the first base station and a second channel for communication with the second base station are preset on the mobile station, when the first channel can receive the differential message, the mobile station communicates with the first base station via the first channel and, and when the first channel cannot receive the differential message, the mobile station switches to the second channel to communicate with the second base station.

The embodiments of the present invention further provide a differential global positioning system (DGPS), including a base station and at least one mobile station, where the base station includes a code module configured to provide a code for the mobile station, the base station establishes communication with the mobile station according to the code and transmits differential calibration data to the mobile station, and the base station can establish communication with a plurality of mobile stations.

In one embodiment, the base station includes a base communications station configured to store and send the differential calibration data, the base communications station includes a data service hotspot preset with an access password, and the mobile station needs to have the access password to access the base communications station and obtain the differential calibration data.

In one embodiment, the differential calibration data is enciphered according to a rule, and the mobile station needs to know the rule to obtain the differential calibration data.

The embodiments of the present invention are to resolve one of the technical problems in related technologies to at least an extent.

In view of this, the embodiments of present invention provide a position information processing method based on a differential positioning technology, so that a mobile station does not need to repeat a process of moving along a boundary of a working region to generate a map when a position of a base station changes, so that operation steps are simplified, thereby resolving a technical problem in the prior art that after the base station moves, position coordinates output by the mobile station have an offset, and the map of the working region needs to be regenerated, resulting in relatively complex steps.

The embodiments of the present invention provide a mobile station applicable to a navigation module.

The embodiments of the present invention provide another mobile station applicable to a navigation module.

The embodiments of the present invention provide a computer readable storage medium.

The embodiments of the present invention provide a computer program product.

To achieve the foregoing objective, according to a first aspect of the present invention, an embodiment provides a position information processing method based on a differential positioning technology, applicable to a navigation module, where the navigation module includes a base station, and a mobile station for resolving a relative position with respect to the base station according to differential information sent by the base station, and including:

before an absolute position of the base station changes, acquiring, by the mobile station, a first relative position with respect to the base station;

before and after the absolute position of the base station changes, keeping the mobile station at a same absolute position;

after the absolute position of the base station changes, acquiring, by the mobile station, a second relative position with respect to the base station; and updating a map of a working region of the mobile station according to the first relative position and the second relative position, or, instructing the base station to update a stored absolute position of the base station, where points on the map are used to indicate relative positions with respect to the base station.

In the position information processing method based on a differential positioning technology in this embodiment of the present invention, before an absolute position of a base station changes, a mobile station acquires a first relative position with respect to the base station, Next, before and after the absolute position of the base station changes, the mobile station is kept at a same absolute position, and after the absolute position of the base station changes, the mobile station acquires a second relative position with respect to the base station, so that the mobile station may update a map of a working region of the mobile station according to the first relative position and the second relative position, or, instruct the base station to update a stored absolute position of the base station, where points on the map are used to indicate relative positions with respect to the base station. Accordingly, a mobile station does not need to repeat a process of moving along a boundary of the working region to generate a map when a position of the base station changes, so that operation steps are simplified, thereby resolving a technical problem in the prior art that after the base station moves, position coordinates output by the mobile station have an offset, and the map of the working region needs to be regenerated, resulting in relatively complex steps.

To achieve the foregoing objective, according to a second aspect of the present invention, an embodiment provides a mobile station applicable to a navigation module, the navigation module being based on a differential positioning technology and including a base station and the mobile station for resolving a relative position with respect to the base station according to differential information sent by the base station, the mobile station including:

a resolution module, configured to: before an absolute position of the base station changes, acquire a first relative position with respect to the base station; and after the absolute position of the base station changes, acquire a second relative position with respect to the base station;

a control module, configured to: before and after the absolute position of the base station changes, keep the mobile station at a same absolute position; and an update module, configured to update a map of a working region of the mobile station according to the first relative position and the second relative position, or, instruct the base station to update a stored absolute position of the base station, where points on the map are used to indicate relative positions with respect to the base station.

For the mobile station applicable to a navigation module in this embodiment of the present invention, before an absolute position of a base station changes, the mobile station acquires a first relative position with respect to the base station. Next, before and after the absolute position of the base station changes, the mobile station is kept at a same absolute position, and after the absolute position of the base station changes, the mobile station acquires a second relative position with respect to the base station, so that the mobile station may update a map of a working region of the mobile station according to the first relative position and the second relative position, or, instruct the base station to update a stored absolute position of the base station, where points on the map are used to indicate relative positions with respect to the base station. Accordingly, the mobile station does not need to repeat a process of moving along a boundary of the working region to generate a map when a position of the base station changes, so that operation steps are simplified, thereby resolving a technical problem in the prior art that after the base station moves, position coordinates output by the mobile station have an offset, and the map of the working region needs to be regenerated, resulting in relatively complex steps.

To achieve the foregoing objective, according to a third aspect of the present invention, an embodiment provides another mobile station applicable to a navigation module, the navigation module being based on a differential positioning technology, and including a base station and the mobile station for resolving a relative position with respect to the base station according to differential information sent by the base station, and the mobile station including: a memory, a processor, and a computer program that is stored in the memory and may run on the processor, where when executing the program, the processor performs the position information processing method based on a differential positioning technology in the embodiment of the first aspect of the present invention.

To achieve the foregoing objective, according to a fourth aspect of the present invention, an embodiment provides a computer readable storage medium, storing a computer program, where when being executed by a processor, the program performs the position information processing method based on a differential positioning technology in the embodiment of the first aspect of the present invention.

To achieve the foregoing objective, according to a fifth aspect of the present invention, an embodiment provides a computer program product, where when being executed by a processor, an instruction in the computer program product performs the position information processing method based on a differential positioning technology in the embodiment of the first aspect of the present invention.

Some additional aspects and advantages of the embodiments of the present invention will be described partially below, and some will be obvious from the following descriptions or understood through the practice of the present invention.

The embodiments of the present invention provide a pet collar system and a pet collar control method to solve the problem that a conventional electronic pet collar is easily susceptible to interference and has low positioning precision.

A pet collar system includes: a base station, a collar body, and a training apparatus disposed on the collar body, where the base station stores base station coordinate information, the base station receives base station positioning data observed by a satellite positioning system, the base station computes a differential observation value according to the base station coordinate information and the base station positioning data, obtains a positioning error correction value, and sends the positioning error correction value to the training apparatus, and the training apparatus includes a mobile satellite antenna, a base station radio antenna, a microprocessor, and an alarm, where the mobile satellite antenna is configured to: receive collar positioning data observed by the satellite positioning system, and send the received collar positioning data to the microprocessor;

the base station radio antenna is configured to receive the positioning error correction value sent by the base station, and send the received positioning error correction value to the microprocessor;

the microprocessor stores a pet movement boundary region in advance, and a pet is restricted to the pet movement boundary region; the microprocessor performs positioning correction processing according to the collar positioning data and the positioning error correction value, determines whether a distance between the pet and the pet movement boundary region is less than or equal to a preset distance threshold, and when the distance between the pet and the pet movement boundary region is less than or equal to the preset distance threshold, sends an alarm signal to the alarm; and the alarm is configured to output alarm information according to the alarm signal.

In one of the embodiments, the microprocessor includes:

a storage unit, configured to store the pet movement boundary region;

a positioning correction unit, configured to perform positioning correction processing according to the collar positioning data and the positioning error correction value, to obtain current pet position coordinate information;

a position determining unit, configured to: compute the distance between the pet and the pet movement boundary region according to the current pet position coordinate information, and determine whether the distance between the pet and the pet movement boundary region is less than or equal to the preset distance threshold; and an alarm unit, configured to: when the distance between the pet and the pet movement boundary region is less than or equal to the preset distance threshold, output an alarm signal to the alarm.

In one of the embodiments, the pet collar further includes an acceleration sensor, the acceleration sensor is disposed on the collar body, the acceleration sensor is connected to the microprocessor, and the acceleration sensor is configured to: acquire pet movement acceleration, and send the acquired pet movement acceleration to the microprocessor.

The microprocessor further includes a power management unit, where the power management unit is configured to: receive the pet movement acceleration, and compare the pet movement acceleration with a prestored acceleration threshold, so that when the pet movement acceleration is less than or equal to the acceleration threshold, a sleep mode is started to enable the microprocessor to enter a sleep state, and when the pet movement acceleration is greater than the acceleration threshold, the microprocessor wakes up to work.

In one of the embodiments, the pet collar further includes a terminal communications module, the microprocessor exchanges information with a remote terminal by using the terminal communications module, and the remote terminal includes one or more of a mobile phone, a tablet or a computer.

In one of the embodiments, the pet movement boundary region is drawn in map software on the mobile phone, tablet or computer.

In one of the embodiments, the base station is a base station of an autonomous lawn mower, and the boundary region is a map boundary region learned by the autonomous lawn mower.

A pet collar control method is used to restrict a pet to a pet movement boundary region, and includes the following steps:

receiving collar positioning data observed by a satellite positioning system, and receiving a positioning error correction value sent by a base station;

performing positioning correction processing according to the collar positioning data and the positioning error correction value, to obtain current pet position coordinate information;

computing a distance between the pet and a preset pet movement boundary region according to the current pet position coordinate information, and determining whether the distance between the pet and the preset pet movement boundary region is less than or equal to a preset distance threshold; and when the distance between the pet and the pet movement boundary region is less than or equal to the preset distance threshold, outputting an alarm signal.

In one of the embodiments, before the step of receiving collar positioning data observed by the satellite positioning system, and receiving a positioning error correction value sent by the base station, the method includes the following steps:

receiving, by the base station, base station positioning data observed by the satellite positioning system, computing a differential observation value according to the base station positioning data and prestored base station coordinate information, and obtaining the positioning error correction value.

In one of the embodiments, the pet collar control method further includes the following steps:

detecting pet movement acceleration, and comparing the pet movement acceleration with a prestored acceleration threshold, so that when the pet movement acceleration is less than or equal to the acceleration threshold, a sleep mode is started to enable a microprocessor to enter a sleep state, and when the pet movement acceleration is greater than the acceleration threshold, the microprocessor wakes up to work.

In one of the embodiments, before the step of receiving collar positioning data observed by the satellite positioning system, and receiving a positioning error correction value sent by the base station, the method includes the following step:

receiving a pet movement boundary region sent by a remote terminal for storage, where the remote terminal includes one or more of a mobile phone, a tablet or a computer.

In one of the embodiments, the boundary region is a map boundary region learned by an autonomous lawn mower.

In one of the embodiments, a pet collar establishes a communication connection with the remote terminal via a network, and the pet collar control method further includes the following steps:

sending, by the pet collar, the current pet position coordinate information to the remote terminal in real time, and when the distance between the pet and the pet movement boundary region is less than or equal to the preset distance threshold, sending, by the pet collar, an alarm signal to the remote terminal; and receiving, by the remote terminal, the current pet position coordinate information and the alarm signal, and outputting, by the remote terminal, a control instruction to the pet collar according to the current pet position coordinate information or the alarm signal.

The pet collar system and pet collar control method are used to form a virtual pet fence around a pet movement boundary region to restrict a pet to the pet movement boundary region, so as to prevent the pet from getting lost. For the pet collar system and pet collar control method, positioning correction processing is performed according to collar positioning data observed by a satellite positioning system and a positioning error correction value sent by a base station, and it is determined whether a distance between the pet and a prestored pet movement boundary region is less than or equal to a preset distance threshold, and when the distance between the pet and the pet movement boundary region is less than or equal to the preset distance threshold, a microprocessor outputs an alarm signal to an alarm, and the alarm outputs alarm information to prevent the pet from moving beyond a preset movement boundary region, so as to prevent the pet from getting lost. For the pet collar system and pet collar control method, the satellite positioning system is used to locate the pet, and it is not necessary to arrange a boundary line, so that implementation operations are simple and convenient. Moreover, for the pet collar system and pet collar control method, correction processing is performed on a positioning result according to the positioning error correction value computed by the base station by using a differential observation value, so as to eliminate the impact of various interference factors on a positioning progress, so that positioning with centimeter precision can be achieved, the pet is precisely located, and positioning precision is high.

DETAILED DESCRIPTION

Figure 1:
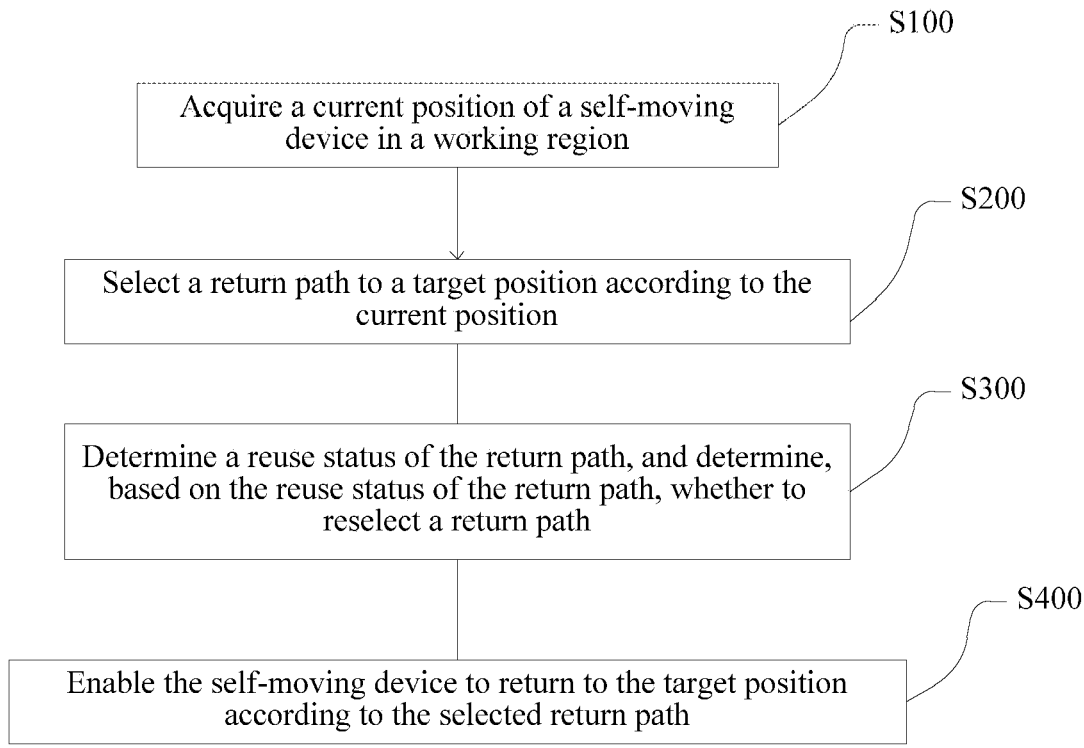
FIG. 1 is a flowchart of a returning method of a self-moving device according to an embodiment of the present invention.

The following clearly and completely describes the technical solutions in the embodiments of the present invention with reference to the accompanying drawings in the embodiments of the present invention. Apparently, the described embodiments are merely some of the embodiments of the present invention rather than all of the embodiments. All other embodiments obtained by a person of ordinary skill in the art based on the embodiments of the present invention without creative efforts shall fall within the protection scope of the present invention.

In a satellite navigation technology, a navigation signal is sent to a robot, and the robot may acquire position information of the robot in real time according to the navigation signal, so that the robot may determine, according to the position information, whether the robot is located inside a working region. Specifically, for example, a global positioning system (GPS) mobile station may be disposed on the robot and may receive a satellite positioning signal. To further improve positioning precision, a fixed GPS base station may be installed around the working region to provide a positioning correction signal. For example, a GPS base station disposed outside the working region may receive the satellite positioning signal, generate the positioning correction signal according to the satellite positioning signal, and send the positioning correction signal to the GPS mobile station disposed on the robot, so that the robot can be located more accurately.

Specifically, the DGPS technology in this embodiment is a real-time kinematic (RTK) technology, that is, a carrier-phase differential technology. The mobile station performs computation by using a carrier-phase algorithm. The DGPS technology may be alternatively a continuously operating satellite reference station (CORS) technology.

In addition, to enable the robot to reliably work in the working region, the robot needs to generally learn about a map of the working region. For example, the robot may acquire the map of the working region by using several methods in the following. First, a user may define the working region on a map directly loaded in the system of the robot. For example, the map may be Baidu Map or Google Map. Second, if the GPS mobile station and the robot have an integrated structure, the robot may walk one lap around the working region to acquire the map. Specifically, for example, the user may push the machine to walk inside the working region, or the user may use a remote control to control the machine to walk, or the robot may follow the user, or a boundary sensor configured to detect the working region may be configured on the machine. In addition, the GPS mobile station may be disposed separately from the machine, so that the user may separately carry the GPS mobile station to walk one lap around the working region.

It should be noted that the map of the working region may further include coordinates of a pool, a bush or other feature information inside the working region in addition to coordinates of a boundary. In this way, the machine may work deliberately according to the acquired map of the working region. For example, the work may be weeding, ploughing, fertilization, and the like. However, the working type of the machine in the working region is not limited in the present invention.

An embodiment of the present invention provides a returning method of a self-moving device. A self-moving device autonomously moves inside a working region based on a map. Referring to FIG. 1, the method includes: S100, acquiring a current position of the self-moving device in the working region; S200, selecting a return path to a target position according to the current position; S300, determining a reuse status of the return path, and determining, based on the reuse status of the return path, whether to reselect a return path; and S400, enabling the self-moving device to return to the target position along the return path. In the returning method of a self-moving device in this embodiment, a return path is deliberately selected according to a current position and a target position to enable a self-moving device to reliably return to the target position. It is determined, according to a reuse status of a return path, whether to reselect a return path, so as to prevent a robot from repeatedly moving along a same segment of path to crush a lawn, thereby ensuring the beauty of the lawn.

In this embodiment, the robot records several previous return paths. The reuse status of the return path includes whether there is a repetition between the return path and one previous return path or several previous return paths, and includes a reuse length or a reuse frequency.

As discussed above, the self-moving device may be located by using satellite navigation to acquire coordinates of the self-moving device in the working region, and a passable return path is selected by combining coordinates of the target position and the map of the working region. For example, the foregoing self-moving device may be a lawn mower that moves by using wheels or continuous tracks. For example, the return path should avoid a pool, a bush, an obstacle, and the like. That is, it needs to be ensured that the machine can pass instead of getting stuck, falling, colliding or the like during movement.

Figure 2:
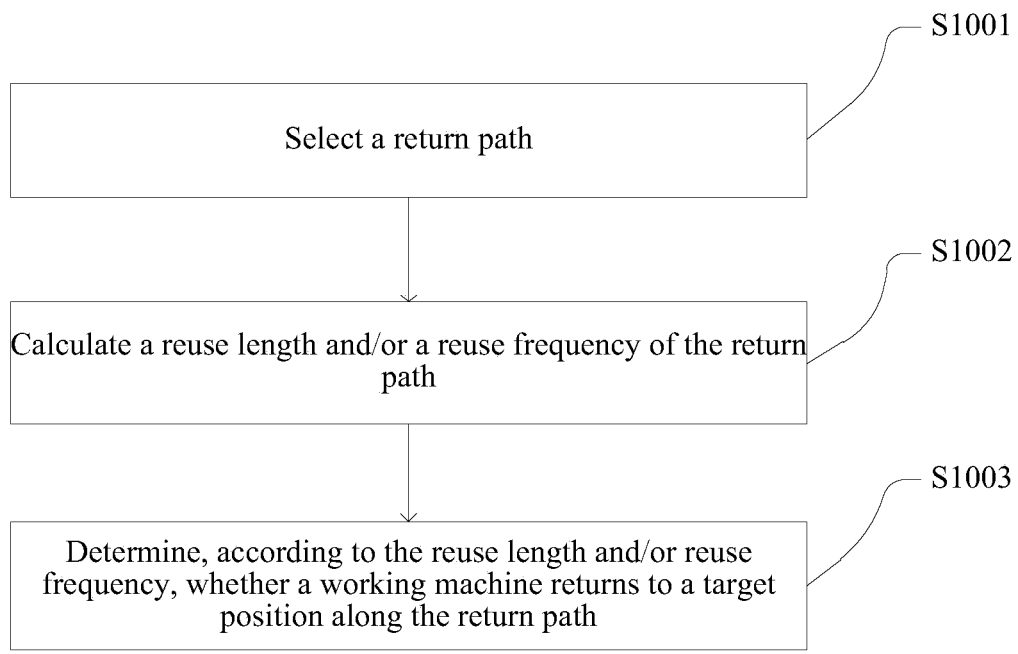
FIG. 2 is a flowchart of selecting a return path according to an embodiment of the present invention.

In an embodiment, referring to FIG. 2, the determining a reuse status of the return path, and determining, based on the reuse status of the return path, whether to reselect a return path includes: S1001, taking the currently selected return path as a first return path, S1002, calculating a reuse length and/or a reuse frequency of the first return path, and S1003, determining, according to the reuse length and/or reuse frequency, whether the self-moving device returns to the target position along the first return path. For example, when the working region is a lawn and the lawn mower needs to return to the target position for charging, if a same path is taken every time, grass of the lawn on the path may be crushed and the lawn may have a damaged appearance. When the lawn mower returns to the target position along a different path each time, some regions on the lawn may be prevented from excessive damage.

For example, when the reuse length is greater than ⅓ of a total length of the first return path or a use quantity in one day is greater than or equal to 2, a second return path that does not coincide with the first return path may be selected as the return path. It needs to be pointed out that the second return path may be completely different or partially different from the first return path. For example, when a grass-free area is kept on the lawn, the first return path and the second return path may share a part in the grass-free area, and are different for the remaining part. For example, if the machine returns to the target position frequently or a relatively large quantity of obstacles exist in the working region, it is very unlikely that the second return path and the first return path have no intersection. In this case, the second return path may partially intersect or partially coincide with the first return path. When paths taken by the machine to return to the target position do not coincide or do not intersect and partially intersect or partially coincide, a position in the working region may be prevented from excessive damage. Moreover, it becomes convenient for the machine to move in the working region, thereby improving autonomous experience of the machine.

In an embodiment, use information of at least a part of the first return path may be recorded, and the reuse length and reuse frequency of the first return path may be determined according to the information. Generally, for example, when the map of the working region includes a virtual grid, the machine may compute the first return path according to the current position and the target position. That is, if both the current position and the target position are determined, the machine may first compute the fixed first return path. After returning to the target position along the first return path, the machine may record the first return path once, so that the record may be used as a reference for determining whether to select the first return path. In this embodiment, information related to a return path is recorded, so that the reuse status of the return path can be conveniently determined to provide a basis for subsequent path selection.

Figure 3:
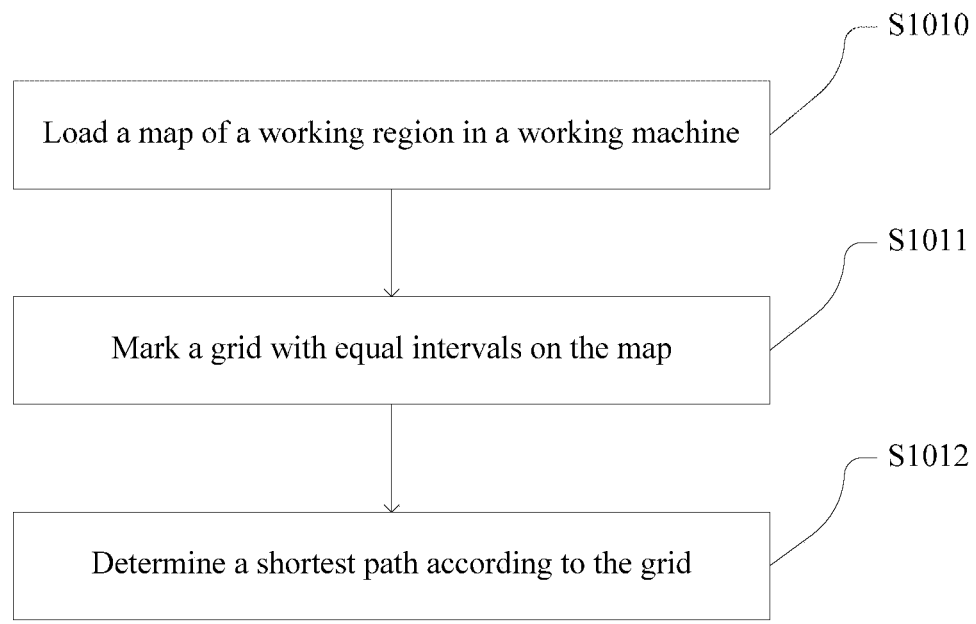
FIG. 3 is a flowchart of determining an optimal path according to an embodiment of the present invention.

In an embodiment, the selecting a return path to a target position according to the current position includes: determining an optimal path between the current position and the target position, and using the optimal path as the return path. Referring to FIG. 3, for example, the determining an optimal path between the current position and the target position may include: S1010, loading the map of the working region in the self-moving device; S1011, marking a grid with equal intervals on the map; and S1012, determining a shortest path according to the grid. Alternatively, the loaded map may be directly a raster map. In this case, step S1011 is omitted. The determining an optimal path between the current position and the target position includes: computing the shortest path between the current position and the target position. For example, the return path of the self-moving device is a straight line. The determining a shortest path according to the grid includes: selecting a path of a straight line or a polygonal line that covers the fewest raster cells between the current position and the target position.

A distance, a level of walking difficulty, and the like need to be comprehensively considered for the optimal path. The level of walking difficulty includes a quantity of slopes on a path, a quantity of obstacles on a path, a quantity of times that the machine needs to adjust an attitude, and the like.

It should be noted that the foregoing straight line or polygonal line needs to avoid an obstacle, a pool, and the like in the working region. And it can be a straight line or multiple polygonal line. The principle is that the sum of the distance of the straight line or multiple polygonal line between the current position and the target position is relatively short. For example, the return path between the current position and the target position may be alternatively a combination of at least two of a straight line, a polygonal line or a curved line.

During the computation of the shortest path, when there is a passage between the robot and the target position, there is an overlap at a part of path from the passage to the target position. When the solution in this embodiment is used, path repetition can be effectively avoided, thereby preventing the lawn from being crushed.

In an embodiment, the returning method further includes: presetting several preset return paths; enabling the self-moving device to return to the target position along one of the preset return paths. That is, one or more return paths may be set inside the working region, so that when needing to return to the target position, the machine may return to the target position along one of the paths.

Figure 4A:
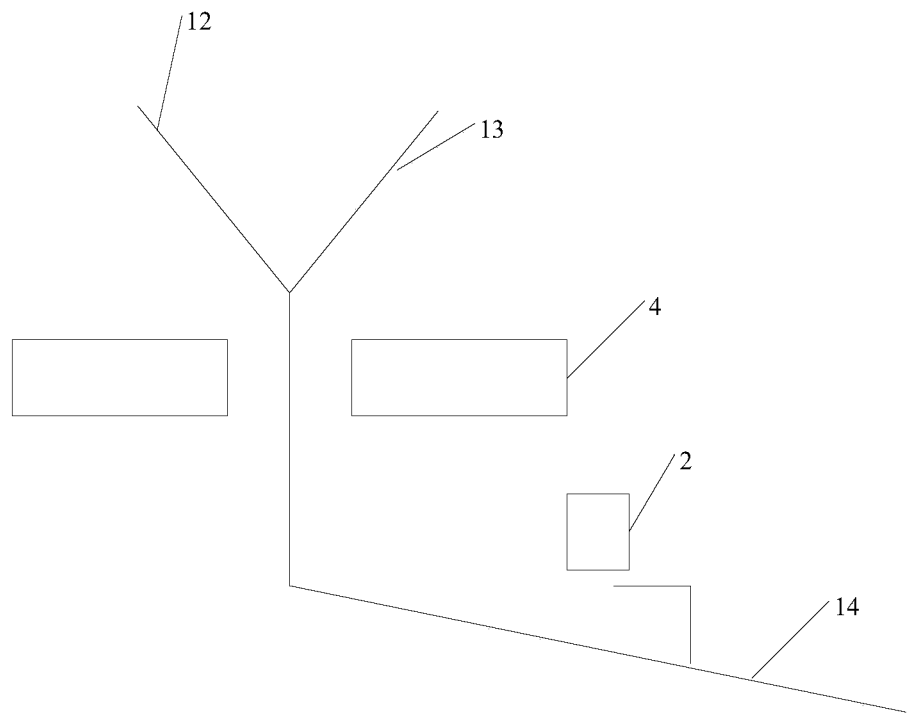
FIG. 4a and FIG. 4b are schematic diagrams of a preset return path according to an embodiment of the present invention.
Figure 4B:
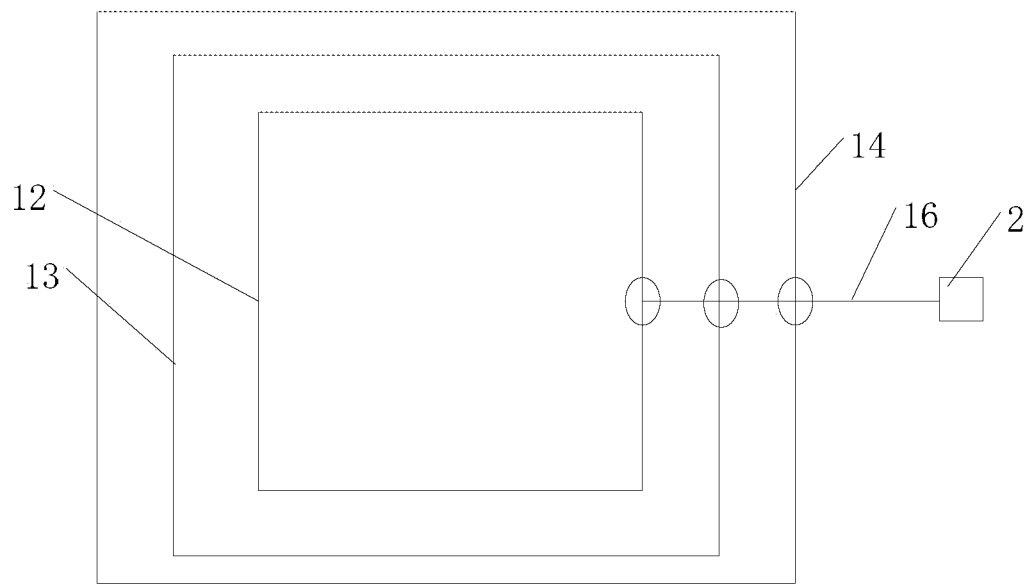

In this embodiment, for example, the machine may acquire position coordinates of the machine in the working region, and compute a shortest distance from the preset return path according to the position coordinates, so that the machine may rapidly reach the preset return path via the shortest distance. Referring to FIG. 4a, for example, the preset return paths may be a plurality of paths 12, 13, and 14 inside the working region. These paths may share a part of path (for example, there is no lawn on the shared part of path, and therefore, the self-moving device may walk on the path repeatedly), so that when working inside the working region, the self-moving device may autonomously compute optimal moving solutions to the plurality of preset paths. Moreover, after reaching a preset path, the self-moving device moves to a target position 2 along a preset path. For example, a part of the preset path in an obstacle 4 inside the working region is a shared path. Referring to FIG. 4b, for example, the preset paths may be a plurality of closed return paths 12, 13, and 14 set inside the working region. For example, the plurality of return paths may be a group of a plurality of circular rings or rectangular rings (a group of rectangles are provided in FIG. 4). These circular rings or rectangular rings 12, 13, and 14 may be connected by a straight line 16 near the target position, so that when moving to an intersection with the straight line along a circular ring or rectangular ring, the machine adjusts the attitude and further moves to the target position 2 along the straight line 16. For example, the return path 14 on the outermost side may be close to a boundary line of the working region. For example, the return path 14 located on the outermost side may directly pass through the target position 2, so that when needing to return to the target position, the machine may continue to move in a current movement direction of the machine. When reaching the preset return path, the machine returns to the target position along the preset path. In this embodiment, a return path is preset, so that the machine can return to the target position more easily, and the machine is prevented from colliding with an obstacle, tipping over or the like during a return.

In an embodiment, the returning method further includes: presetting a virtual boundary line of the working region; and selecting a path along the virtual boundary line or near the virtual boundary line as the return path. The boundary line may be marked on the foregoing map, so that the machine can return to the target position along a path along the boundary line or near the boundary line. The virtual boundary line is set, and the machine is enabled to return along the virtual boundary line, so that a lawn inside the working region can be prevented from damage, thereby improving user experience of the self-moving device.

It may be understood that when the machine returns along a preset return path or along a path along/near the virtual boundary line, a reuse status of a path may be not considered, or a reuse status of a path may be considered and path switching is performed.

In some embodiments, after the enabling the self-moving device to return to the target position along the return path, the method further includes: enabling the self-moving device to be docked to a charging pile for charging. For example, the enabling the self-moving device to be docked to a charging pile for charging includes: enabling the self-moving device to adjust an attitude at the target position to dock a charging part of the self-moving device to the charging pile for charging.

In some scenarios, for example, when a distance between the target position and the charging pile is excessively small, it is very difficult to directly dock the machine to the charging pile at the target position. In this case, the self-moving device may be first enabled to reverse from the charging pile by a preset distance at the target position, adjustment of the attitude is completed within the preset distance, and the self-moving device is enabled to move to the charging pile with the attitude to be docked to the charging pile for charging. In this embodiment, in the charging step, the self-moving device reaches a fixed position before the charging pile, reverses and adjusts the attitude, and advances to perform docking, so that the machine can be automatically charged conveniently and autonomous experience is improved for a user.

In addition, the enabling the self-moving device to be docked to a charging pile for charging further includes: enabling the self-moving device to record the preset distance and the attitude, so that the self-moving device may reach the preset distance from the charging pile and may be docked to the charging pile with the attitude for charging. That is, the machine autonomously records a position, the attitude, and a process by using which the machine can be successfully docked to the charging pile for charging, so that during charging a next time, the machine can be charged more rapidly by using the position, the attitude, and the process.

In addition, a docking parameter for the machine and the charging pile may further be recorded in advance. That is, after the map of the working region is loaded, the machine may be placed on a charging station. The position and the attitude of the machine are recorded. The machine is enabled to reverse from the charging station by the preset distance and then advance to perform docking. If docking succeeds, the machine stores the preset distance by which the machine reverses/a position to which the machine reverses and a charging attitude at the position. The position is used as the target position. That is, generally, to adjust the attitude, the machine needs to be kept at a distance from the charging station. When the machine returns to perform docking, the machine may return to the position first and complete adjustment of the attitude at the position, so as to complete docking to the charging pile for charging. In the solution, for example, a virtual return path may be used in combination. That is, the machine returns to the position along the virtual path. The method requires relatively high positioning precision, and may be used when a docking manner allows a particular positioning error. When a docking manner allows a small positioning error, an infrared manner, an ultrasonic manner, a guiding wire manner, a guiderail manner, and the like may be additionally used to precisely dock the machine to the charging pile.

It should be noted that in addition to the docking to the charging pile for charging, the machine may return to the target position for maintenance, may return to a parking area after finishing working, or may return to the target position for refueling. This is not limited in the present invention.

Figure 5A:
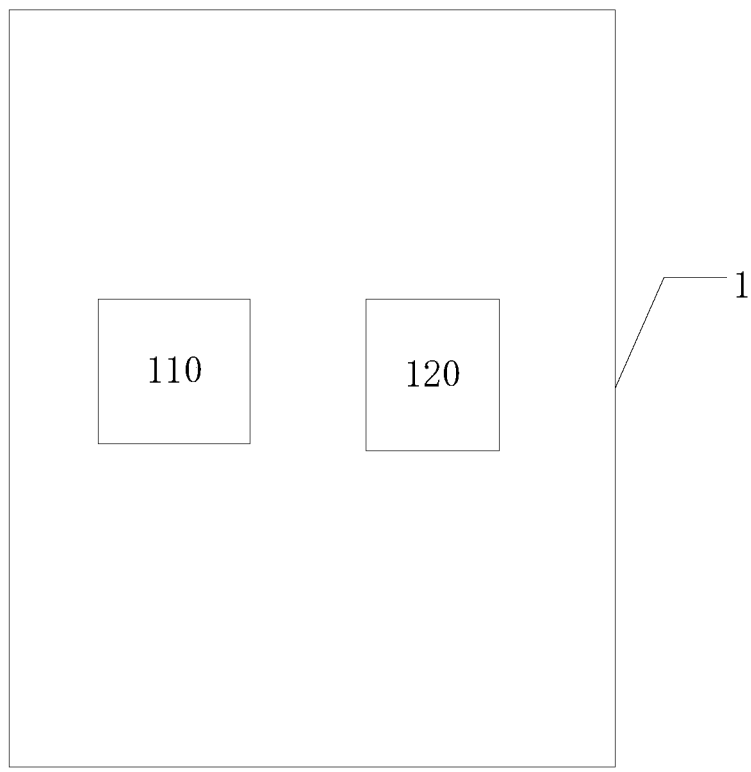
FIG. 5a is a schematic diagram of an acquisition module according to an embodiment of the present invention.

Another aspect of another embodiment of the present invention provides a self-moving device. Referring to FIG. 5a, the self-moving device 1 includes an acquisition module 110 and a control module 120. The acquisition module 110 is configured to acquire a current position of the self-moving device 1 in a working region. The control module 120 is configured to: select a return path to a target position according to the current position; determine a reuse status of the return path, and determine, based on the reuse status of the return path, whether to reselect a return path; and control the self-moving device 1 to return to the target position along the return path. The machine provided in the embodiment of the present invention may rapidly return to a target position in the working region and have promising application prospects. It is determined, according to a reuse status of a return path, whether to reselect a return path, so as to prevent a robot from repeatedly moving along a same segment of path to crush a lawn, thereby ensuring the beauty of the lawn.

Figure 5B:
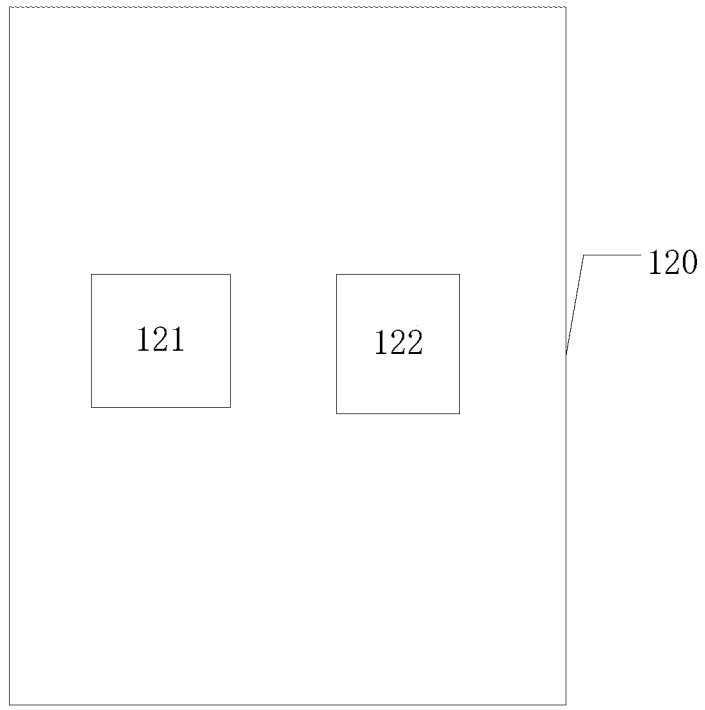
FIG. 5b, FIG. 5c, FIG. 5d, FIG. 5e, and FIG. 5f are a schematic diagram of a control module according to an embodiment of the present invention.

In an embodiment, referring to FIG. 5b, the control module includes a first calculation unit 121 and a control unit 122. The currently selected return path is taken as a first return path. The first calculation unit 120 is configured to calculate a reuse length and/or a reuse frequency of the first return path, and the control unit 122 determines, according to the reuse length and/or reuse frequency, whether the self-moving device 1 returns to the target position along the first return path. For example, the control unit 122 is further configured to: when the reuse length is greater than a preset threshold (for example, the preset threshold is ⅓ of the total length of the first return path) or the reuse frequency is greater than or equal to twice a day, control the self-moving device 1 to return to the target position along a second return path that completely does not coincide with the first return path, partially does not coincide with the first return path or does not intersect with the first return path. The machine in this embodiment returns to the target position along paths that do not completely coincide, so that the working region can be prevented from damage, and user experience can be improved.

In this embodiment, the first calculation unit 121 is configured to: record information related to a return path, and determine a reuse status of the return path according to the information. That is, the first calculation unit 121 may record use information (for example, the information may include a reuse length, a reuse frequency, and/or the like) of the return path, so that when an entire return path or a part of the return path is excessively used, the control unit 122 controls the machine to avoid the entire return path or the part of the return path to prevent the working region from damage.

Figure 5C:
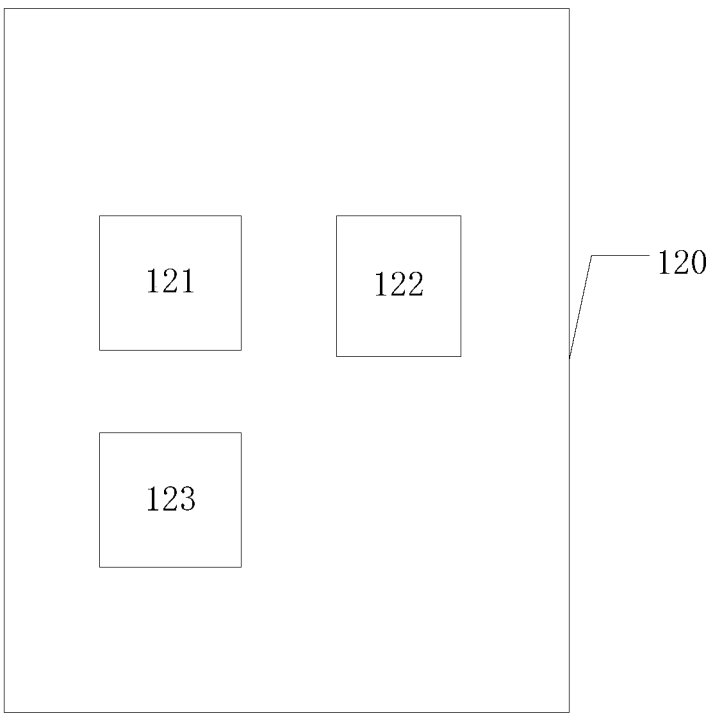

In an embodiment, referring to FIG. 5c, the control module 120 further includes a first computation unit 123. The first computation unit 123 is configured to compute an optimal path between the current position and the target position, and the control unit 122 uses the optimal path as the return path. For example, during computation, the acquisition module may acquire coordinates of the current position of the machine, and the optimal path is computed according to the coordinates and coordinates of the target position. As discussed above, the optimal path may be a shortest path.

Figure 5D:
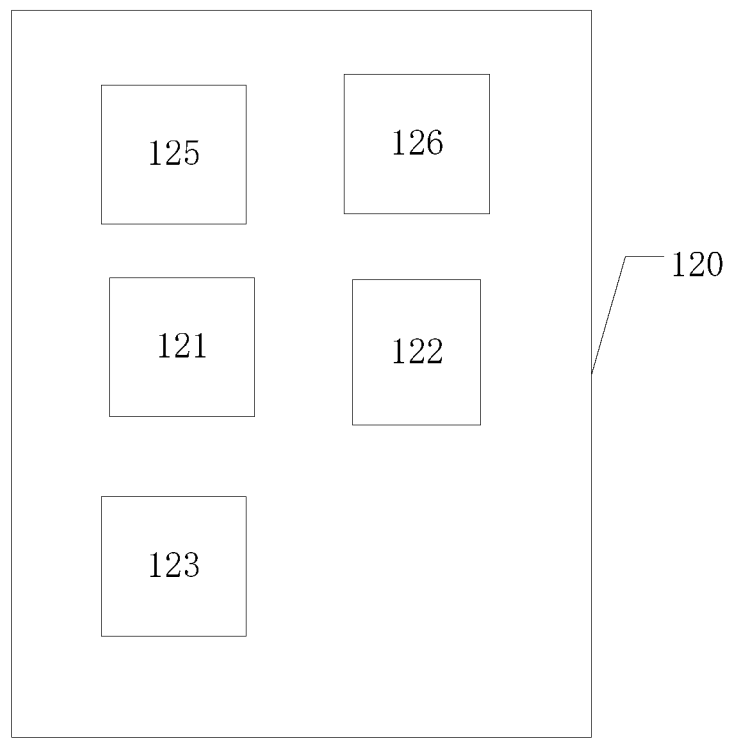

In this embodiment, referring to FIG. 5d, for example, the control module 120 may further include a load unit 125 and a mark unit 126. The load unit 125 is configured to load a map of the working region. The mark unit 126 is configured to mark a reference grid (for example, a grid with equal intervals on the map may be positive square boxes) on the map. The first computation unit 123 is configured to determine the optimal path according to the grid. Similarly, when the loaded map is a raster map, the control module 120 may include no mark unit. A distance, a level of walking difficulty, and the like need to be comprehensively considered for the optimal path. That is, a balance needs to be reached between the level of walking difficulty and the distance. Specifically, the distance may be determined by a quantity of virtual cells covered by a path. When the quantity of cells is larger, the path is longer, and vice versa. The level of walking difficulty includes a quantity of slopes on a path, a quantity of obstacles on a path, and a quantity of times that the machine needs to adjust an attitude, and the like. For example, the return path may be an L-shaped path or a straight line path.

Figure 5E:
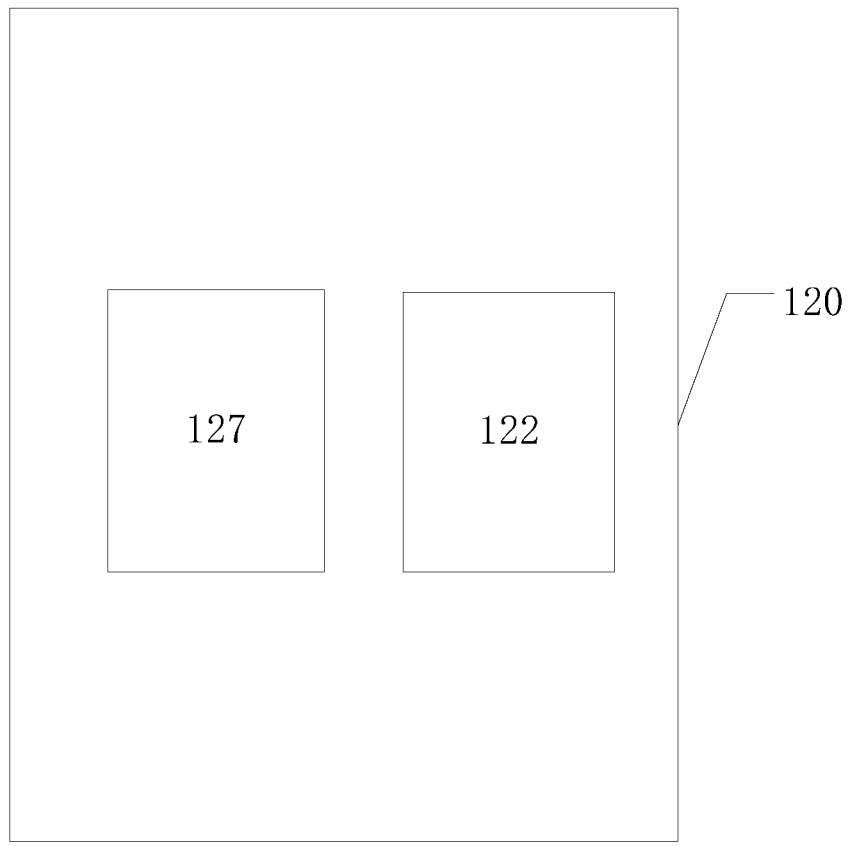

In an embodiment, referring to FIG. 5e, the control module further includes a first preset unit 127. The first preset unit 127 is configured to preset several preset return paths. The control unit 122 is configured to control the self-moving device 1 to return to the target position along a return path. Referring to the foregoing descriptions and accompanying drawings, the return paths may be a plurality of closed patterns in the working region, and specifically, may be a plurality of rectangular rings or a plurality of circular rings. When needing to return to the target position, the machine may continue to move in a current movement direction of the machine, and when reaching one of the plurality of rectangular rings or circular rings, the machine returns to the target position along the circular ring or rectangular ring. For example, these virtual circular return lines set in the working region may be connected by a straight line in a region near the target position, and the other end of the straight line is connected to the target position. In this way, during a return, the machine first moves to a position of an intersection with the straight line along a virtual circular return line, and moves to the target position along the straight line.

Figure 5F:
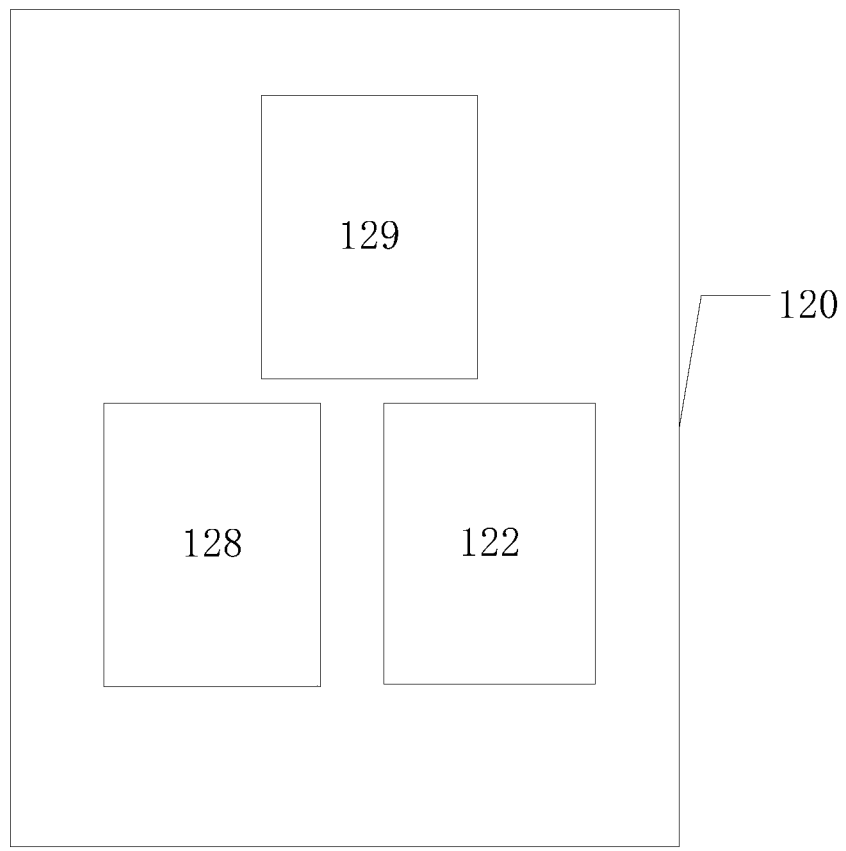

In this embodiment, for example, referring to FIG. 5f, the control module 120 may further include a second computation unit 128. The second computation unit 128 is configured to compute an optimal path (including the shortest path) between the current position and the preset return path, so that the control unit 122 controls the self-moving device to move to the target position along the optimal path. That is, when needing to return the target position, the machine may first acquire position information of the machine, and compute, according to a relationship between the position and the preset return line on the map, the optimal path for reaching the preset return line, so that the machine may reach the preset return line rapidly along the optimal path.

In addition, in another embodiment, the first preset unit 127 is configured to preset a virtual boundary line of the working region. The control unit 122 controls the self-moving device to return to the target position along a path along the virtual boundary line or near the virtual boundary line.

In the foregoing embodiment, several preset return paths/virtual boundary lines are preset, so that the machine can reliably and rapidly return to the target position, and the machine can be prevented from getting stuck, tipping over, colliding with an obstacle or the like during a return.

Figure 6:
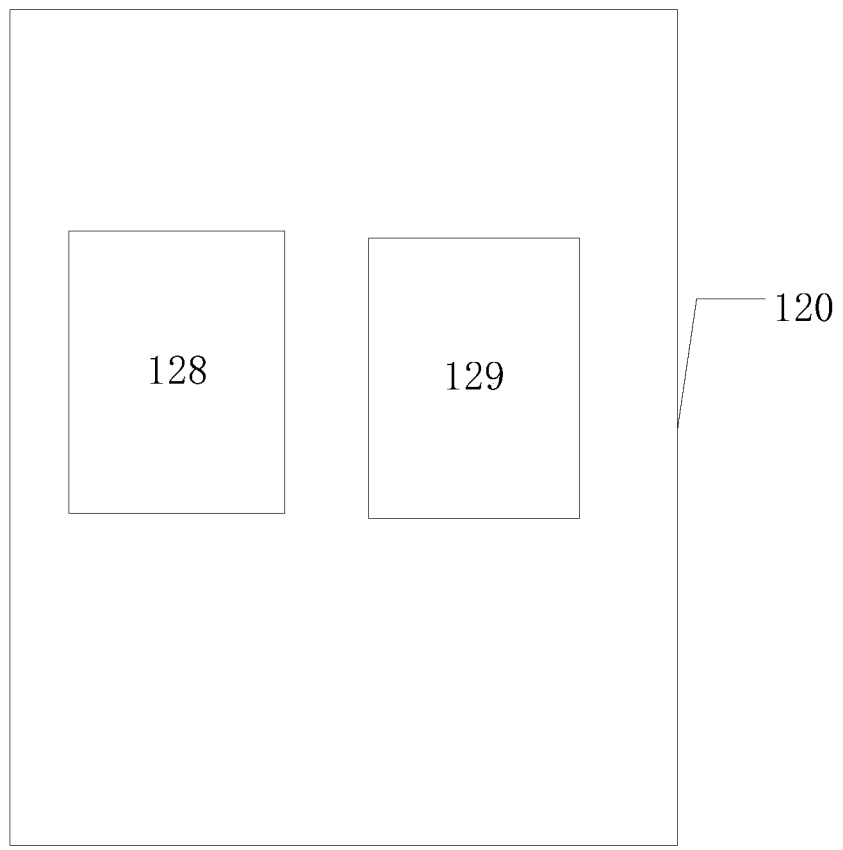
FIG. 6 is a schematic diagram of a control module according to an embodiment of the present invention.

In some embodiments in the foregoing, referring to FIG. 6, the control module 120 further includes an attitude determining unit 128 and an adjustment unit 129. The attitude determining unit 128 is configured to: when the self-moving device 1 moves to the target position, determine an attitude of the self-moving device 1, and the attitude adjustment unit 129 is configured to adjust the attitude of the self-moving device 1, to enable the self-moving device 1 to be docked to a charging pile for charging.

For example, the control module 120 may further include a second preset unit and a comparison unit. The second preset unit is configured to set a standard distance/relative position with respect to the charging pile and a charging attitude of the self-moving device, and the comparison unit is configured to: compare a current attitude of the self-moving device with the charging attitude, and adjust the attitude of the self-moving device to the charging attitude.

Similarly, the control module may further include a recording unit. For example, the recording unit may be configured to record the attitude with which the machine can be docked to the charging pile, a distance/relative position of the machine with respect to the charging pile, and the like. In this way, the control unit may control the self-moving device to first move to a position with the distance from the charging pile/the position, and adjust the self-moving device to the attitude with which the self-moving device can be charged, so as to rapidly charge the self-moving device.

In some embodiments, if the self-moving device encounters a shaded region (that is, a region in which a satellite navigation signal is weak inside the working region and the self-moving device cannot be normally navigated), a distance of the shaded region and a required time for the self-moving device to cross the shaded region may be determined if the self-moving device moves in a current movement direction. If the distance or the required time exceeds a preset threshold, the self-moving device may choose to avoid the shaded region.

In this case, for example, the self-moving device may include a preset unit and a determining unit. The preset unit is configured to preset a distance or time threshold within which the self-moving device can be precisely navigated when the self-moving device moves in the shaded region. The determining unit is configured to: determine whether a distance of a shaded region that the self-moving device encounters or a time required to cross the shaded region exceeds the distance or time threshold, and determine, according to a determining result, whether to avoid the shaded region.

Still another embodiment of the present invention provides a storage medium, storing a computer readable instruction, where when being invoked, the computer readable instruction performs the foregoing returning method of a self-moving device Yet another embodiment of the present invention provides a server, including a memory and a processor, where the memory stores a computer readable instruction, and the processor is configured to invoke the computer readable instruction to perform the foregoing returning method of a self-moving device.

The foregoing embodiments may be combined with each other to produce better effects.

The present invention is further described below with reference to the accompanying drawings and several embodiments.

Figure 7:
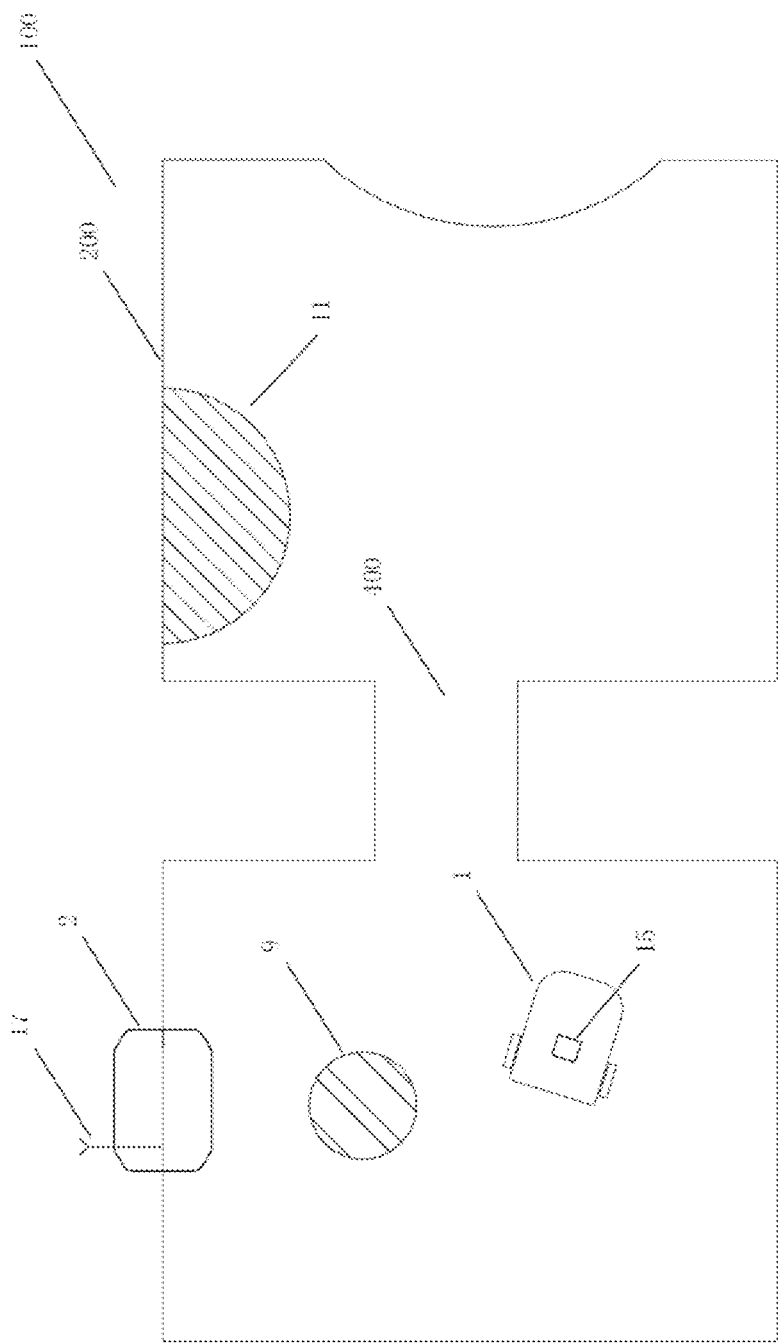
FIG. 7 is a schematic diagram of an automatic working system according to a first embodiment of the present invention.

FIG. 7 is a schematic diagram of an automatic working system 100 according to a first embodiment of the present invention. The automatic working system includes a self-moving device. In this embodiment, the self-moving device is an autonomous lawn mower 1. In another embodiment, the self-moving device may be alternatively an unattended device such as an automatic cleaning device, an automatic irrigation device, an automatic snowplow, and the like. The automatic working system 100 further includes a charging station 2 configured to charge the autonomous lawn mower 1. In this embodiment, the automatic working system 100 includes a navigation module configured to output a current position of the autonomous lawn mower. Specifically, the navigation module includes a base station 17 and a mobile station 15.

As shown in FIG. 7, the automatic working system is configured to work within a predetermined working region. In this embodiment, the working region includes at least two separate sub-working regions. The sub-working regions are connected through the passage 400. A boundary 200 is formed between the working region and a non-working region. Obstacles 9, 11 exist in the working region. The obstacle is a tree, a pit or the like.

Figure 8:
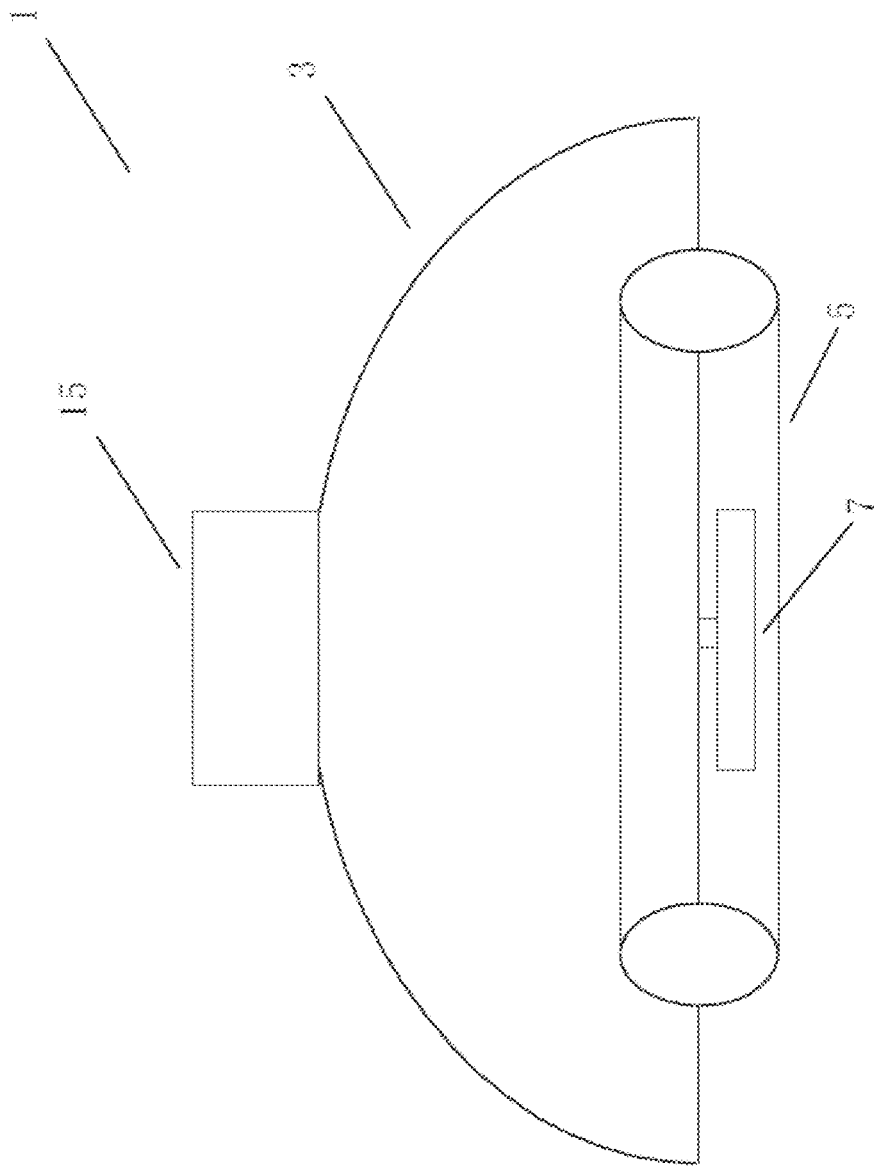
FIG. 8 is a schematic structural diagram of an autonomous lawn mower according to the first embodiment of the present invention.

The structure of the autonomous lawn mower 1 in this embodiment is shown in FIG. 8. The autonomous lawn mower 1 includes a housing 3, a movement module, a task execution module, an energy source module, a control module, and the like. The movement module includes a continuous track 5 driven by a drive motor to enable the autonomous lawn mower 1 to move. The task execution module includes a cutting assembly 7 performing grass cutting work. The energy source module includes a battery pack (not shown) supplying electrical energy for the autonomous lawn mower 1 to move and work. The control module is electrically connected to the movement module, the task execution module, and the energy source module, controls the movement module to enable the autonomous lawn mower 1 to move, and controls the task execution module to perform a task.

Figure 9A:
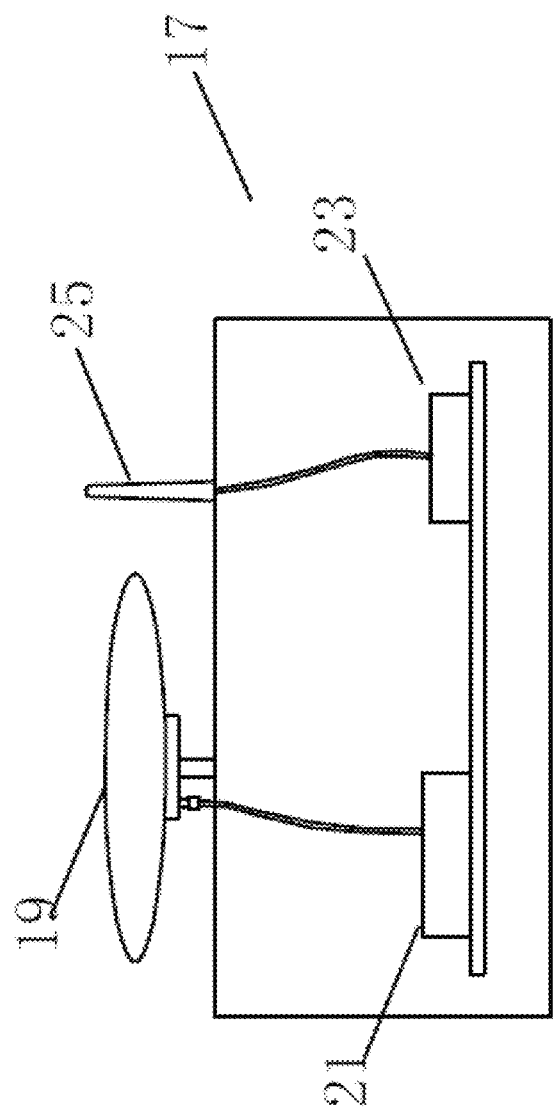
FIG. 9a and FIG. 9b are schematic composition diagrams of a navigation module according to the first embodiment of the present invention.
Figure 9B:
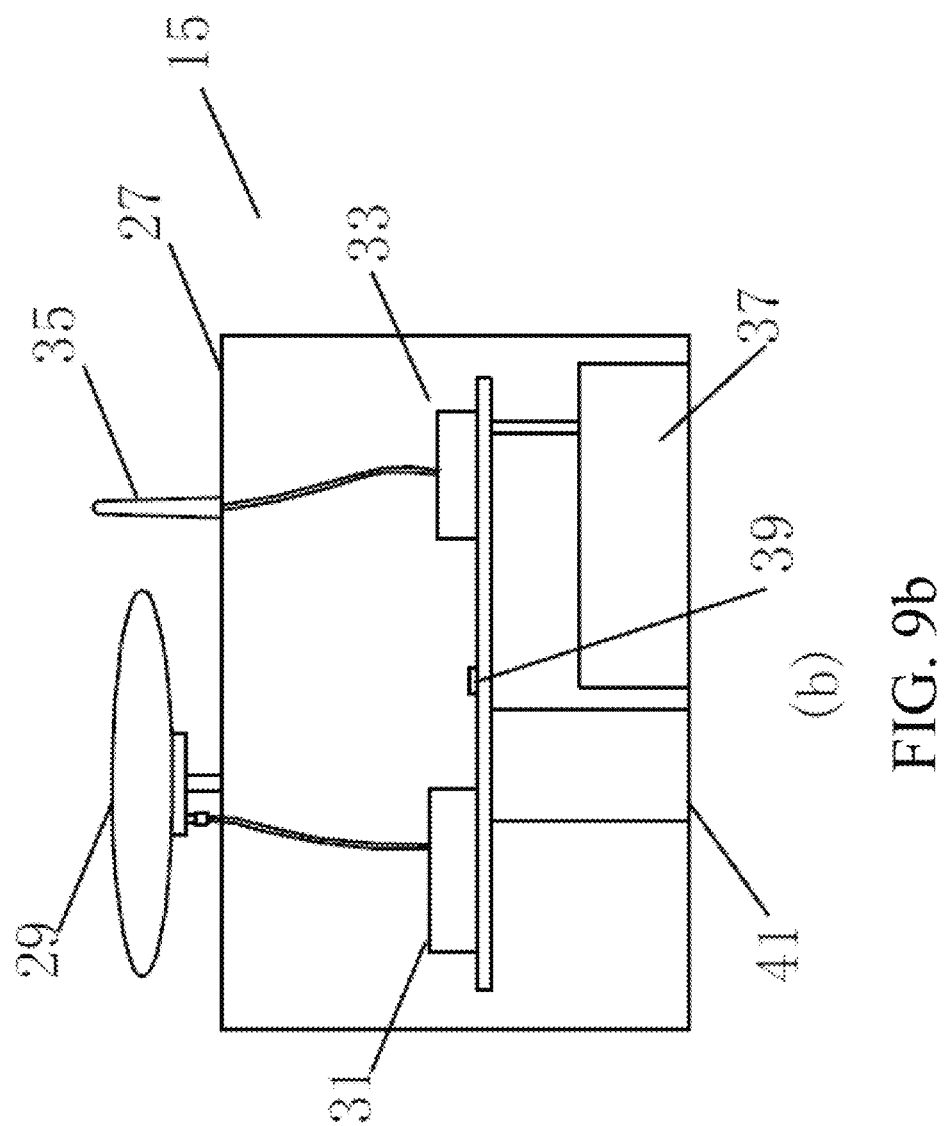
Figure 10A:
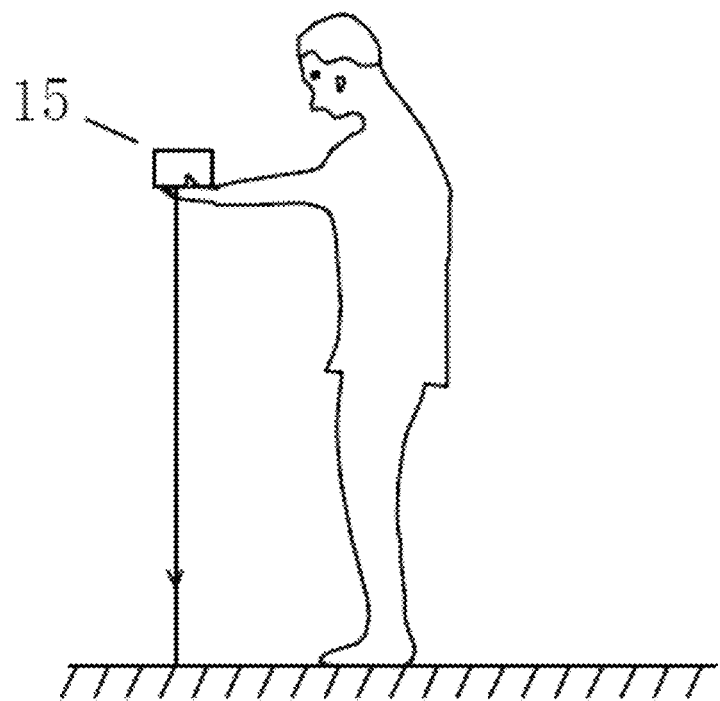
FIG. 10a, FIG. 10b, FIG. 10c, and FIG. 10d are working schematic diagrams of an offset calibration apparatus according to the first embodiment of the present invention.
Figure 10B:
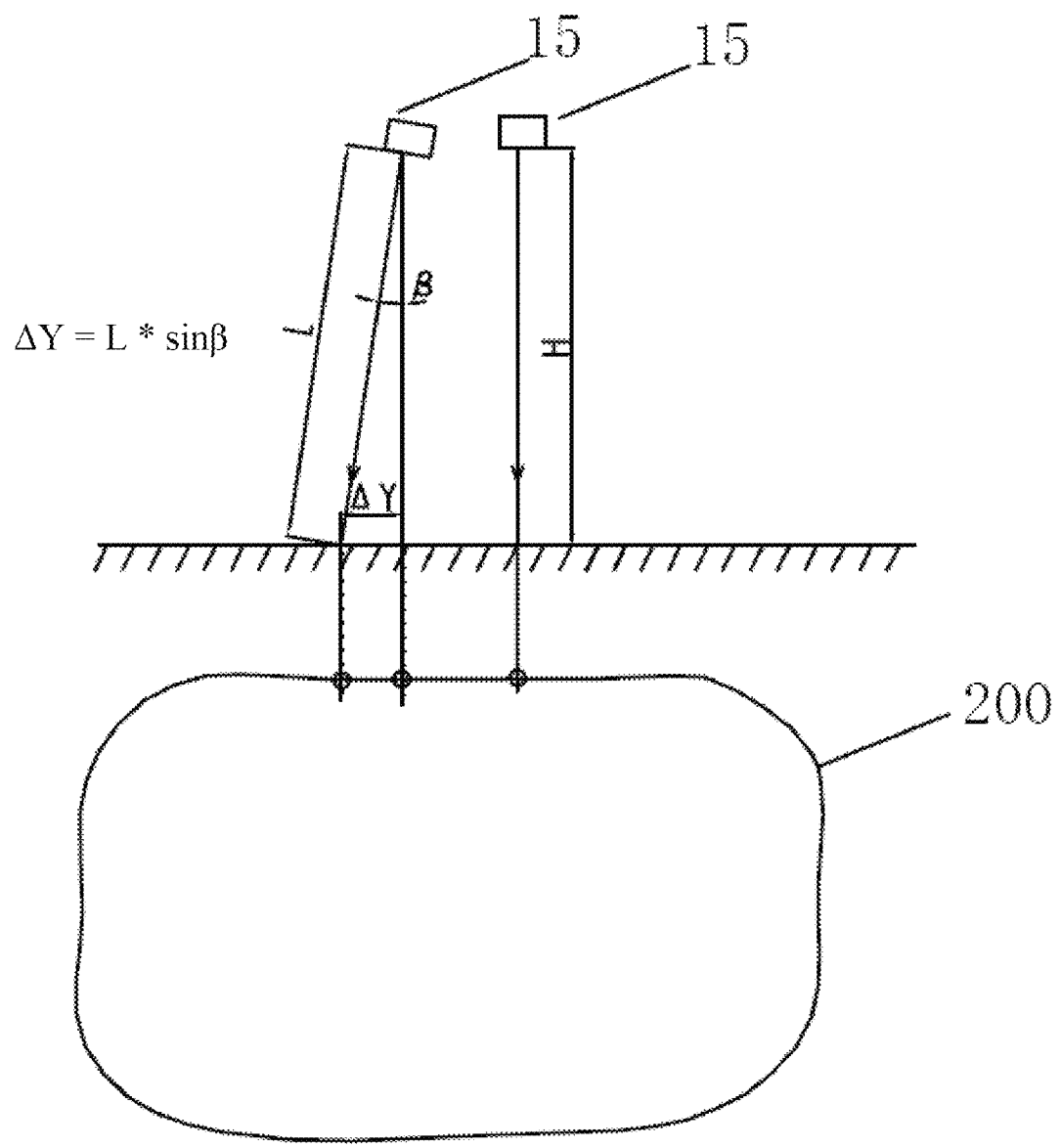
Figure 10C:
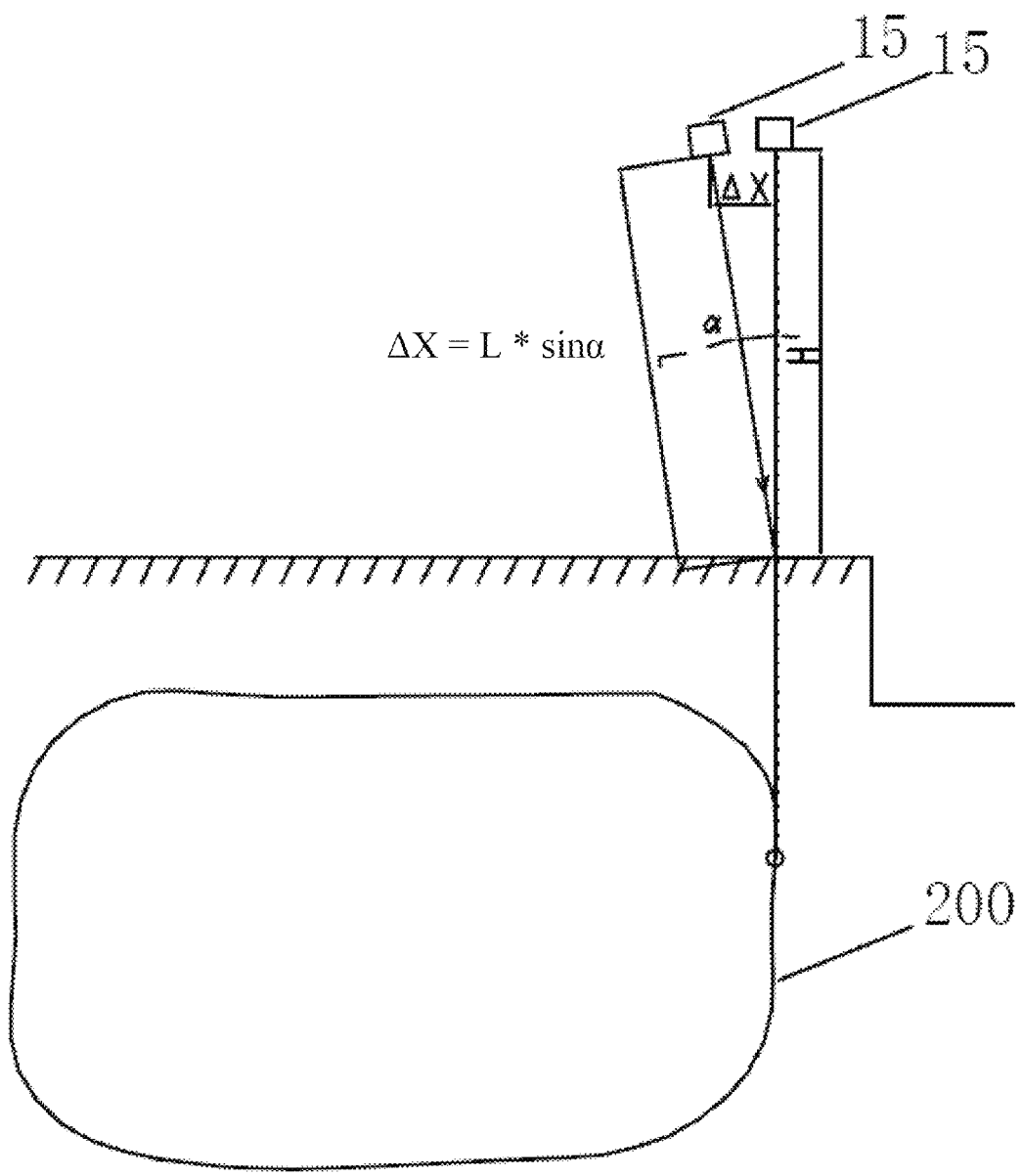
Figure 10D:
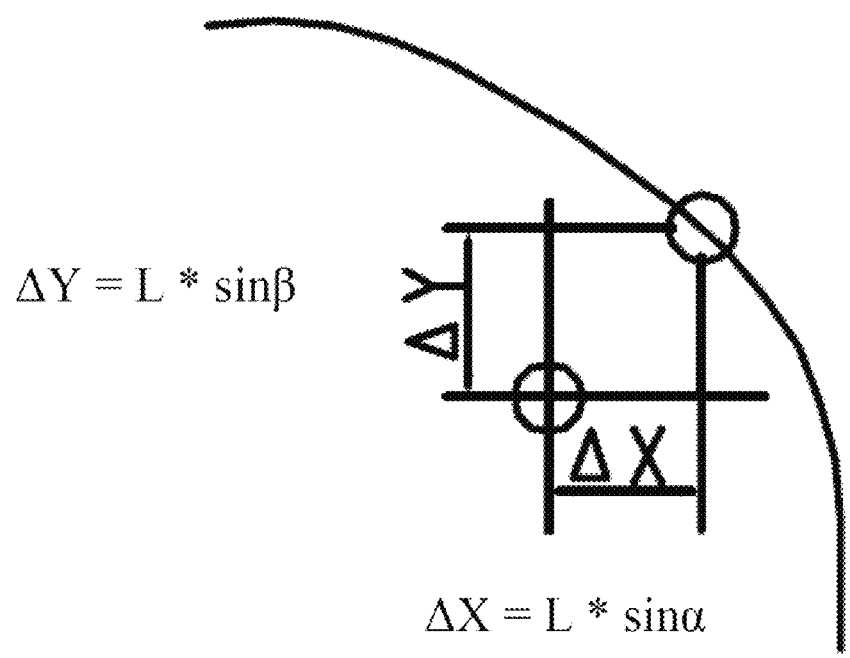

The composition of the navigation module in this embodiment is shown in FIG. 9(a) and FIG. 9(b). The navigation module includes the base station 17 and the mobile station 15. The base station 17 and the mobile station 15 both receive satellite signals, and the base station 17 sends a positioning correction signal to the mobile station 15, to implement differential satellite positioning. In this embodiment, the base station 17 and the mobile station 15 receive GPS positioning signals to implement DGPS positioning. Certainly, in another embodiment, the base station 17 and the mobile station 15 may alternatively receive positioning signals of the Galileo satellite navigation system, the Beidou satellite navigation system, the global navigation satellite system (GLONASS) or the like.

As shown in FIG. 9(a), in this embodiment, the base station 17 includes: a GPS antenna 19, receiving a GPS positioning signal; a GPS card 21, processing the received GPS positioning signal, and generating the positioning correction signal; and a communications module 23, sending the positioning correction signal to the mobile station 15. In this embodiment, the communications module 23 includes a radio station and a radio station antenna 25. The base station further includes an indicator (not shown). The indicator can output an indication showing whether a satellite signal at a current position is desirable. In this embodiment, the base station 17 is disposed at the charging station 2 and is integrated with the charging station 2. In another embodiment, the base station 17 may be alternatively disposed separately from the charging station 2, for example, may be disposed at a position such as a roof where a satellite signal can be better received.

In this embodiment, the mobile station 15 includes: a housing 27; a GPS antenna 29, receiving a GPS positioning signal; a GPS card 31, processing the received GPS positioning signal; and a communications module 33, receiving the positioning correction signal sent by the base station 17. The communications module 33 includes a radio station and a radio station antenna 35. In this embodiment, the mobile station 15 integrates an inertial navigation apparatus (not shown). The inertial navigation apparatus outputs inertial navigation data. When the mobile station 15 is working, only a GPS positioning signal may be used for navigation, or a positioning signal obtained by combining a GPS positioning signal and inertial navigation data may be used for navigation, or only inertial navigation data may be used for navigation if a GPS signal is weak. The mobile station 15 further includes an indicator (not shown) outputting an indication showing whether a GPS signal at a current position is desirable. In this embodiment, the mobile station 15 is detachably connected to the housing 3 of the autonomous lawn mower 1. The mobile station 15 includes a first interface (not shown) for connecting to the housing of the autonomous lawn mower 1. When the autonomous lawn mower 1 is working, the mobile station 15 is installed at the housing 3 of the autonomous lawn mower 1. When being connected to the housing 3 of the autonomous lawn mower 1, the mobile station 15 may be electrically connected to the control module of the autonomous lawn mower 1, the mobile station 15 outputs coordinates of the current position of the autonomous lawn mower 1. The control module controls, according to the current position of the autonomous lawn mower 1, the autonomous lawn mower 1 to move and work. In this embodiment, the mobile station 15 includes an independent power supply module 37. The mobile station 15 may work independently when being separated from the housing 3 of the autonomous lawn mower 1.

In this embodiment, before the autonomous lawn mower starts to work, a map of the working region needs to be created. Specifically, in this embodiment, the navigation module of the automatic working system is used to create the map of the working region. The creating the map of the working region includes a step of recording the map.

The step of recording the map is started after a user finishes installing the base station. In the first embodiment of the present invention, to record the map, the mobile station is separated from the housing of the autonomous lawn mower, the mobile station works independently, and the user holds the mobile station and walks to record the map. The recording the map includes the following steps: Starting from a starting point, that is, a position of the charging station in this embodiment, the user starts to walk along a boundary of the working region to record position coordinates of the boundary; the user walks along an obstacle in the working region to record position coordinates of the obstacle; the user walks along a traffic island in the working region to record position coordinates of the traffic island; and the user walks along a passage connecting sub-working regions to record position coordinates of the passage. In this embodiment, when the user holds the mobile station to record the map, the inertial navigation apparatus is in an off state. The reason is that when the user holds the mobile station and moves, with the shaking of a hand, the mobile station may tilt around, causing severe interference with the inertial navigation apparatus.

In this embodiment, to accurately record the map and eliminate or reduce an error, the mobile station includes an offset calibration apparatus. Specifically, the offset calibration apparatus includes a laser beam emitter configured to assist in positioning. The laser beam emitter is installed below a housing of the mobile station and generates a laser beam perpendicular to the bottom surface of the mobile station. Referring to FIG. 10(*a*), to record the map, the user holds the mobile station and walks, observes a light dot of the laser beam on the ground, and determines whether the light dot of the laser beam on the ground is at a preset position. For example, when the user walks along the boundary, the user determines whether the light dot of the laser beam on the ground is on the boundary. When the user walks an along obstacle, the user determines whether the light dot of the laser beam on the ground is at a periphery of the obstacle and the like. The user adjusts, according to a determining result, a position of the mobile station in real time, to keep the light dot of the laser beam on the ground at the preset position, so that the laser beam emitter assists in positioning. In this embodiment, the offset calibration apparatus further includes an attitude detection module 39 and a laser ranging module 41, as shown in FIG. 10(*b*), configured to correct an error between a position of the light dot of the laser beam on the ground and an actual position of the mobile station that occurs because the mobile station tilts. As shown in FIGS. 10(*b*), 10(*c*), and 10(*d*), when the user holds the mobile station and walks, the mobile station tilts, resulting in the error between the position of the light dot of the laser beam on the ground and the actual position of the mobile station. In this case, the user observes that the position of the light dot of the laser beam on the ground is at the preset position, but the actual position of the mobile station is not at the preset position, and the user cannot eliminate the error through observation. The attitude detection module obtains tilt angles $\alpha$ and $\beta$ of the mobile station, and the laser ranging module measures a distance L from the mobile station to the light dot of the laser beam on the ground, and the offset correction values may be obtained by using the formulas $\Delta X = L \ast \sin \alpha$ and $\Delta Y = L \ast \sin \beta$. By using the foregoing method, an error caused by a tilt of the mobile station during map recording is eliminated, thereby ensuring map recording accuracy.

In a second embodiment of the present invention, to record the map, the mobile station is installed at the housing of the autonomous lawn mower, and the user uses an autonomous terminal device such as a mobile phone and a tablet to remotely control the autonomous lawn mower to move. Similarly, the step of recording the map includes recording the boundary of the working region, an obstacle in the working region, a passage connecting sub-regions or the like. In this embodiment, in the process of recording the map, the inertial navigation apparatus may be turned on. The reason is that the mobile station is installed at the housing of the autonomous lawn mower, and the mobile station moves relatively stably. In this embodiment, in the process of recording the map, the task execution module of the autonomous lawn mower is kept off.

Figure 11:
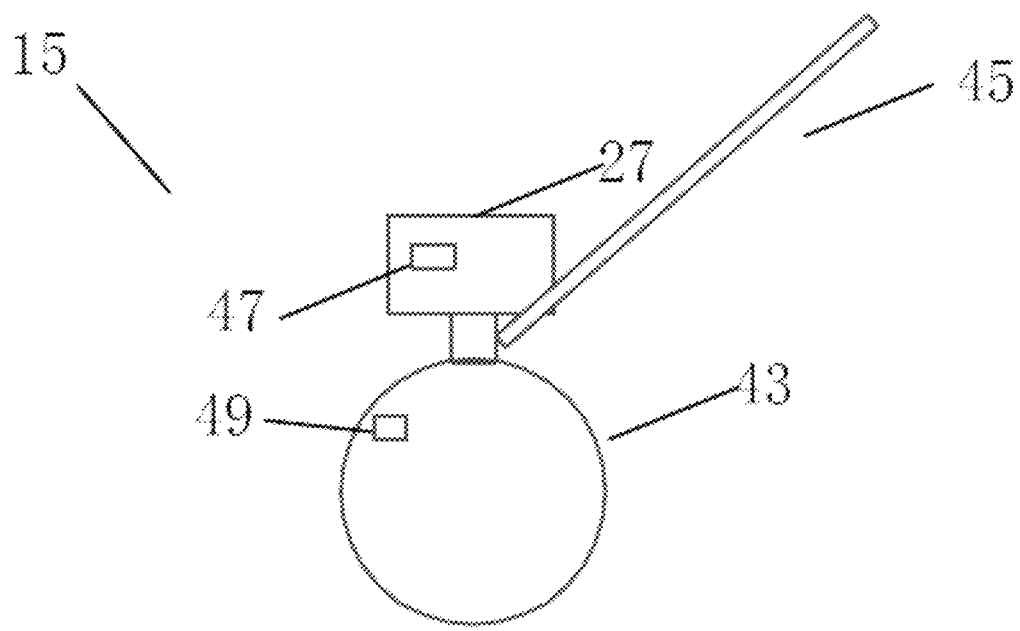
FIG. 11 is a schematic diagram of a roller apparatus of a mobile station according to a sixth embodiment of the present invention.

Referring to FIG. 11, in a third embodiment of the present invention, the autonomous lawn mower includes a pushing rod, detachably installed at the housing of the autonomous lawn mower. To record the map, the mobile station is installed at the housing of the autonomous lawn mower, the pushing rod is installed at the housing of the autonomous lawn mower, and the user operates the pushing rod to push the autonomous lawn mower to move, to record the boundary of the working region, an obstacle, a passage or the like. Similarly, the task execution module of the autonomous lawn mower is kept off.

In a fourth embodiment of the present invention, the autonomous lawn mower includes an ultrasonic apparatus, so that the autonomous lawn mower can follow the user at a distance. To record the map, the mobile station is installed at the housing of the autonomous lawn mower, the user walks along the boundary of the working region, an obstacle, a passage or the like, and the autonomous lawn mower follows the user, to record the map. Similarly, the task execution module of the autonomous lawn mower is kept off. The benefit of this approach is that the autonomous lawn mower follows the user when recording the map, so that it can be determined whether a position recorded on the map is accurate, and the map is examined.

In a fifth embodiment of the present invention, to record the map, the mobile station is separated from the autonomous lawn mower, and the mobile station is placed on a pushable cart. For example, the mobile station may be installed on a hand-propelled device, and the user pushes a cart and walks, to record the boundary of the working region, an obstacle, a passage or the like. The benefit of this approach is that the mobile station moves stably, and the inertial navigation apparatus may be turned on.

In a sixth embodiment of the present invention, the mobile station 15 includes a roller apparatus 43 detachably connected to the housing 27 of the mobile station. The mobile station 15 includes a direction sensor 47 and a ranging sensor. The ranging sensor includes a tachometer 49 installed on the roller apparatus 43. The roller apparatus 43 further includes a pushing rod 45. To record the map, the mobile station 15 is separated from the housing 3 of the autonomous lawn mower, the roller apparatus 43 is connected to the housing 27 of the mobile station 15, and the user operates the pushing rod 45 to push the mobile station 15 to move to record the map. To record the map, auxiliary positioning information may be computed by using ranging information output by the tachometer 49 and direction information output by the direction sensor 47, and is used to calibrate a positioning error in satellite positioning or inertial navigation. When the method is used, the positioning error is small, and costs are low.

In the first embodiment of the present invention, the mobile station includes a second interface for connecting to the intelligent terminal of the user. The intelligent terminal such as a mobile phone and a tablet may be installed on the mobile station through the second interface. The second interface may include an electrical interface, so that when being installed on the mobile station, the intelligent terminal is electrically connected to the mobile station. In this embodiment, the mobile station communicates with the intelligent terminal wirelessly by using the communications module. The wireless communication manner may be, for example, Wi-Fi, a cellular network or Bluetooth. To record the map, the intelligent terminal is installed on the mobile station and displays in real time information recorded by the mobile station. In this embodiment, the mobile station includes several buttons configured to input instructions such as "record a map" and "complete recording". In another embodiment, the mobile station includes a display screen displaying information in real time in place of the intelligent terminal.

In this embodiment, the charging station is used as a starting point on the map, and the autonomous lawn mower starts to work from the charging station. To record the position of the charging station, the mobile station is installed on the autonomous lawn mower, so that the autonomous lawn mower is in a charging state, or the charging state of the autonomous lawn mower is simulated, that is, a docking state is completed, recording of the position information of the charging station is confirmed manually or by using a charging signal. The position information of the charging station includes position coordinates, and further includes attitude information of the autonomous lawn mower. The autonomous lawn mower includes an acceleration sensor, an electronic compass, and the like. To record the position of the charging station, the acceleration sensor, the electronic compass, and the like are used to record current information such as a direction and a tilt angle of the autonomous lawn mower, to facilitate accurate docking when the autonomous lawn mower returns.

In the first embodiment of the present invention, the mobile station includes a map generation module configured to generate the map of the working region according to recorded position coordinates and save the map. In this embodiment, every time the user walks to form a closed region, the user uses a button to input a map generation instruction to generate map information of the closed region. For example, when recording the boundary of the working region, the user walks along a boundary of a sub-working region. After the boundary of the sub-working region is completed, the boundary of the sub-working region is generated, and then a boundary of a next sub-working region starts to be recorded. Similarly, when recording an obstacle and a passage, the user walks along the obstacle or passage to form a closed region, the map information corresponding to the closed region is generated, and the user then records a next closed region. On the generated map, an attribute is assigned to the recorded closed region. For example, if a boundary attribute is assigned to the recorded closed region, the autonomous lawn mower can work within the region but cannot leave the region. If an obstacle attribute is assigned to the recorded closed region, the autonomous lawn mower cannot enter the region. In addition, an obstacle needs to be located inside the boundary. Therefore, a part, outside the boundary, of the obstacle will be discarded. If a passage attribute is assigned to the recorded closed region, the autonomous lawn mower can enter the region but cannot perform grass cutting work within the region. A passage may be located inside or outside the boundary. If a passage is located outside the boundary, the passage is used to connect two separate sub-working regions. Therefore, the passage needs to intersect with both the sub-working regions. If a passage is located inside the boundary, the passage is usually a non-lawn surface. Therefore, the autonomous lawn mower is also forbidden to perform grass cutting work.

In this embodiment, a Cartesian coordinate system is established to generate the map. Specifically, the first point from which recording is started is used as the origin (0, 0) of the coordinate axes. The position coordinates that correspond to the origin and are output by the mobile station are (x0, y0). In this embodiment, the origin (0, 0) of the coordinate axes corresponds to the position coordinates of the charging station. As the user records the map, the mobile station outputs position coordinates (x1, y1), and converts the position coordinates (x1, y1) into (x1−x0, y1−y0) when generating the map, so as to convert a satellite positioning coordinate system into the Cartesian coordinate system. In this embodiment, a raster image is generated based on the Cartesian coordinate system. Rasterization precision, for example, 1 mm, is defined. In the Cartesian coordinate system, straight lines are drawn at an interval of 1 mm separately on X and Y axes, so as to form the raster image. The recorded position coordinates are converted into a grid on the Cartesian coordinate system. In this way, the map recording process is equivalent to a process of placing points on the raster image. As the points are placed, each point further records some other information, for example, a GPS signal condition at the point, the altitude of the point, and a positioning error of the point. A boundary, an obstacle, and a passage are all generated by using the foregoing method.

After the raster image is generated, a cell attribute is assigned to a raster cell. The cell attribute includes coordinates, whether the autonomous lawn mower can cover the raster cell, whether the autonomous lawn mower passes through the raster cell, a quantity of times that the autonomous lawn mower passes through the raster cell, a GPS signal condition, a positioning error, altitude, a slope, temperature, humidity, sunlight intensity, and the like. If the cell attribute of a raster cell indicates that the autonomous lawn mower cannot cover the raster cell, when the autonomous lawn mower approaches a position corresponding to the raster cell, the control module controls the autonomous lawn mower to change a movement manner to stay away from the position corresponding to the raster cell. If the cell attribute of a raster cell indicates that the autonomous lawn mower can cover the raster cell, every time the autonomous lawn mower passes through the raster cell, the cell attribute being the quantity of times that the autonomous lawn mower passes through the raster cell of the raster cell is increased by 1.

In this embodiment, to ensure map generation accuracy, recorded coordinate points are filtered to eliminate low precision coordinate points. A GPS signal condition of a point is mainly analyzed to filter coordinate points. In this embodiment, according to a GPS signal condition, coordinate points output by the mobile station are categorized into several types. One of the types is a high precision coordinate point. When the GPS signal is strong, the mobile station outputs a high precision coordinate point, and the high precision coordinate point is an RTK fixed solution. Another one of the types is a low precision coordinate point. When the GPS signal is weak, the mobile station outputs a low precision coordinate point. According to a GPS signal condition, low precision coordinate points are categorized into several grades, including a pseudorange differential solution, a single-point differential solution, an RTK float solution, and further includes an inertial navigation solution. The inertial navigation solution is coordinates output by using only inertial navigation positioning when a GPS signal is lost. To record the map, a precision level of a coordinate point is output as an additional value together with coordinate value.

Figure 12:
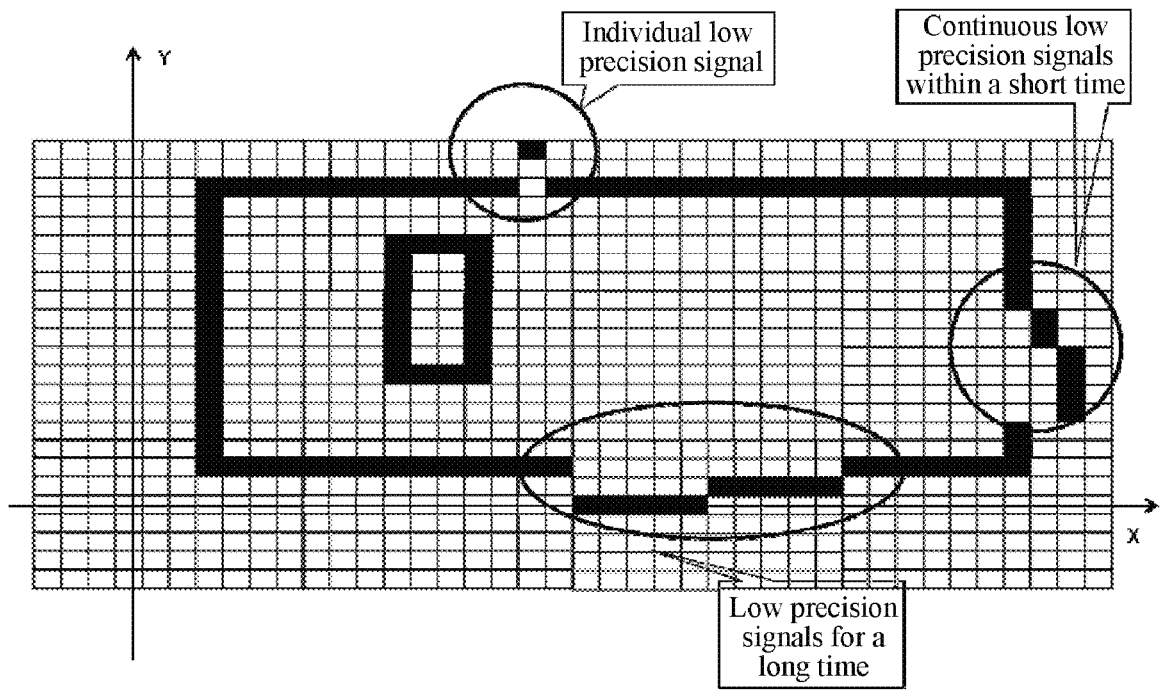
FIG. 12 is a schematic diagram of a raster according to the first embodiment of the present invention.

Referring to FIG. 12, according to distribution characteristics of precision levels of coordinate points, there are several methods for eliminating low precision coordinate points in the following:

In a first case, individual low precision coordinate points are scattered among continuous high precision coordinate points. In this case, the low precision coordinate points are eliminated directly.

In a second case, a segment of low precision coordinate points exists between continuous high precision coordinate points. It is generally believed that such a case occurs when the time during which low precision coordinate points appear is less than 30 S during map recording. In this case, after low precision coordinate points are eliminated, curve analysis is performed according to high precision coordinate points at two ends, and fitting is performed.

In a third case, low precision coordinate points appear for a long time. It is generally believed that such a case occurs when the time during which low precision coordinate points appear exceeds 30 S during map recording. In this case, an indicator of the mobile station sends a prompt signal to prompt the user that map precision is inadequate, and the user may draw and modify the map on a display interface of an intelligent terminal or a display screen. If the user makes no modification, precision of these low precision coordinate points is evaluated to determine an error range, and these low precision coordinate points are offset into the working region by a distance according to the error range, thereby ensuring that the working region defined on the map is inside an actual working region.

In this embodiment, an offset operation is performed on the map to eliminate a positioning error. When the autonomous lawn mower is working, the mobile station is installed at the housing of the autonomous lawn mower to output coordinates of the current position of the autonomous lawn mower. The positioning center of the autonomous lawn mower is offset from the positioning center of the mobile station during map recording. A safety problem may occur if the offset is not calibrated. For example, when the autonomous lawn mower moves towards the boundary but the positioning center of the autonomous lawn mower is still within the boundary, the autonomous lawn mower continues to move, and as a result the autonomous lawn mower moves outside the boundary. To eliminate a positioning error caused by the offset of the positioning center of the autonomous lawn mower from the positioning center of the mobile station during map recording, an offset operation is performed on the map. A distance D of the offset of the positioning center of the autonomous lawn mower from the positioning center of the mobile station during map recording is determined, the boundary, an obstacle, a passage, and the like are offset on the map into the working region by the distance D. To be specific, the boundary and the passage are shrunk by the distance D, and the obstacle is enlarged by the distance D. An operation of shrinking the boundary and a passage is also referred to as a map erosion, and an operation of enlarging an obstacle is also referred to as a map expansion.

A positioning error also exists during map recording. The severity of the positioning error is related to a GPS signal condition, that is, is related to a precision level of a coordinate point. When the GPS signal is strong, the positioning error is relatively small, and when the GPS signal is weak, the positioning error is relatively large. When an offset operation is performed on the map to eliminate a positioning error, first, a positioning error of the position is evaluated according to GPS signal conditions at different positions. This is also referred to as error evaluation. Offsets on the map are then adjusted according to error evaluations of different positions. An offset operation similarly includes an erosion and an expansion.

In this embodiment, after the map of the working region is offset, the map of the region may be joined with the maps of other regions.

After the offset operation is completed, the step of generating the map of the working region is completed.

In this embodiment, the mobile station further includes an auxiliary positioning apparatus. The auxiliary positioning apparatus includes a pedometer, a laser radar, a camera, an odometer, an ultrasonic wave, and the like. The inertial navigation apparatus may also be considered as an auxiliary positioning apparatus. The auxiliary positioning apparatus is configured to assist in GPS positioning when a GPS signal is weak, and a correction value output by the auxiliary positioning apparatus is used to correct a positioning error, so that the generated map is more precise.

In a seventh embodiment of the present invention, the working region has a boundary with a regular shape, for example, a rectangular boundary. To record the map, the user only needs to record the positions of the vertices of the working region. During map generation, the vertices are connected to obtain the boundary. The method is also applicable to a passage, an obstacle, and the like with a regular shape. In the method, map generation efficiency can be improved, and a possible region with a poor GPS signal in the middle is avoided.

In the first embodiment of the present invention, GPS positioning is implemented by using communication between the base station and the mobile station. The base station is disposed in several manners to enable the base station and the mobile station to reliably and efficiently provide navigation data to the automatic working system. In this embodiment, the base station is disposed at the charging station and is powered by the charging station. Certainly, in another embodiment, the base station may be disposed separately from the charging station. The base station may be powered by independent energy sources. For example, a power form such as solar energy and wind energy may be used. In this embodiment, to ensure a strong satellite signal at the base station, before the charging station is installed, the user first places the autonomous lawn mower at a position where the user intends to install the charging station. Alternatively, the user detaches the mobile station from the autonomous lawn mower and then moves the mobile station to the position where the user intends to install the charging station. The user turns on positioning, determines positioning precision, and confirms that the positioning precision is high before fixing the charging station. The base station is provided with an acoustic, optical, electrical apparatus or the like configured to feed back a condition of a satellite signal to indicate whether an installing position or receiving quality of the base station is appropriate. The base station can perform comparison by using historical coordinates to determine whether there is an exception such as blockage. If positioning precision is reduced, it indicates that the base station may be blocked. After discovering an exception, the base station sends prompt information to the user or the autonomous lawn mower by using a communications module, or switches a state to wait for recovery.

To enable the base station and the mobile station to reliably and efficiently provide navigation data to the automatic working system, reliable and efficient communication between the base station and the mobile station further needs to be ensured.

Figure 13:
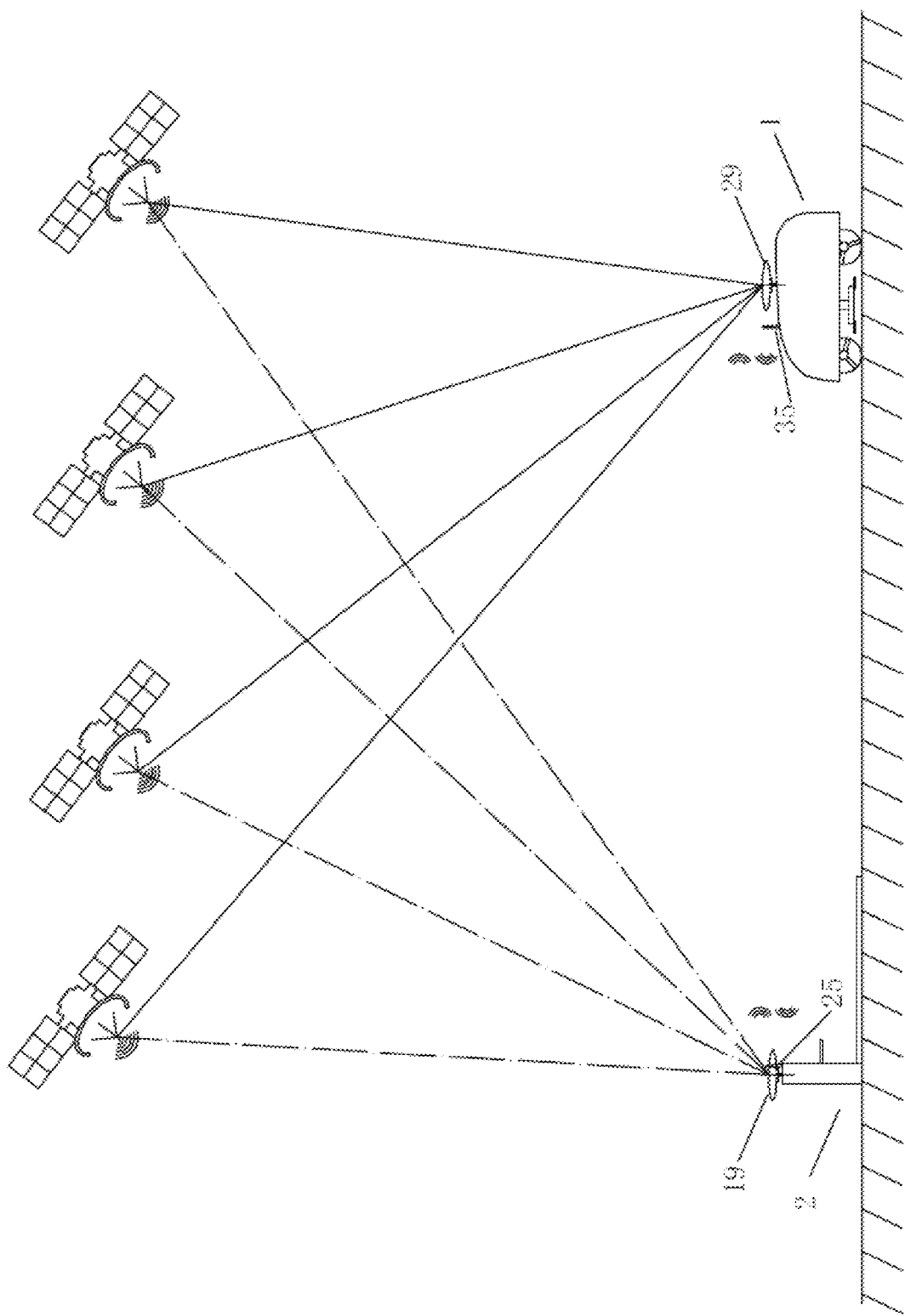
FIG. 13 is a working principle diagram of a navigation module according to the first embodiment of the present invention.
Figure 14:
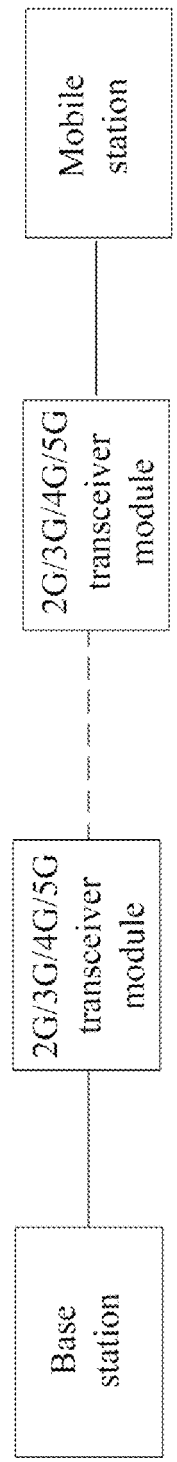
FIG. 14 is a schematic diagram of communication between a base station and a mobile station according to the first embodiment of the present invention.

As shown in FIG. 13, in this embodiment, the base station receives a satellite signal by using a GPS antenna, and sends acquired carrier phase information to the mobile station by using the communications module. The communications module includes a radio station and a radio station antenna, and may also include a Sub-1G module, a Wi-Fi module, and a 2G/3G/4G/5G module. The mobile station also receives a satellite signal by using a GPS antenna, and also receives, by using a communications module corresponding to the base station, a carrier phase signal acquired by the base station, to resolve relative position coordinates of the mobile station with respect to the base station. The relative position coordinates include longitude and latitude, and may further include altitude. The precision may reach a centimeter level. To ensure reliable long-distance transmission between the base station and the mobile station, GPS positioning navigation data may be transmitted in a wireless network manner such as 2G/3G/4G/5G. FIG. 14 is a schematic diagram of communication between the base station and the mobile station.

In this embodiment, the mobile station may selectively communicate with one of a plurality of different base stations. For example, the mobile station may selectively communicate with a first base station or a second base station. Specifically, the automatic working system includes a plurality of base stations, or, base stations of different automatic working systems located within a region may be shared. The mobile station is switched among the plurality of base stations. When an exception occurs during communication between the mobile station and the first base station, the mobile station may be automatically switched to the second base station for communication.

In this embodiment, a satellite based augmentation system may further be used to implement GPS navigation.

In this embodiment, the base station and the mobile station may further communicate by using a 1 or a technology.

Figure 15A:
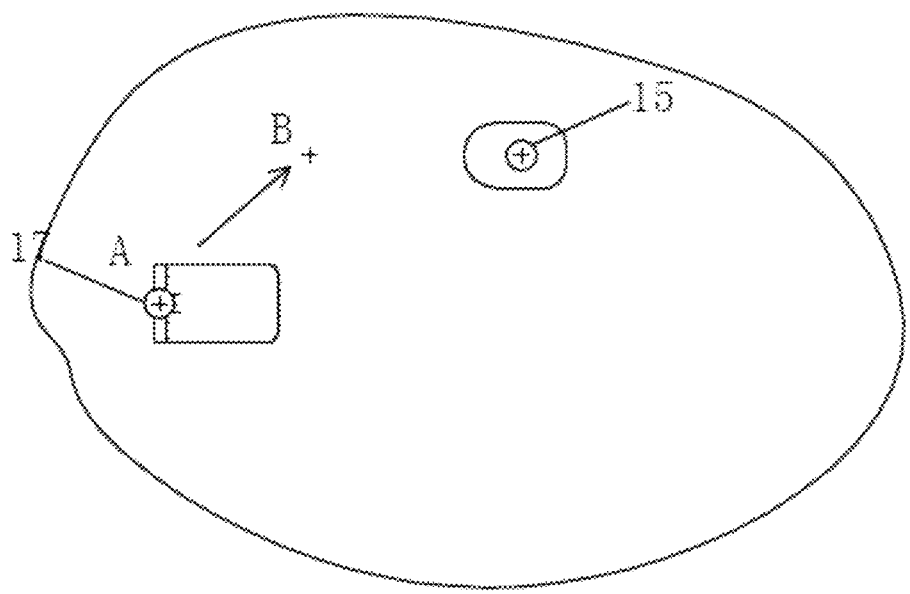
FIG. 15a, FIG. 15b, and FIG. 15c are principle diagrams of position correction by the base station according to the first embodiment of the present invention.
Figure 15B:
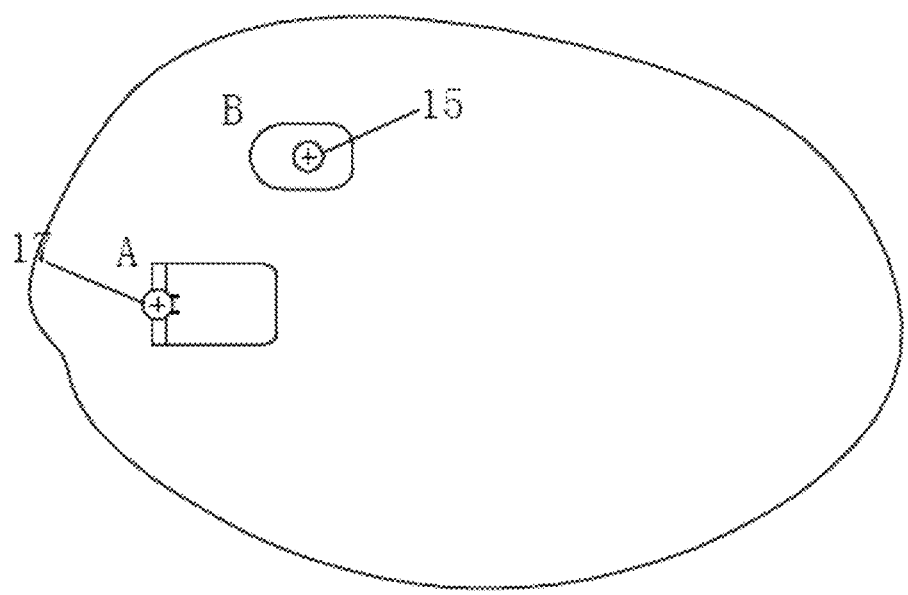
Figure 15C:
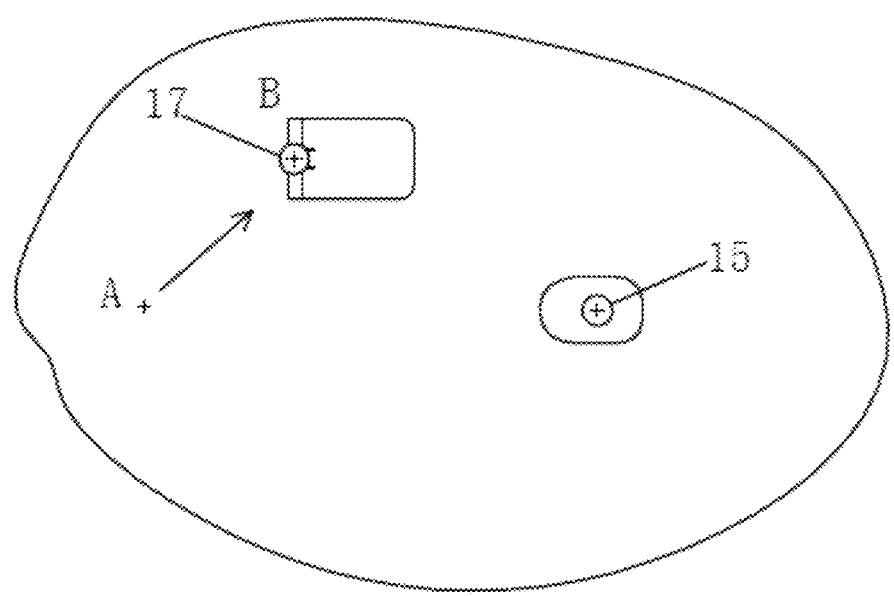
Figure 16:
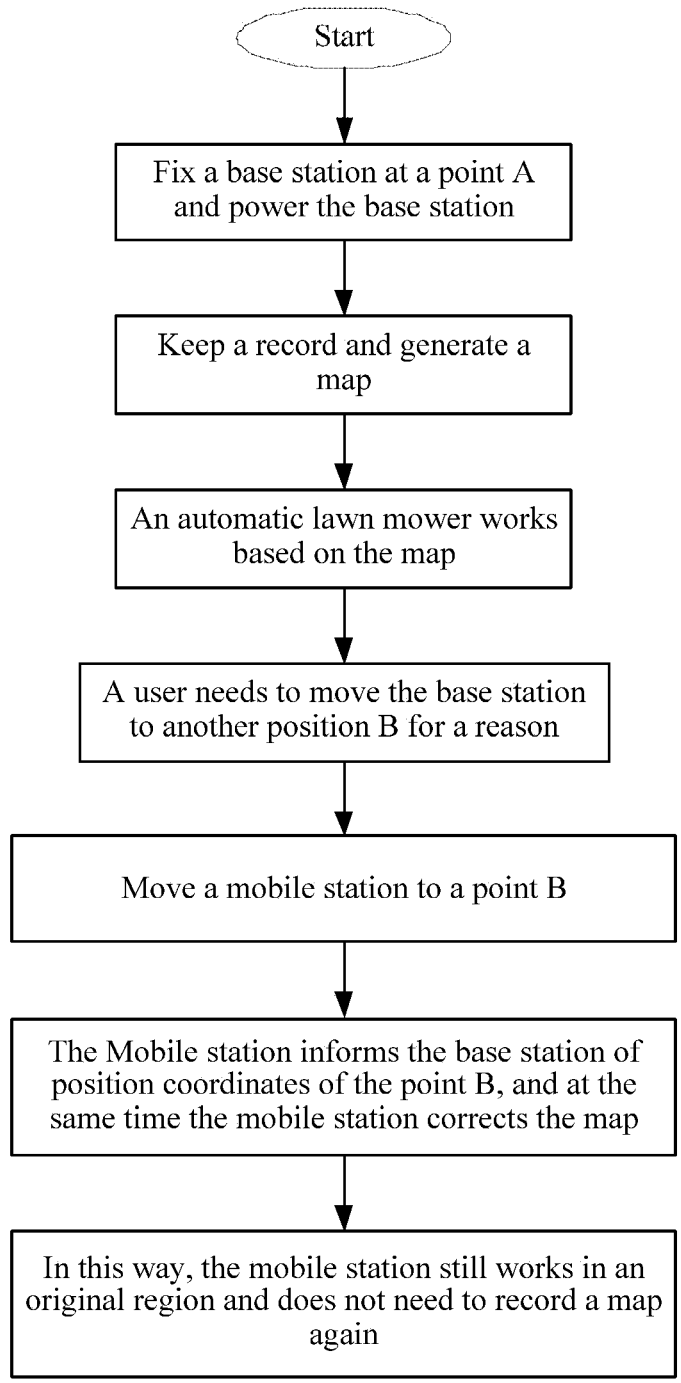
FIG. 16 is a flowchart of position correction by the base station according to the first embodiment of the present invention.

In this embodiment, GPS positioning is implemented based on that the base station is fixed at a position. When the base station moves, position coordinates output by the mobile station have an offset. To avoid the trouble of recording a map again after the base station moves, in this embodiment, the mobile station is used to obtain a movement position of the base station, and the obtained movement position is used to correct the generated map. Referring to FIG. 15 and FIG. 16, a map correction process is as follows: 1). The base station 17 is fixed at a point A, and the mobile station 15 keeps a record and generates a map. 2). As shown in FIG. 15(a), the user intends to move the base station 17 to another position B for a reason. For example, the user needs to build a flower bed at the point A. 3). As shown in FIG. 15(b), the mobile station 15 is moved to the point B, and the mobile station 15 sends position coordinates of the point B to the base station 17. 4). As shown in FIG. 15(c), the base station 17 is moved to the position B, and the base station 17 corrects its position. Meanwhile, the mobile station 15 learns of an offset of the position of the base station 17, and corrects the map according to the offset. The corrected map overlaps with the map before correction. Therefore, it is not necessary to record a map again.

In the first embodiment of the present invention, the mobile station includes a path generation module generating a path plan according to the map of the working region. First, the working region is divided according to the boundary, an obstacle, a passage or the like of the working region. With the division of the working region, the autonomous lawn mower implements more efficient coverage. For example, the working region is divided into two sub-working regions connected through a passage. When performing grass cutting work, the autonomous lawn mower first completes coverage in one of the sub-working regions, and then enters the other sub-working region through the passage to work. In this way, the autonomous lawn mower is prevented from working inefficiently for moving repeatedly between the two ends of the passage. In another example, based on two parts separated by an obstacle in the working region, the working region is divided into two sub-regions, and the autonomous lawn mower is prevented from encountering an obstacle frequently. According to the shape of the boundary, the boundary may further be divided into different sub-regions based on a part with a regular shape and a part with an irregular shape. In this way, the autonomous lawn mower may cover a regular sub-region by using a regular path and cover an irregular sub-region by using a random path. In this embodiment, an overlapping part is provided between adjacent sub-regions, to ensure coverage on the part between the adjacent sub-regions. In this embodiment, the area of a region in which the autonomous lawn mower can work one time is estimated according to the capacity of a battery pack to determine the size of a section. In this embodiment, the working region may further be divided according to the growth of plants, so that the autonomous lawn mower works at higher cutting power for a longer cutting time in a region with dense plants and works at lower cutting power for a shorter cutting time in a region with sparse plants. In this embodiment, the working region may further be divided according to the priorities of regions. For example, a front yard and a back yard of a user are different sub-regions, so that the autonomous lawn mower works in the front yard and the backyard by using different working strategies. Certainly, the working region may further be divided according to comprehensive factors such as a quantity of obstacles.

After region division is completed, a path of the autonomous lawn mower in each sub-region is planned. A preset path of the autonomous lawn mower in each sub-region may be a regular path such as parallel paths and a spiral path or may be a random path.

Figure 17:
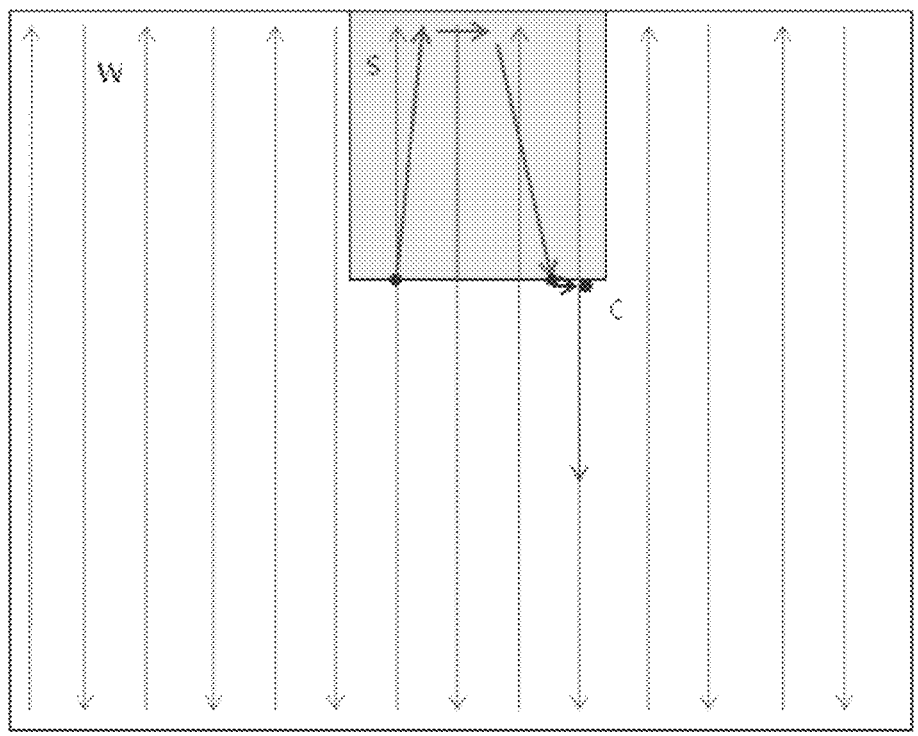
FIG. 17, FIG. 18, FIG. 19a, FIG. 19b, FIG. 20, FIG. 21a, and FIG. 21b are schematic diagrams of a movement path of an autonomous lawn mower according to the first embodiment of the present invention.

A sub-working region W shown in FIG. 17 includes a region S with a poor GPS signal, and the region S is represented by a shaded part. In this embodiment, the autonomous lawn mower is enabled to move along parallel paths in the sub-working region W. During generation of a path, parallel straight lines are drawn in the sub-working region W, and each parallel straight line is a preset path when the autonomous lawn mower is working. An interval between the parallel straight lines should be less than a cutting width of the autonomous lawn mower to ensure that cutting ranges of the autonomous lawn mower moving along adjacent parallel straight lines have an overlapping amount. When the autonomous lawn mower is working, the autonomous lawn mower is enabled to start to move from a region with strong a GPS signal. When moving to the boundary, the autonomous lawn mower turns around to move in an opposite direction. During working, if the autonomous lawn mower enters a region S with a poor GPS signal, because a positioning signal has low precision, the autonomous lawn mower cannot necessarily move along an original path. In this case, the autonomous lawn mower is allowed to move along a random path instead. In this embodiment, when the autonomous lawn mower leaves the region S with a poor GPS signal, the autonomous lawn mower is enabled to return to the originally planned path to continue moving. Specifically, when the autonomous lawn mower leaves the region S with a poor GPS signal, the navigation module outputs new position coordinates. The position coordinates are high precision position coordinates. In this case, the autonomous lawn mower compares the position coordinates with the originally planned path to find a closest point C on the planned path, moves to the point, and continues to move along the originally planned path. When finishing covering the working region, the autonomous lawn mower is then enabled to return to the shaded region to cover an uncovered region on the originally planned path, to ensure that the region is completely covered.

Figure 18:
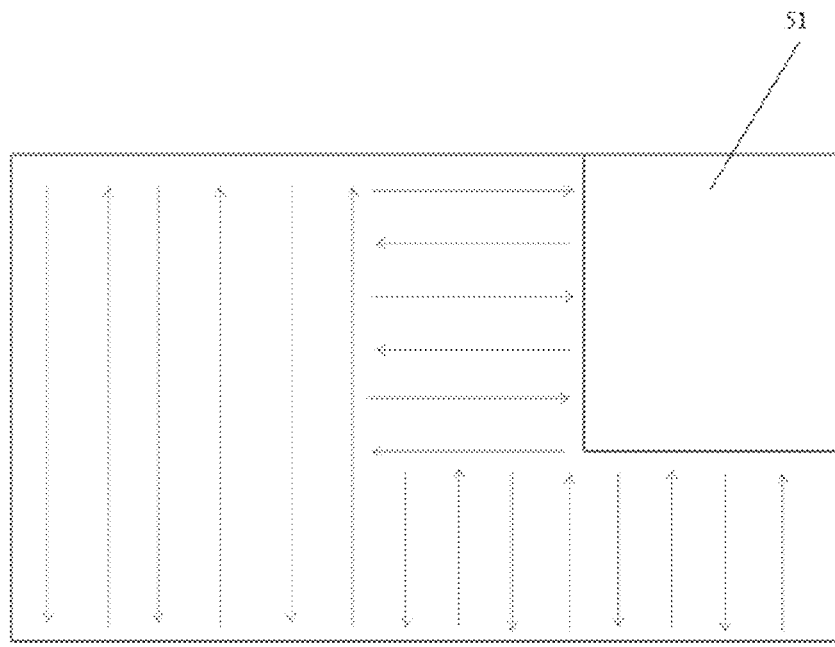

In this embodiment, different paths may be planned in a same sub-working region. A sub-working region D shown in FIG. 18 includes a building 51. It may be predicted that satellite signals are poor in a region near the building 51 due to blockage by the building, and the navigation module has low positioning precision. If the autonomous lawn mower moves on a path parallel to an edge of the building 51, when the autonomous lawn mower moves near the building 51, the navigation module keeps outputting low precision signals. As a result, the autonomous lawn mower may fail to move on a planned path, or move with low efficiency. To avoid the foregoing condition, a path in a region on an edge of the building 51 may be planned to be a path perpendicular to the edge of the building 51. In this way, the navigation module outputs a low precision signal only when the autonomous lawn mower is near an edge of the building 51. When the autonomous lawn mower is far away from an edge of the building 51, the navigation module outputs a high precision signal. When the autonomous lawn mower is near an edge of the building 51, satellite signals are poor, positioning errors of the inertial navigation apparatus accumulate, and the positioning precision gradually decreases. When the autonomous lawn mower is far away from an edge of the building 51, satellite signals become strong again and may be used to calibrate inertial navigation errors. Therefore, with the movement on such a path, it can be ensured that the navigation module outputs strong positioning signals most of the time. In this embodiment, a path plan is automatically generated by a path generation module, and certainly may be alternatively adjusted by the user according to the condition of the working region. Alternatively, the autonomous lawn mower may be adjusted during movement in real time according to the precision of a positioning signal. The case shown in FIG. 18 is used as an example. During movement, the autonomous lawn mower may adjust in real time directions of walking back and forth.

Figure 19A:
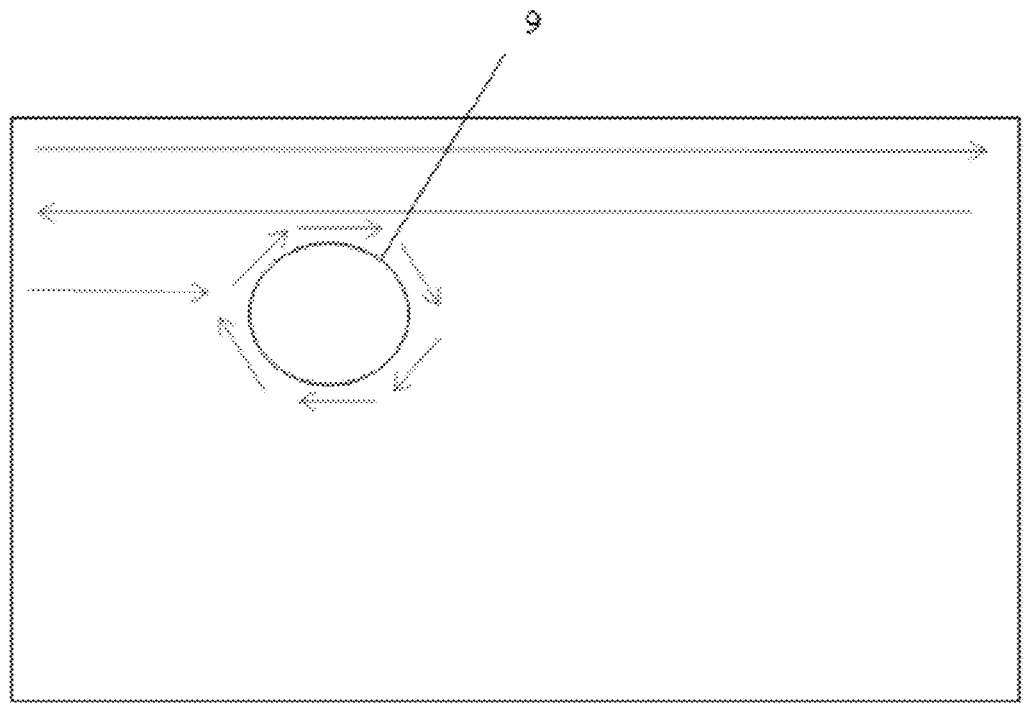
Figure 19B:
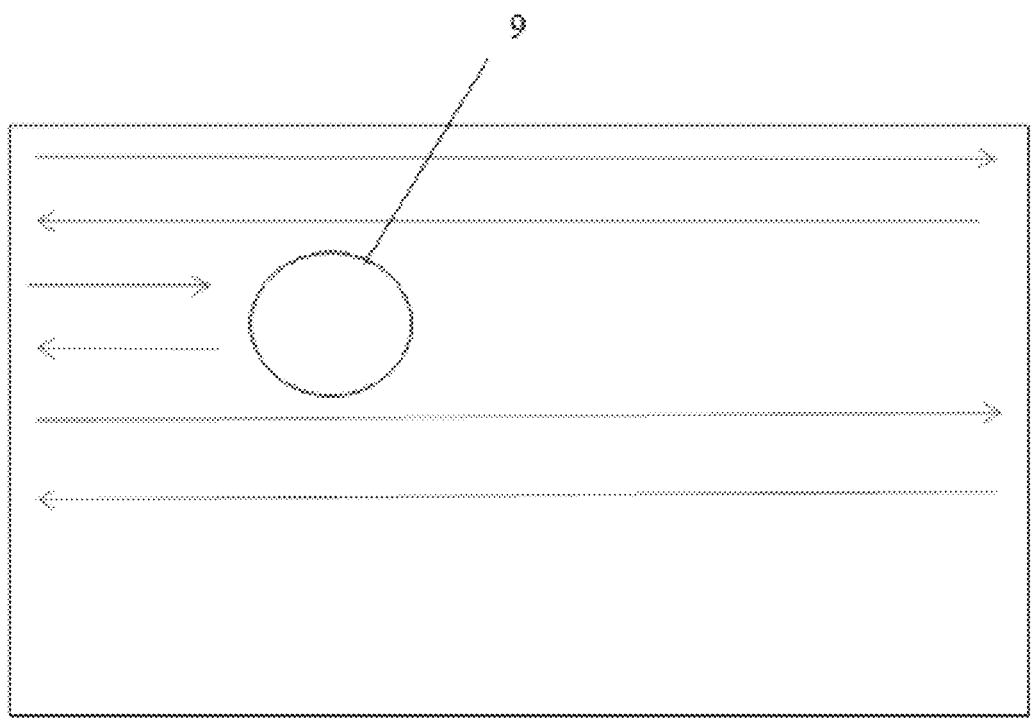

As shown in FIG. 19(a) and FIG. 19(b), in this embodiment, when encountering an obstacle, the autonomous lawn mower may move around the obstacle or may turn around. If the autonomous lawn mower moves around an obstacle when encountering the obstacle, the navigation module may be used to generate a vector image for moving around the obstacle.

In this embodiment, during the movement, the autonomous lawn mower can distinguish a moving obstacle from a fixed obstacle. The fixed obstacle is an obstacle having a fixed position in the working region, and is usually an obstacle recorded on the map. If the autonomous lawn mower repeatedly encounters an obstacle at a same position during movement but the obstacle is not recorded on the map, the autonomous lawn mower may determine that the obstacle is a newly found fixed obstacle. The moving obstacle is an obstacle that appears at an indefinite position in the working region, and is usually an obstacle that the autonomous lawn mower temporarily encounters during movement and appears at a same position occasionally. The moving obstacle may be a human, an animal or the like that appears in the working region. The autonomous lawn mower distinguishes a moving obstacle from a fixed obstacle according to whether an obstacle is recorded on the map or according to a frequency of encountering an obstacle at a same position, and uses different obstacle avoidance strategies. The obstacle avoidance strategies include moving around an obstacle, turning around, and the like.

In this embodiment, the autonomous lawn mower adjusts a movement range according to the condition of a positioning signal during movement. When the autonomous lawn mower moves to a position with poor positioning signals, the movement range is shrunk and the autonomous lawn mower continues moving within a small range or the autonomous lawn mower stops moving.

Figure 20:
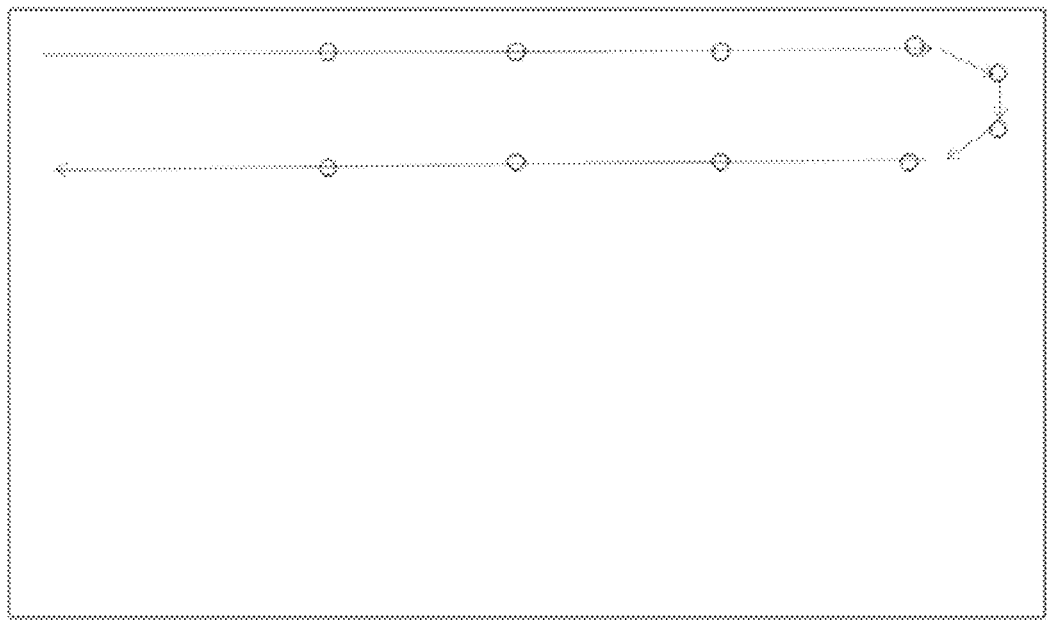

In this embodiment, the navigation module further includes a gyroscope configured to control the autonomous lawn mower to move along a straight line. When the autonomous lawn mower moves along a preset path, a gyroscope and a GPS positioning signal are used in combination to perform navigation. As shown in FIG. 20, a preset path is divided into a plurality of segments. When the autonomous lawn mower starts to move, a moving direction is determined. When moving on each segment, the autonomous lawn mower uses the gyroscope to perform navigation. The gyroscope is configured to control the autonomous lawn mower to move along a straight line, to prevent the moving direction of the autonomous lawn mower from offsetting. After the autonomous lawn mower completes movement on a segment of the path, a GPS positioning signal is used to calibrate a moving direction. Specifically, the control module determines whether the current position of the autonomous lawn mower is on the preset path. If the current position of the autonomous lawn mower is not on the preset path, the moving direction of the autonomous lawn mower is adjusted to enable the autonomous lawn mower to return to the preset path. When moving along a next segment of the path, the autonomous lawn mower moves along a straight line again in a calibrated direction by using the gyroscope. As the autonomous lawn mower moves, if determining that a distance by which the current position of the autonomous lawn mower offsets from the preset path is greater than a preset value, the control module may calibrate the moving direction of the autonomous lawn mower in real time, or may redraw segments.

Figure 21A:
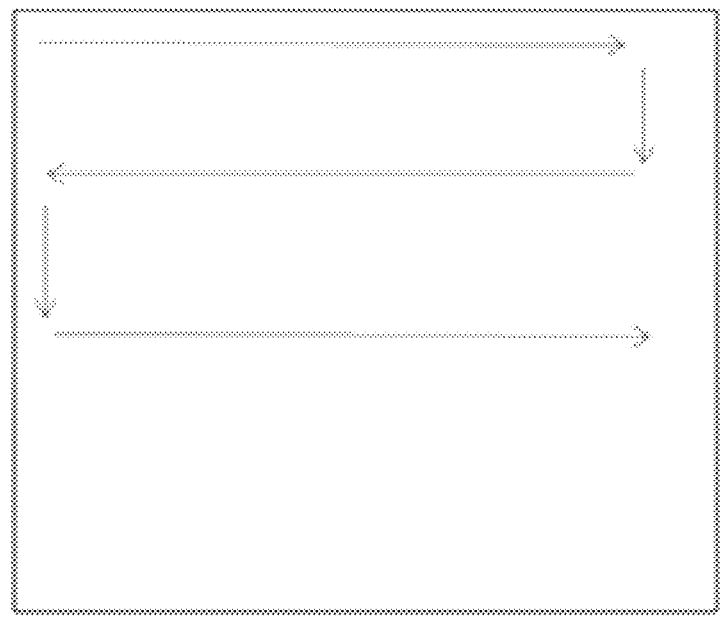
Figure 21B:
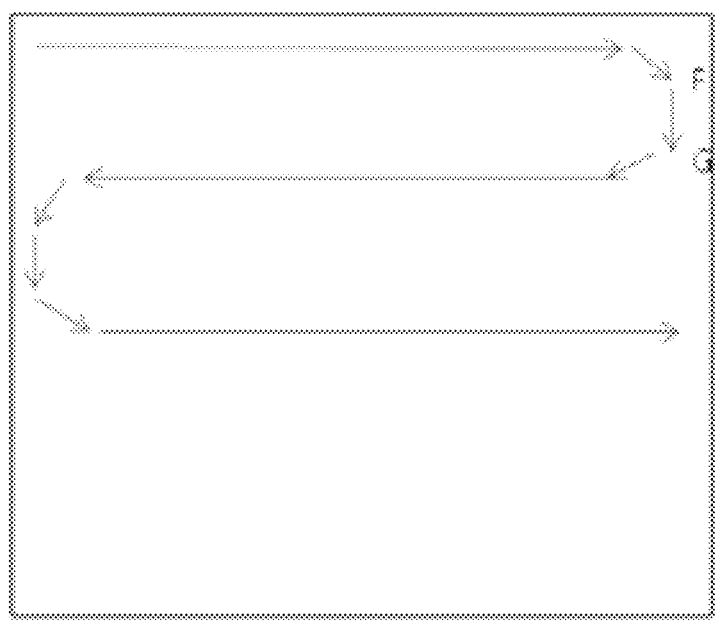

As shown in FIG. 21(*b*), in this embodiment, the autonomous lawn mower moves along parallel paths. When reaching the boundary, the autonomous lawn mower steers to move in an opposite direction. When steering, the autonomous lawn mower covers a plurality of points F and G between adjacent parallel paths, to ensure complete coverage, thereby avoiding a problem that a region near the boundary is not covered due to steering by a right angle (referring to FIG. 21(*a*)).

In this embodiment, as the autonomous lawn mower moves, if an exception occurs in communication between the base station and the mobile station, for example, communication is interrupted or a GPS signal is poor and as a result the navigation module keeps outputting low precision positioning signals, the autonomous lawn mower is controlled to adjust a movement manner. When the autonomous lawn mower adjusts the movement manner, the autonomous lawn mower is switched between working states. For example, the autonomous lawn mower is switched to a random walking mode, or returns to the charging station, or enters a search mode to search for strong satellite signals. Alternatively, when the autonomous lawn mower adjusts the movement manner, the autonomous lawn mower enables the task execution module to stop working, reverse, steer, stop or perform another operation.

Figure 22:
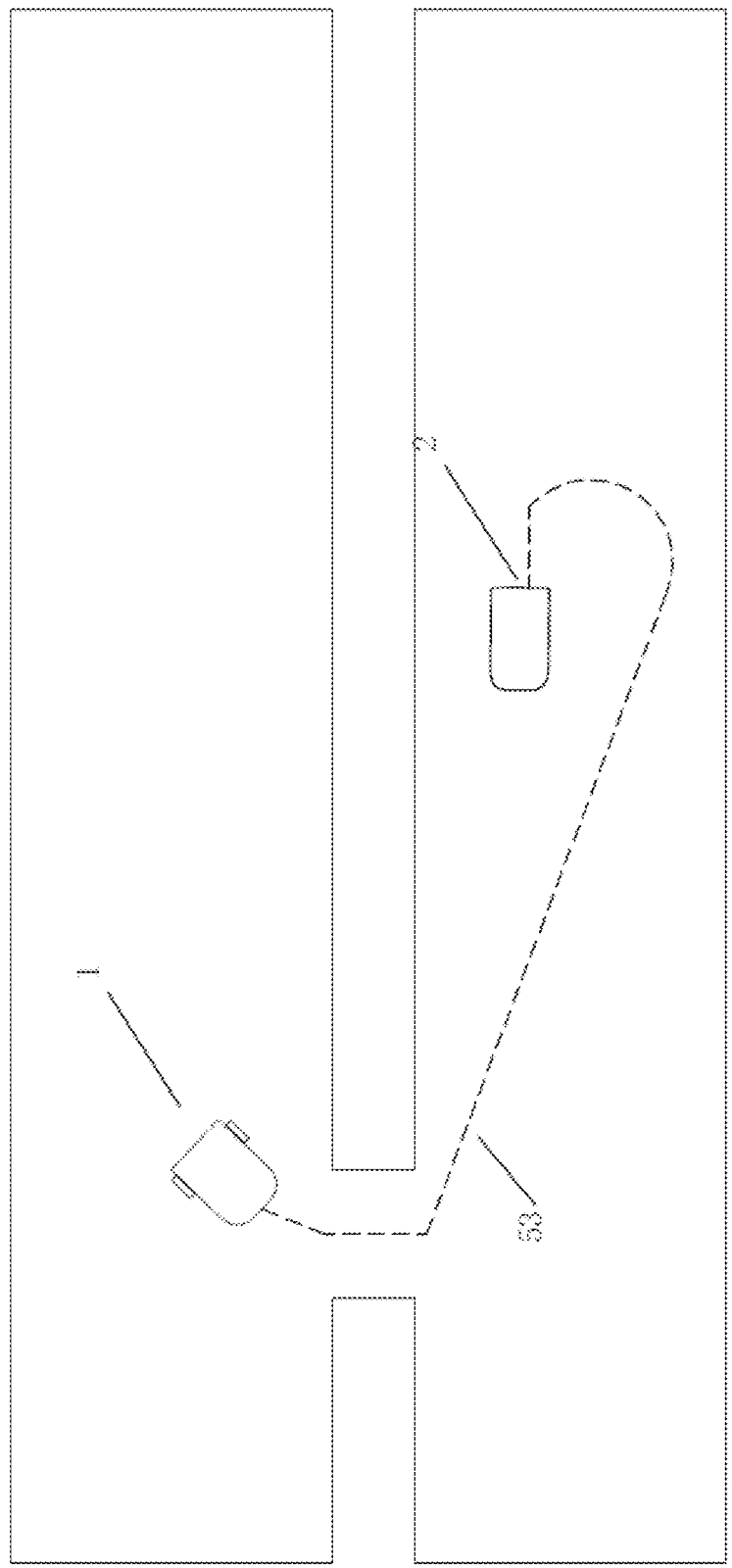
FIG. 22, FIG. 23, and FIG. 24 are schematic diagrams of a return path of an autonomous lawn mower according to the first embodiment of the present invention.

In this embodiment, a path generation module is further configured to generate a return path. The working region shown in FIG. 22 is used as an example, and currently the charging station 2 is located inside the working region. When the autonomous lawn mower 1 needs to return to the charging station 2, a path generation module computes a shortest path from the autonomous lawn mower 1 to the charging station 2 according to the current position information of the autonomous lawn mower 1 and the map information and generates a return path 53. The control module controls the autonomous lawn mower 1 to move along the return path 53 to return to the charging station 2. The computation of the shortest path is related to the position of the charging station 2, and is further related to obstacle distribution in the working region and whether there is a passage between the autonomous lawn mower 1 and the charging station 2. The autonomous lawn mower 1 passes through the fewest raster cells when moving along the shortest path. In this embodiment, the control module records the return path of the autonomous lawn mower 1. When the autonomous lawn mower 1 starts to return again, the control module compares a newly generated return path with a previous return path or several previous return paths to determine whether an overlapping part exists between the newly generated return path and the previous return path or the several previous return paths. If an overlapping part exists, the return path is modified to avoid an overlap of a return path. For example, a part of the return path is offset by a distance. By using the foregoing method, if the autonomous lawn mower 1 needs to pass through a passage when returning to the charging station 2, an overlap of a part of path from the passage to the charging station 2 can be effectively avoided, thereby preventing the autonomous lawn mower 1 from repeatedly returning along a same segment of the path to crush the lawn.

Figure 23:
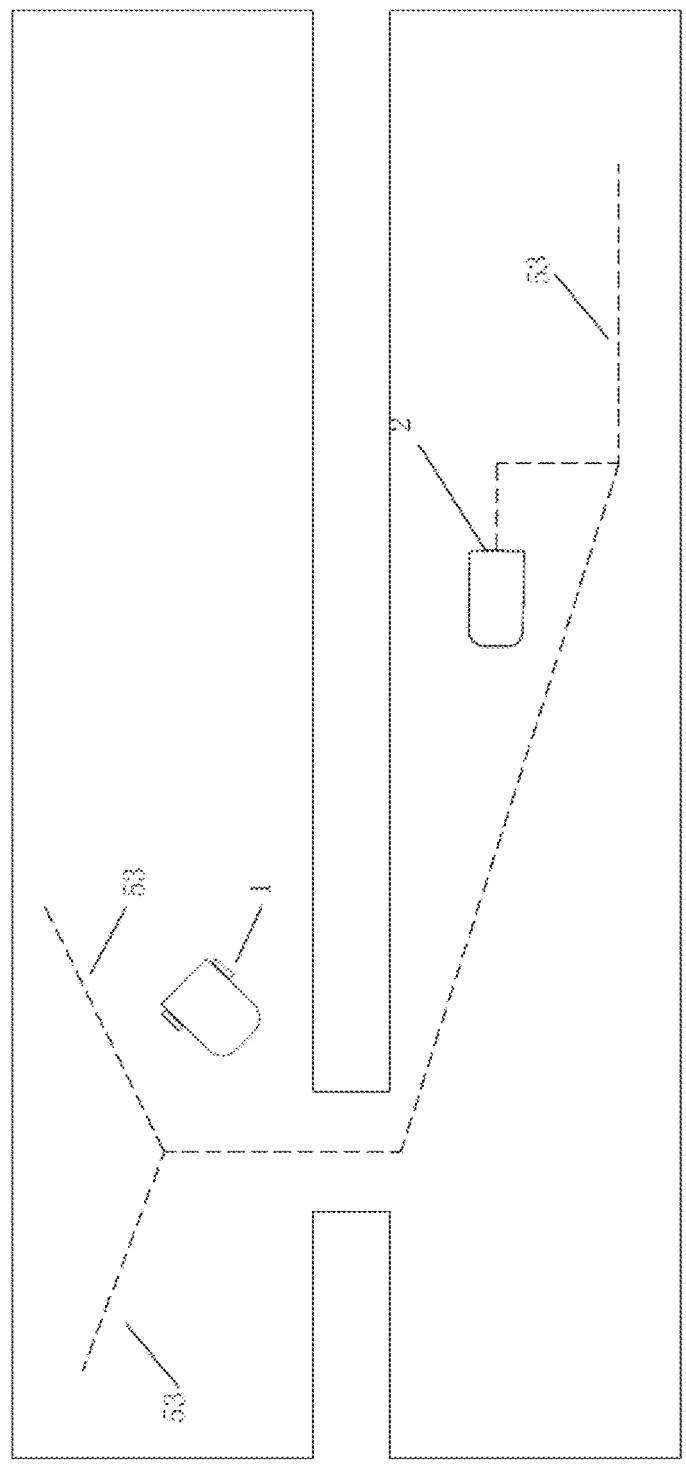

In an eighth embodiment of the present invention, a method for generating a return path by the path generation module is different from the method in the first embodiment. As shown in FIG. 23, after the map generation module generates the map, a path generation module sets several return paths 53 according to the generated map. When needing to return to the charging station 2, the autonomous lawn mower 1 moves to one of the return paths 53. Specifically, the control module determines shortest distances from the autonomous lawn mower 1 to the several return paths 53, selects a closest return path 53, and controls the autonomous lawn mower 1 to move to the latest return path 53 along a path with the shortest distance and return to the charging station 2 along the return path 53. Certainly, the autonomous lawn mower 1 may alternatively move to the latest return path 53 randomly. Alternatively, when needing to return to the charging station 2, the autonomous lawn mower 1 moves randomly, and when the control module determines that the autonomous lawn mower 1 is located on one of the return paths 53, the autonomous lawn mower 1 is controlled to return to the charging station 2 along the return path 53. By using the foregoing method, the autonomous lawn mower 1 can be prevented from returning along a same path to crush the lawn. It may be understood that a return path may be alternatively recorded by the user during map recording. Specifically, the user holds the mobile station and moves from different positions in the working region to the charging station, and positions covered by the movement are recorded to form the return path.

Figure 24:
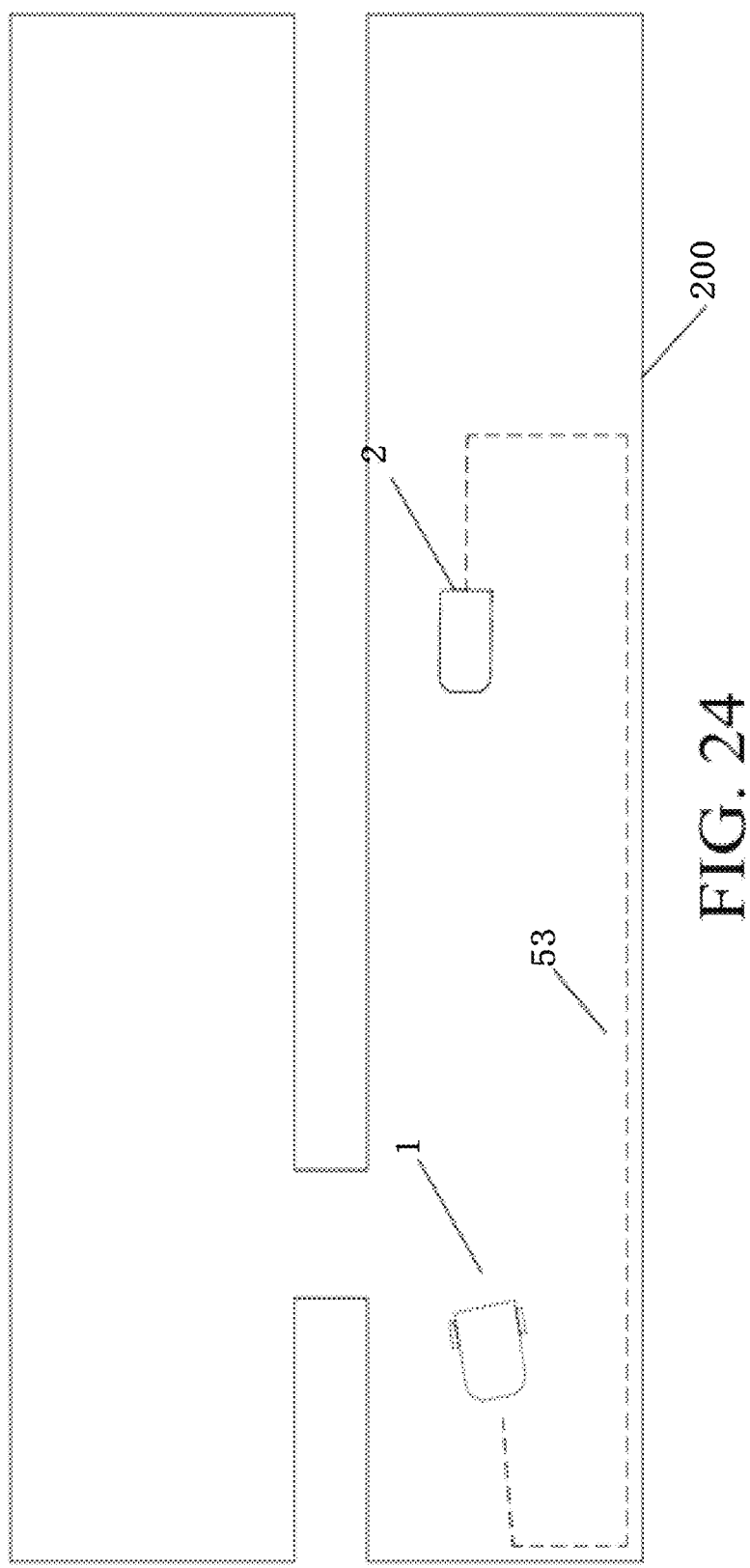

In a ninth embodiment of the present invention, a method for generating a return path by the path generation module is different from the method in the first embodiment. As shown in FIG. 24, when needing to return to the charging station 2, the autonomous lawn mower 1 first moves to the boundary 200, moves to the position of the charging station 2 along the boundary 200, and then moves to the charging station 2. Specifically, the path generation module determines a point, on the boundary 200, having the shortest distance from the autonomous lawn mower 1 according to the current position of the autonomous lawn mower 1 and the position of the boundary 200, connects the current position of the autonomous lawn mower 1 and the point to form a first segment of the path, computes, according to the position of the point and the position of the charging station 2, the shortest path for the autonomous lawn mower 1 to move from the point along the boundary 200 and then move from the boundary 200 to a position right in front of the charging station 2, generates a second segment of the path according to the computed shortest path, and joins the first segment of the path and the second segment of the path to generate the return path 53. In this embodiment, when the charging station 2 is located on the boundary 200, the autonomous lawn mower 1 can directly move to the position right in front of the charging station 2 along the boundary 200. When the charging station 2 is not located on the boundary 200, the autonomous lawn mower 1 moves near the charging station 2 along the boundary 200 and then moves to the position right in front of the charging station 2. In this embodiment, the autonomous lawn mower 1 moves along the boundary 200 on a different path each time. Specifically, the autonomous lawn mower 1 moves along the boundary 200 at a variable distance from the boundary 200. That is, during each return, the autonomous lawn mower 1 moves along the boundary 200 at a different distance from the boundary 200. In this way, the autonomous lawn mower 1 can be prevented from returning along the boundary 200 at a fixed distance to crush the lawn.

In the first embodiment of the present invention, after the autonomous lawn mower 1 moves to the position right in front of the charging station 2, for example, at about 1 m in front, a docking process is started. Because a docking angle, a tilt angle, and the like are recorded during map recording, the autonomous lawn mower 1 may be docked in a constant direction based on the information, so that a docking error is mitigated.

In the first embodiment of the present invention, the autonomous lawn mower may further automatically determine a work schedule according to properties such as an area and a shape of the map. The work schedule includes a work time for each sub-region, a work order for the sub-regions, a quantity of times of covering each sub-region, and the like.

In this embodiment, a GPS clock may be used to replace a clock chip.

In this embodiment, the navigation module and the environment detection sensor are combined to address safety issues. The environment detection sensor includes a step sensor, a lawn sensor, an optical sensor, a camera, a radar, an ultrasound sensor, a collision detection sensor, and the like. When the environment detection sensor detects an abnormal environment, the navigation module is used to record the current position and a corresponding exception on the map. When the autonomous lawn mower moves to the position, the movement manner of the autonomous lawn mower is adjusted to avoid a safety accident.

In this embodiment, the map and the path are respectively generated by the map generation module and the path generation module of the mobile station. It may be understood that in another embodiment, the control module of the autonomous lawn mower acquires position coordinates recorded by the mobile station, and the control module may generate the map and the path.

In a tenth embodiment of the present invention, the charging station is a wireless charging station. The autonomous lawn mower can approach the charging station in any direction to perform docking. Therefore, according to the current position of the autonomous lawn mower and the position of the charging station, the GPS navigation guide can conveniently guide the autonomous lawn mower to return to charging station and to be docked to the charging station.

The present invention is not limited to the discussed specific embodiments. All structures and methods based on the concept of the present invention fall within the protection scope of the present invention.

Persons of ordinary skill in the art may further appreciate that, in combination with the examples described in the embodiments herein, units and algorithm steps can be implemented by electronic hardware or a combination of computer software and electronic hardware. Whether these functions are performed using hardware or software depends on particular applications and design constraints of the technical solutions. A person skilled in the art may use different methods to implement the described functions for each specific application. However, such implementation should not be considered as beyond the scope of the present invention.

Persons skilled in the art can clearly understand that, for convenience and simplicity of description, for the specific work process of the systems, devices, and units described above, refer to the corresponding process in the aforementioned method embodiments, which are not described herein again.

In the embodiments provided by the present application, it should be understood that the systems, devices, and methods disclosed may be implemented in other forms. For example, the device embodiments described above are merely exemplary. For example, the division of units is merely logical functional division, and there are other division forms in real application. For example, multiple units or components may be combined or be integrated to another system, or some features may be ignored or not be executed. In another aspect, the coupling, direct coupling, or a communication connection there between which is displayed or discussed may be indirect coupling or a communication connection of interfaces, devices, or units, and may be electrical, mechanical, or in other forms.

Units described as separate components may be or may not be physically separated. Components shown as units may be or may not be physical units, that is, may be integrated or distributed to a plurality of network units. Some or all of the modules may be selected to achieve the objective of the solution of the embodiment according to actual requirements.

In addition, the functional units in the embodiments of the present invention may either be integrated in a processing unit, or each be a separate physical unit; alternatively, two or more of the units are integrated in one unit.

If implemented in the form of software functional units and sold or used as an independent product, the functions may also be stored in a computer readable storage medium. Based on this, the above technical solution or the part that makes contributions to the prior art can be substantially embodied in the form of a software product. The computer software product may be stored in the storage medium and contain several instructions to instruct computer equipment (for example, a personal computer, a server, or network equipment) to perform all or a part of the steps of the method described in the embodiments of the present invention. The storage medium may be any medium that is capable of storing program code, such as a USB flash drive, a removable hard disk, a read-only memory (ROM), a RAM (RAM, Random Access Memory), a magnetic disk or an optical disk.

The above descriptions are merely specific embodiments of the present invention, but not intended to limit the scope of the present invention. Any variations or replacement that can be easily derived by those skilled in the art should fall within the scope of the present invention. Therefore, the protection scope of the present invention is subject to the appended claims.

In view of the problem in the prior art that after a base station moves, position coordinates output by a mobile station have an offset, and a map of the working region needs to be regenerated, resulting in relatively complex steps, in this embodiment of the present invention, before an absolute position of the base station changes, the mobile station acquires a first relative position with respect to the base station. Next, before and after the absolute position of the base station changes, the mobile station is kept at a same absolute position, and after the absolute position of the base station changes, the mobile station acquires a second relative position with respect to the base station, so that the mobile station may update the map of the working region of the mobile station according to the first relative position and the second relative position, or, instruct the base station to update a stored absolute position of the base station, where points on the map are used to indicate relative positions with respect to the base station. Accordingly, the mobile station does not need to repeat a process of moving along a boundary of the working region to generate the map when a position of the base station changes, Next, a correction value is used to correct the map of the working region, so that it is not necessary to regenerate a map, and operation steps are simplified.

The position information processing method based on a differential positioning technology in this embodiment of the present invention and the mobile station are described below with reference to the accompanying drawings.

Figure 25:
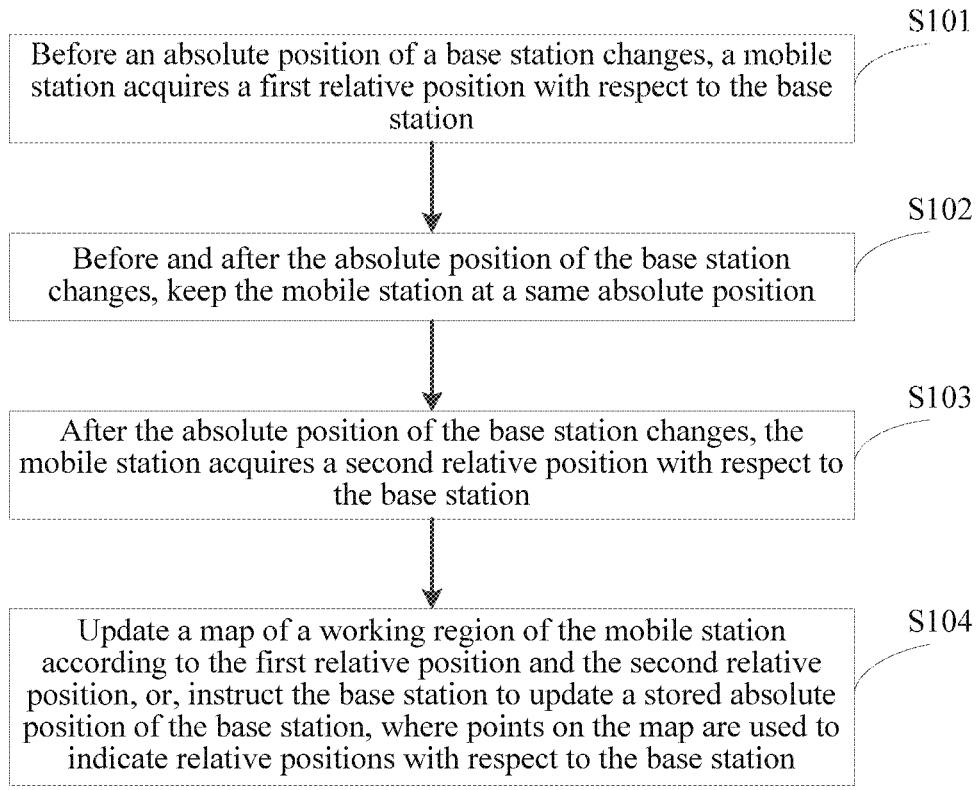
FIG. 25 is a schematic flowchart of a first position information processing method based on a differential positioning technology according to an embodiment of the present invention.

FIG. 25 is a schematic flowchart of a first position information processing method based on a differential positioning technology according to an embodiment of the present invention. The position information processing method based on a differential positioning technology is applicable to a navigation module. The navigation module includes a base station and a mobile station for resolving a relative position with respect to the base station according to differential information sent by the base station.

In this embodiment of the present invention, the mobile station and the base station may both receive a satellite signal. The base station may send a positioning correction signal to the mobile station, to implement differential satellite positioning. For example, the base station and the mobile station may receive a GPS signal to implement DGPS positioning, or, the base station and the mobile station may alternatively receive a Galileo satellite navigation system signal, a Beidou satellite navigation system signal, a GLONASS signal or the like. This is not limited in this embodiment of the present invention.

It should be noted that the DGPS technology includes an RTK technology, that is, a carrier-phase differential technology and a CORS technology.

In this embodiment of the present invention, for example, the base station and the mobile station receive a GPS signal. Specifically, both the base station and the mobile station may include a GPS antenna. The base station and the mobile station may receive a GPS signal by using the GPS antenna.

As shown in FIG. 25, the position information processing method based on a differential positioning technology includes the following steps.

S101: Before an absolute position of the base station changes, the mobile station acquires a first relative position with respect to the base station.

The absolute position is an absolute position with respect to the Earth.

In this embodiment of the present invention, the base station and the mobile station may separately include a communications module. The base station and the mobile station may communicate with each other by using the communications modules. The communications module may include a radio station and a radio station antenna. Further, to ensure reliable long-distance transmission between the base station and the mobile station, the communications module may further include a Sub-1G module, a Wi-Fi module, and a 2G/3G/4G/5G module. This is not limited.

Optionally, after receiving a GPS signal by using the GPS antenna, the base station may send the differential information to the mobile station by using the communications module of the base station. Correspondingly, the mobile station may receive the differential information of the base station by using the communications module corresponding to the base station. Meanwhile, the mobile station may receive the GPS signal by using the GPS antenna. Next, the mobile station may resolve relative position coordinates of the mobile station with respect to the base station according to the differential information sent by the base station. The relative position coordinates are referred to as the first relative position in this embodiment of the present invention. The first relative position may include information such as longitude, latitude, and altitude.

In this embodiment of the present invention, before working, the mobile station needs to generate a map of a working region.

In a first possible implementation of this embodiment of the present invention, a user may hold the mobile station and walk to record the map. The recording the map includes the following steps: The user may start to walk along a boundary of the working region from a starting point, for example, the position of the charging station, and the mobile station may record position coordinates of the boundary; the user walks along an obstacle in the working region, and the mobile station may record position coordinates of an obstacle; the user walks along a traffic island in the working region, and the mobile station may record position coordinates of the traffic island; and the user walks along a passage connecting sub-working regions of the working region, and the mobile station may record position coordinates of the passage.

In a second possible implementation of this embodiment of the present invention, the mobile station may be installed on the self-moving device. For example, the mobile station may be detachably connected to the housing of the self-moving device, so that the mobile station may move synchronously with the self-moving device. The self-moving device may be an unattended device such as an autonomous lawn mower, an automatic cleaning device, an automatic irrigation device, and an automatic snowplow. To record the map, the mobile station may be installed on the self-moving device. The user may use an autonomous terminal such as a mobile phone and a tablet device to remotely control the self-moving device to move, so that the mobile station may record coordinates of the position points. Similarly, the step of recording the map includes recording a boundary of the working region, an obstacle in the working region, a passage connecting sub-regions or the like.

In a third possible implementation of this embodiment of the present invention, the self-moving device may include a pushing rod detachably installed at the housing of the self-moving device. To record the map, the mobile station is installed on the self-moving device. The pushing rod is installed at the housing of the self-moving device, and the user operates the pushing rod to push the self-moving device to move, so that the mobile station may record a boundary of the working region, an obstacle, a passage or the like.

In a fourth possible implementation of this embodiment of the present invention, the self-moving device may include an ultrasonic apparatus, so that the self-moving device may follow the user at a distance. To record the map, the mobile station is installed on the self-moving device, the user walks along a boundary of the working region, an obstacle, a passage or the like, and then the self-moving device may follow the user, so that the mobile station may record the map.

In a fifth possible implementation of this embodiment of the present invention, to record the map, the mobile station is separated from the self-moving device, and the mobile station is placed on a pushable cart. For example, the mobile station may be installed on a hand-propelled device, and the user pushes a cart and walks, so that the mobile station may record a boundary of the working region, an obstacle, a passage or the like.

In this embodiment of the present invention, a preset coordinate system, for example, a Cartesian coordinate system XY, may be established to generate the map. Specifically, the first point from which recording is started is used as the origin (0, 0) of the coordinate axes. For example, the position of the charging station may be used as the origin (0, 0) of the coordinate axes. The position coordinates that correspond to the origin and are output by the mobile station are $(x_0, y_0)$. As the user records the map, the mobile station outputs position coordinates $(x_1, y_1)$, and converts the position coordinates $(x_1, y_1)$ into $(x_1-x_0, y_1-y_0)$ when generating the map, so as to convert a satellite positioning coordinate system into the Cartesian coordinate system.

It should be noted that, on the map of the working region generated by the mobile station, absolute coordinates, that is, the latitude and longitude, of position points with respect to the Earth may be recorded, or, coordinates in the coordinate system XY may be recorded. This is not limited.

S102: Before and after the absolute position of the base station changes, keep the mobile station at a same absolute position.

In this embodiment of the present invention, GPS positioning is implemented based on that the base station is fixed at a position. During actual application, the user may change the position of the base station as required. For example, referring to FIG. 26a, it is assumed that the base station is located at a point A before the absolute position of the base station changes. When the user intends to build a flower bed at the point A, in this case, the user may move the base station to another idle position. For example, referring to FIG. 26b, the user may move the base station to the point B. Position coordinates output by the mobile station have an offset when the absolute position of the base station changes. In this case, the mobile station needs to record a map again. To avoid the trouble of recording a map again by the mobile station after the base station is moved, in this embodiment of the present invention, the mobile station may be kept at the same absolute position. Next, the mobile station is used to acquire a movement position of the base station, and the obtained movement position is further used to correct the generated map.

S103: After the absolute position of the base station changes, the mobile station acquires a second relative position with respect to the base station.

In this embodiment of the present invention, after the absolute position of the base station changes, for example, the base station is moved to the point B, the base station may receive a GPS signal at the point B by using the GPS antenna. Next, the base station may send differential information to the mobile station by using the communications module of the base station. Correspondingly, the mobile station may receive the differential information of the moved base station by using the communications module corresponding to the base station. Meanwhile, the mobile station may receive the GPS signal by using the GPS antenna. Next, the mobile station may resolve relative position coordinates of the mobile station with respect to the base station after movement according to the differential information sent by the base station. The relative position coordinates are referred to as the second relative position in this embodiment of the present invention. The second relative position may similarly include information such as longitude, latitude, and altitude.

S104: Update the map of the working region of the mobile station according to the first relative position and the second relative position, or, instruct the base station to update a stored absolute position of the base station, where points on the map are used to indicate relative positions with respect to the base station.

In a possible implementation, in this embodiment of the present invention, first correction information used to indicate a displacement amount of the base station may be generated according to the first relative position and the second relative position. Specifically, the first correction information $\vec{r}$ may be generated according to relative position coordinates $(x_1, y_1)$ of the first relative position in a preset coordinate system, for example, the Cartesian coordinate system XY and relative position coordinates $(x_2, y_2)$ of the second relative position in the coordinate system XY, and the first correction information $\vec{r}$ is:

$$\vec{r} = (x_1 - x_2)\vec{i} + (y_1 - y_2)\vec{j} \qquad (1).$$

After generating the first correction information $\vec{r}$, the mobile station may send the first correction information $\vec{r}$ to the base station, so that the base station determines the updated absolute position of the base station according to the absolute position of the base station before movement and the first correction information $\vec{r}$. Specifically, vector addition may be performed on the absolute position of the base station before movement and the first correction information $\vec{r}$ to obtain the updated absolute position of the base station. In this way, the base station may generate the differential information according to the updated absolute position of the base station. Further, the mobile station may resolve the relative position of the moved base station according to the differential information sent by the moved base station, and update the position of the base station on the map.

In another possible implementation, in this embodiment of the present invention, second correction information used to indicate a relative position change amount of the mobile station with respect to the base station may be generated to the first relative position and the second relative position. Specifically, the second correction information $(-\vec{r})$ may be generated according to relative position coordinates $(x_1, y_1)$ of the first relative position in the preset coordinate system, for example, the Cartesian coordinate system XY and relative position coordinates $(x_2, y_2)$ of the second relative position in the coordinate system XY, so that the second correction information $(-\vec{r})$ is:

$$-\vec{r} = (x_2 - x_1)\vec{i} + (y_2 - y_1)\vec{j} \quad (2).$$

After generating the second correction information $(-\vec{r})$, the mobile station may update a working map according to the second correction information. Specifically, vector addition may be performed on a position vector of each point on the map before update in the coordinate system XY and the second correction information $(-\vec{r})$ to obtain an updated position vector of each point on the map, so as to obtain the updated map.

In this embodiment, the used DGPS technology is an RTK technology, that is, a carrier-phase differential technology, and the mobile station performs computation by using a carrier-phase algorithm.

In the position information processing method based on a differential positioning technology in this embodiment, before an absolute position of a base station changes, a mobile station acquires a first relative position with respect to the base station. Next, before and after the absolute position of the base station changes, the mobile station is kept at a same absolute position, and after the absolute position of the base station changes, the mobile station acquires a second relative position with respect to the base station, so that the mobile station may update a map of a working region of the mobile station according to the first relative position and the second relative position, or, instruct the base station to update a stored absolute position of the base station, where points on the map are used to indicate relative positions with respect to the base station. Accordingly, the mobile station does not need to repeat a process of moving along a boundary of the working region to generate the map when a position of the base station changes, so that operation steps are simplified.

Figure 26A:
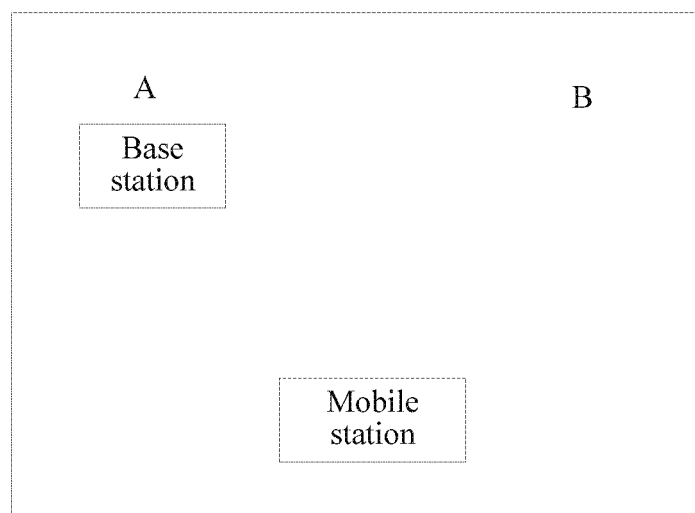
FIG. 26a is a schematic diagram of positions before a base station moves according to an embodiment of the present invention.

To clearly describe this embodiment, an operation process in a case in which a base station is moved is described below from the perspective of use of a user. The operation process includes:

1) The base station is fixed at a point A shown in FIG. 26a. The base station is powered, to enable the base station to send a differential signal to the mobile station.

2) The mobile station is started to enable the mobile station to load a map of a working region and acquire a precise relative position of the mobile station according to the differential signal. In some application scenarios, the mobile station or a self-moving device installed with the mobile station has a display screen, so that the relative position of the mobile station may further be displayed on the map of the working region. Alternatively, in some other application scenarios, neither the mobile station nor the self-moving device installed with the mobile station has a display screen, and the relative position of the mobile station and the map of the working region may further be sent to a specific terminal device to enable the terminal device to display the relative position of the mobile station on the map of the working region.

3) The self-moving device installed with the mobile station is controlled to move and work inside the working region. For example, if the self-moving device is a lawn mower, the lawn mower may be controlled to move and cut grass inside the working region. During drawing of the map of the working region, a virtual boundary for avoiding an obstacle is drawn, and the mobile station can acquire the relative position of the mobile station with respect to the base station. Therefore, during working, the self-moving device can be navigated inside the virtual boundary according to the relative position of the mobile station, so as to avoid the obstacle.

Figure 26B:
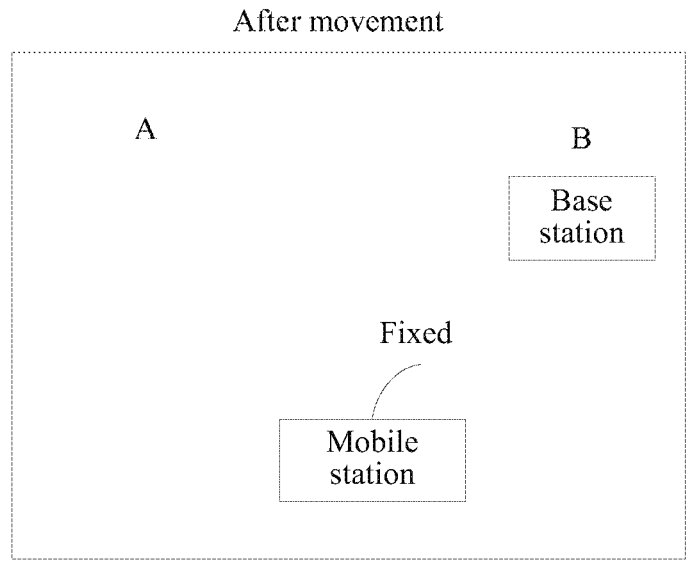
FIG. 26b is a schematic diagram of positions after a base station moves according to an embodiment of the present invention.

4) The base station is moved from the point A shown in FIG. 26a to a fixed point B shown in FIG. 26b. The base station is powered to enable the base station to send a differential signal to the mobile station. As the base station moves from the point A to the point B, an absolute position of the mobile station is kept the same, that is, the mobile station is not moved.

For example, if the self-moving device is in a working state of moving inside the working region before the base station is moved from the point A to the point B, the self-moving device is controlled to pause or finish working, and after the self-moving device is kept still, the base station is moved from the point A to the point B.

5) If the mobile station is kept at the same absolute position, the map of the working region of the mobile station is updated.

In some scenarios, the mobile station has a virtual button or a mechanical button configured to update the map. The user may click the virtual button or mechanical button configured to update the map to enable the mobile station to update the map.

It should be noted that as an alternative solution for updating the map, in some other scenarios, the mobile station has a virtual button or mechanical button configured to instruct the base station to update a stored absolute position of the base station. The user may click the virtual button or mechanical button to enable the mobile station to instruct the base station to update the stored absolute position of the base station.

6) After the mobile station finishes updating the map, the self-moving device installed with the mobile station is controlled to start again to move and work inside the working region.

It may be seen that in the foregoing operation process, the user does not need to operate the mobile station to enable the mobile station to move along the boundary of the working region to generate the map, so the operation steps of the user are simplified, thereby resolving a technical problem in the prior art that after the base station moves, position coordinates output by the mobile station have an offset, and the map of the working region needs to be regenerated, resulting in relatively complex steps.

To avoid unnecessary update of the map and the absolute position of the base station, in this embodiment of the present invention, if the mobile station is kept at the same absolute position, when the mobile station resolves, according to the differential information sent by the base station, that a relative position change amount with respect to the base station is greater than a first offset threshold, and/or, the base station determines, according to the acquired GPS signal, that an absolute position change amount is greater than a second offset threshold, it may be determined that the base station is in an abnormal state. The abnormal state herein is specifically an absolute position change.

The step of updating the map of the working region of the mobile station is or updating the absolute position of the base station is only performed if the mobile station determines that the base station is in an abnormal state.

The first offset threshold may be preset in a built-in program of the mobile station, or, the first offset threshold may be set by the user. The second offset threshold may be preset by a built-in program in the base station, or, the second offset threshold may be set by the user. This is not limited. It should be understood that when the user moves the base station as required, the movement distance is limited. Therefore, the first offset threshold and the second offset threshold should not be set excessively large.

Specifically, it may be necessary to move the base station in several scenarios in the following:

Scenario 1

The user needs to move the base station. For example, the user needs to build a flower bed at the point A shown in FIG. 26a, so that the base station needs to be moved from the point A to another position, for example, the point B shown in FIG. 26b.

After the user moves the base station, if the mobile station resolves, according to the differential information sent by the base station, that a relative position change amount with respect to the base station is greater than the first offset threshold, and/or, the base station determines, according to the acquired GPS signal, that an absolute position change amount is greater than the second offset threshold, it may be determined that the base station is in an abnormal state in which the absolute position is changed.

Specifically, in a possible implementation, when a position vector of each point on the map of the working region of the mobile station in a coordinate system XY has an offset greater than the first offset threshold, it may be determined that the base station is in an abnormal state in which the absolute position is changed.

In another possible implementation, alternatively, if the base station performs comparison with historical coordinates to determine that the absolute position change amount is greater than the second offset threshold, it may be determined that the base station is in an abnormal state in which the absolute position is changed.

Scenario 2

The base station is in an abnormal state under the effect of an external force.

For example, the base station is blocked, and when the base station performs comparison with historical coordinates to determine that positioning precision decreases, it indicates that the base station may be blocked, and it may be determined that the base station is in an abnormal state of blockage.

In another example, if the base station performs comparison with historical coordinates to determine that the absolute position change amount is greater than the second offset threshold, it may be determined that the base station is in an abnormal state in which the absolute position is changed.

Optionally, when the base station is in an abnormal state, the base station may send prompt information or a local alarm to the user or the self-moving device by using the communications module and wait for the user to perform an operation for recovering the base station. The operation is, for example, updating the map, moving or replacing the base station, or the like.

It should be noted that the foregoing alarm process may be skipped for the abnormal state caused by an operation of the user.

Scenario 3

If a base station is replaced, switching needs to be performed between base stations. Switching is performed from a source base station at the point A to a target base station at the point B.

Specifically, the base stations include the source base station located at an absolute position of the base station before a change occurs and is the target base station located at the absolute position of the base station after the change occurs. When the target base station needs to be used to replace the source base station, the mobile station needs to be kept still, and the map is updated after the replacement is completed. To clearly describe this process, FIG. 27 provides a specific implementation process.

Figure 27:
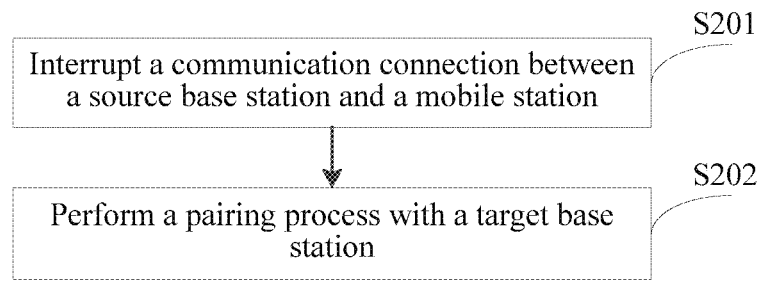
FIG. 27 is a schematic flowchart of a second position information processing method based on a differential positioning technology according to an embodiment of the present invention.

Referring to FIG. 27, based on the embodiment shown in FIG. 25, before S104, the position information processing method based on a differential positioning technology may further include the following steps:

S201: Interrupt a communication connection between the source base station and the mobile station.

In this embodiment of the present invention, when an absolute position of a source base station changes, position coordinates output by the mobile station have an offset. In this case, the communication connection between the base station and the mobile station may be interrupted.

Optionally, the automatic working system may include a plurality of base stations, or, base stations of different automatic working systems located within a region may be shared. After the communication connection between the source base station and the mobile station is interrupted, the mobile station may be automatically switched to another base station to perform communication.

S202: Perform a pairing process with the target base station.

Optionally, after the position of the target base station is fixed, the mobile station may perform a pairing process with the target base station again, and the mobile station may then acquire a second relative position with respect to the base station.

In another embodiment, when it is necessary to change the base station, the position of the base station may be kept unchanged, and the mobile station is similarly kept still. A process of interruption and pairing is used to complete changing the base station.

In this embodiment of the present invention, when a mobile station is installed on a self-moving device and moves synchronously with the self-moving device, after a working map of the mobile station is updated, the mobile station may resolve a relative position with respect to a base station according to differential information sent by the base station. Next, the mobile terminal may navigate the self-moving device according to a working region defined by the map, so as to provide efficient and reliable navigation data to the automatic mobile device, thereby improving precision of navigation.

To implement the foregoing embodiments, the present invention further provides a mobile station applicable to a navigation module.

Figure 28:
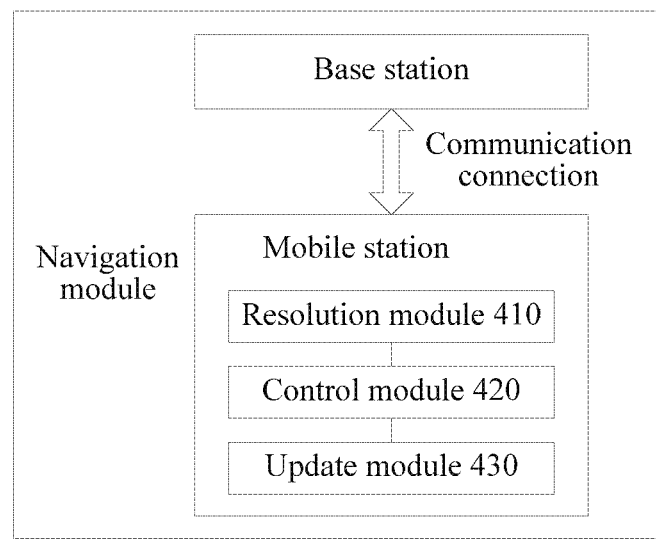
FIG. 28 is a schematic structural diagram of a mobile station applicable to a navigation module according to an embodiment of the present invention.

FIG. 28 is a schematic structural diagram of a mobile station applicable to a navigation module according to an embodiment of the present invention. A navigation module is based on a differential positioning technology, and includes a base station and the mobile station for resolving a relative position with respect to the base station according to differential information sent by the base station.

As shown in FIG. 28, the mobile station includes a resolution module 410, a control module 420, and an update module 430.

The resolution module 410 is configured to: before an absolute position of the base station changes, acquire a first relative position with respect to the base station; and after the absolute position of the base station changes, acquire a second relative position with respect to the base station.

The control module 420 is configured to: before and after the absolute position of the base station changes, keep the mobile station at a same absolute position.

The update module 430 is configured to: update a map of a working region of the mobile station according to the first relative position and the second relative position, or, instruct the base station to update a stored absolute position of the base station, where points on the map are used to indicate relative positions with respect to the base station.

In this embodiment of the present invention, the update module 430 is specifically configured to: generate, according to the first relative position and the second relative position, first correction information used to indicate a displacement amount of the base station; send the first correction information to the base station, to enable the base station to determine the updated absolute position of the base station according to the absolute position of the base station before movement and the first correction information, and generate the differential information according to the updated absolute position of the base station.

In a possible implementation, the update module 430 is specifically configured to generate the first correction information $\vec{r}$ according to relative position coordinates $(x_1, y_1)$ of the first relative position in a preset coordinate system XY and relative position coordinates $(x_2, y_2)$ of the second relative position in the coordinate system XY, where $\vec{r}=(x_1-x_2)\vec{i}+(y_1-y_2)\vec{j}$.

In this embodiment of the present invention, the update module 430 is further configured to: generate, according to the first relative position and the second relative position, second correction information used to indicate a relative position change amount of the mobile station with respect to the base station; and update a working map according to the second correction information.

Optionally, the update module 430 is specifically configured to: generate the second correction information $(-\vec{r})$ according to coordinates $(x_1, y_1)$ of the first relative position in the coordinate system XY and coordinates $(x_2, y_2)$ of the second relative position in the coordinate system XY, where $-\vec{r}=(x_2-x_1)\vec{i}+(y_2-y_1)\vec{j}$; and perform vector addition on a position vector of each point on the map before update in the coordinate system XY and the second correction information $(-\vec{r})$, to obtain an updated position vector of each point on the map, so as to obtain an updated map.

Figure 29:
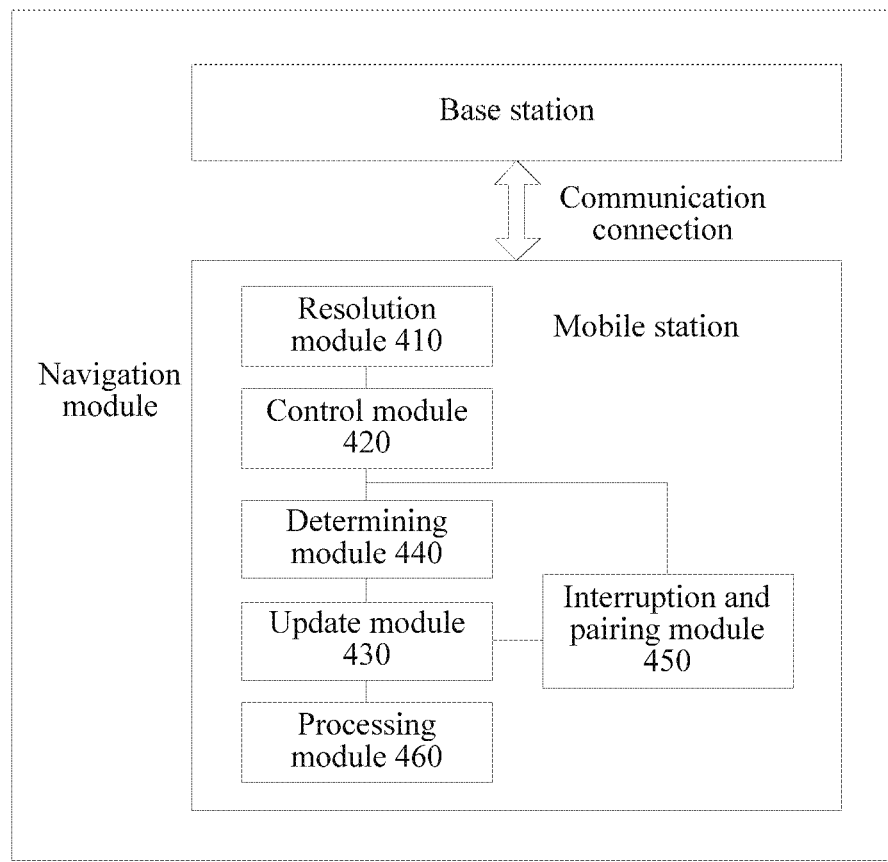
FIG. 29 is a schematic structural diagram of another mobile station applicable to a navigation module according to an embodiment of the present invention.

Further, in a possible implementation of this embodiment of the present invention, referring to FIG. 29, based on the embodiment shown in FIG. 28, the mobile station applicable to a navigation module may further include a determining module 440, an interruption and pairing module 450, and a processing module 460.

The determining module 440 is configured to: before the working map of the mobile station is updated or the base station is instructed to update the absolute position, if the mobile station is kept at a fixed absolute position, when the mobile station resolves, according to the differential information sent by the base station, that a relative position change amount with respect to the base station is greater than the first offset threshold, and/or, the base station determines, according to the acquired GPS signal, that an absolute position change amount is greater than the second offset threshold, determine that the base station is in an abnormal state, where the abnormal state includes an absolute position change.

In this embodiment of the present invention, the base stations include a source base station located at the absolute position of the base station before the change occurs, and a target base station located at the absolute position of the base station after the change occurs.

The interruption and pairing module 450 is configured to: interrupt a communication connection between the source base station and the mobile station; and perform a pairing process with the target base station.

In this embodiment of the present invention, the mobile station is installed on the self-moving device and moves synchronously with the self-moving device.

The processing module 460 is configured to: after a relative position with respect to the base station is resolved according to the differential information sent by the base station, navigate the self-moving device according to the working region defined by the map.

It should be noted that the foregoing description of the embodiments of a position information processing method based on a carrier-phase differential technology is also applicable to the mobile station applicable to a navigation module in this embodiment. Details are not described herein again.

For the mobile station applicable to a navigation module in this embodiment, before an absolute position of a base station changes, a mobile station acquires a first relative position with respect to the base station. Next, before and after the absolute position of the base station changes, the mobile station is kept at a same absolute position, and after the absolute position of the base station changes, the mobile station acquires a second relative position with respect to the base station, so that the mobile station may update a map of a working region of the mobile station according to the first relative position and the second relative position, or, instruct the base station to update a stored absolute position of the base station, where points on the map are used to indicate relative positions with respect to the base station. Accordingly, the mobile station does not need to repeat a process of moving along a boundary of the working region to generate the map when a position of the base station changes, so that operation steps are simplified.

To implement the foregoing embodiments, the present invention further provides a mobile station applicable to a navigation module.

Figure 30:
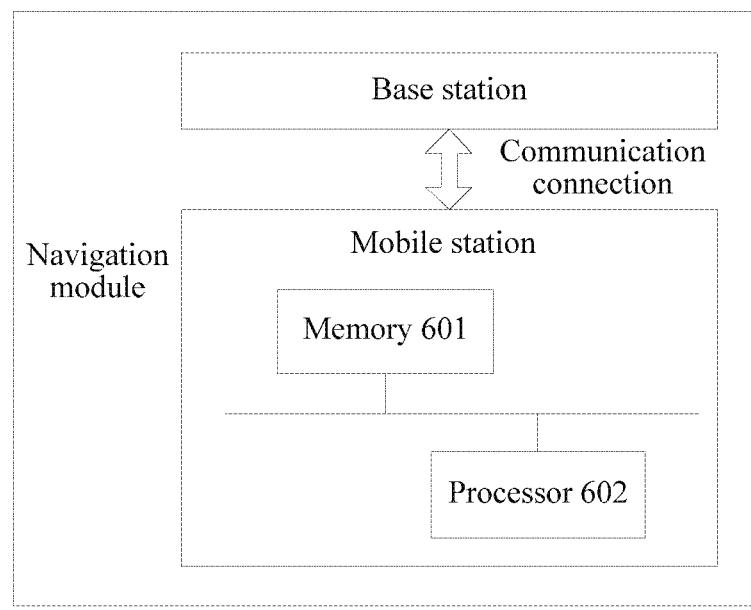
FIG. 30 is a schematic structural diagram of a mobile station applicable to a navigation module according to an embodiment of the present invention.

FIG. 30 is a schematic structural diagram of a mobile station applicable to a navigation module according to an embodiment of the present invention. A navigation module is based on a differential positioning technology, and includes a base station and the mobile station for resolving a relative position with respect to the base station according to differential information sent by the base station.

As shown in FIG. 30, the mobile station applicable to a navigation module includes: a memory 601, a processor 602, and a computer program that is stored in the memory 601 and may run on the processor 602, where when executing the program, the processor 602 performs the position information processing method based on a carrier-phase differential technology provided in the foregoing embodiments of the present invention.

To implement the foregoing embodiments, the embodiments of the present invention further provide a computer readable storage medium, storing a computer program, where when being executed by the processor, the program implements the position information processing method based on a differential positioning technology provided in the foregoing embodiments of the present invention.

To implement the foregoing embodiments, the embodiments of the present invention further provide a computer program product, where when being executed by a processor, an instruction in the computer program product performs the position information processing method based on a differential positioning technology provided in the foregoing embodiments of the present invention.

In the description of this specification, the description of reference terms such as "an embodiment", "some embodiments", "an example", "specific example", and "some examples" means that specific features, structures, materials or characteristics that are described with reference to the embodiments or examples are included in at least one embodiment or example of the present invention. In this specification, the schematic description of the foregoing terms is not required to involve a same embodiment or example. Moreover, the described specific features, structures, materials or characteristics may be appropriately combined in any one or more embodiments or examples. In addition, without causing any contradiction, a person skilled in the art may combine different embodiments or examples and features in different embodiments or examples described in this specification.

In addition, the terms such as "first" and "second" are used only for the purpose of description, and should not be understood as indicating or implying the relative importance or implicitly specifying the number of the indicated technical features. Therefore, when features are defined by "first" and "second", at least one such feature can be explicitly or implicitly included. In the description of the embodiments of the present invention, unless otherwise particularly defined, "a plurality of" means at least two, for example, two or three.

The description of any process or method in the flowcharts or described herein in other manners may be understood as representing a module, a segment or a part that includes one or more codes of executable instructions used to implement the steps of a customized logic function or process, and the scope of some implementations of the present invention include other implementations. The functions may be executed in a basically simultaneous manner or an opposite order according to the related functions instead of the shown or described order. This should be understood by a person skilled in the art of the embodiments of the present invention.

The logic and/or steps represented in the flowcharts or described herein in other manners may be, for example, regarded as a sequenced list of executable instructions for implementing logic functions, and may be specifically implemented in any computer readable medium for use by instruction execution systems, apparatuses or devices (for example, a computer-based system, a system including a processor or another system that may take an instruction from the instruction execution systems, apparatuses or devices and execute the instruction), or for use in combination with these instruction execution systems, apparatuses or devices. As for this specification, "the computer readable medium" may be any apparatus that may include, store, communicate, propagate or transmit a program for use by instruction execution systems, apparatuses or devices or for use in combination with these instruction execution systems, apparatuses or devices. A more specific example (a nonexhaustive list) of the computer readable medium includes the following: an electrically connected portion (electronic apparatus) with one or more wires, a portable computer cassette (magnetic apparatus), a random-access memory (RAM), a ROM, an erasable programmable ROM (EPROM or flash-drive memory), a fiber apparatus, and a compact disc ROM (CDROM). In addition, the computer readable medium may even be paper or another suitable medium on which the program may be printed, because, for example, optical scanning may be performed on the paper or the another medium, the program is then obtained in an electronic manner by means of editing, deciphering or processing in another suitable manner when necessary, and the program is then stored in a computer memory.

It should be understood that the parts of the embodiments of the present invention may be implemented by using hardware, software, firmware or a combination thereof. In the foregoing implementations, a plurality of steps or methods may be implemented by using software or firmware that is stored in a memory and executed by a suitable instruction execution system. For example, during implementation of hardware, as in other implementations, any one or a combination of the following technologies well known in the art may be used for implementation: a discrete logic circuit having a logic gate circuit configured to implement a logic function on a data signal, an application-specific integrated circuit having a suitable combinational logic gate circuit, a programmable gate array (PGA), a field-programmable gate array (FPGA), and the like.

A person of ordinary skill in the art may understand that all or some steps carried in the methods of the foregoing embodiments may be implemented by a program instructing relevant hardware. The program may be stored in a computer readable storage medium. When the program runs, one or a combination of the steps of the method embodiments is performed.

In addition, the functional units in the embodiments of the present invention may either be integrated in a processing module or each be a separate physical unit. Alternatively, two or more of the foregoing units may be integrated in one module. The foregoing integrated modules may be implemented in the form of hardware or software functional modules. If implemented in the form of software function modules and sold or used as an independent product, the integrated modules may also be stored in the computer readable storage medium.

The storage medium mentioned in the foregoing may be a ROM, a magnetic disk, an optical disc or the like. Although the embodiments of the present invention are shown and described above, it should be understood that the foregoing embodiments are exemplary and should not be construed as limitations to the present invention. A person of ordinary skill in the art may make changes, modifications, replacements, and variations to the foregoing embodiments within the scope of the present invention.

Figure 31:
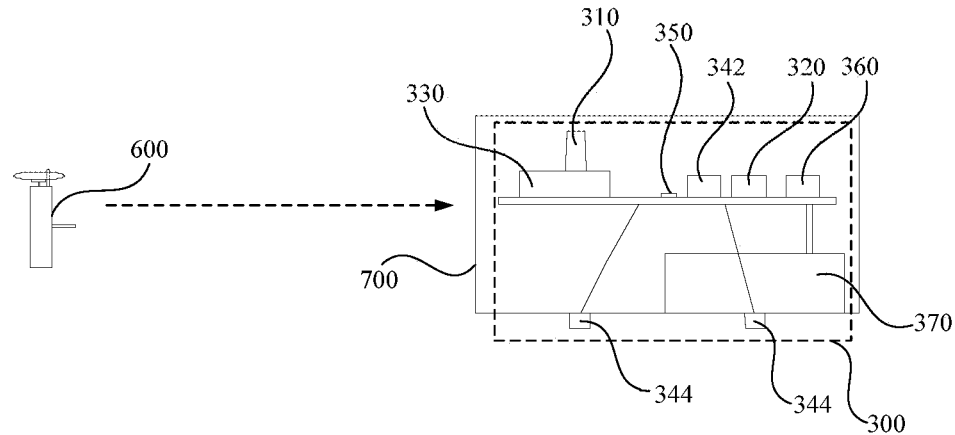
FIG. 31 is a schematic structural diagram of a pet collar system according to an embodiment.
Figure 32:
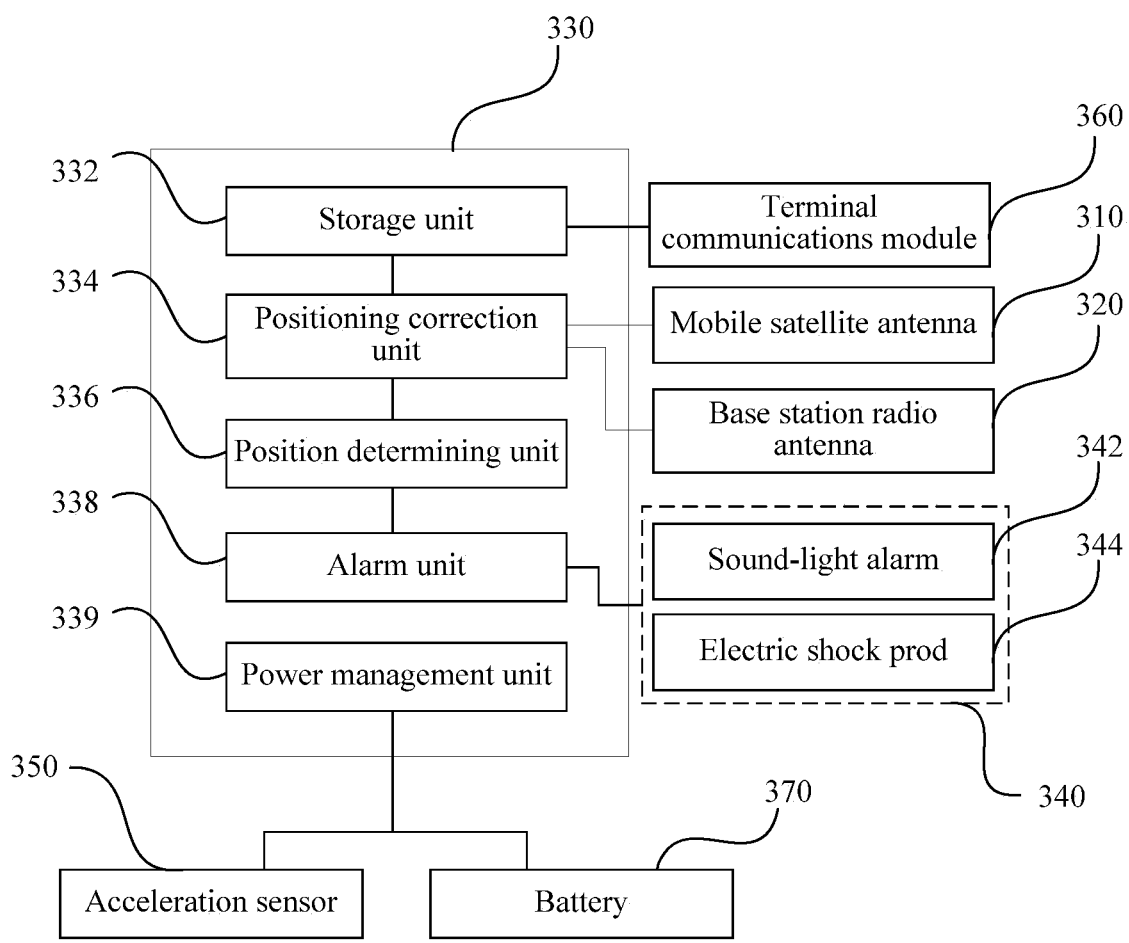
FIG. 32 is a structural principle diagram of a training apparatus according to an embodiment.

Referring to FIG. 31 and FIG. 32, a pet collar system includes: a base station 600 and a pet collar. The pet collar includes a collar body 700 and a training apparatus 300 disposed on the collar body 700.

The base station 600 is in communication connection with the training apparatus 300. The base station 600 stores base station coordinate information, and the base station 600 receives base station positioning data observed by a satellite positioning system. The base station 600 computes a differential observation value according to the base station coordinate information and the base station positioning data, obtains a positioning error correction value, and sends the positioning error correction value to the training apparatus 300.

The base station 600 includes a satellite antenna, a satellite signal processing module, and a radio station antenna. The satellite antenna is configured to receive the base station positioning data observed by the satellite system. The satellite signal processing module resolves the positioning error correction value according to the base station positioning data. The radio station antenna is configured to send the positioning error correction value resolved by the base station to the training apparatus 300 by using wireless transmission.

Specifically, the satellite signal processing module uses a carrier-phase differential algorithm to calculate a difference between the received base station positioning data and the base station coordinate information to resolve the positioning error correction value. The carrier-phase differential calculation is an RTK positioning technology based on the carrier phase observation value, so that a three-dimensional positioning result of a measured station in a set coordinate system can be provided in real time, and is insusceptible to interference factors such as various errors and blockage, where centimeter precision can be achieved even if there is severe interference. In this way, the base station 600 can provide a precise positioning error correction value for the training apparatus 300, so that a pet is precisely located in real time, positioning precision is high, and positioning efficiency is high.

The training apparatus 300 includes a mobile satellite antenna 310, a base station radio antenna 320, a microprocessor 330, and an alarm 340.

The mobile satellite antenna 310 is configured to: receive collar positioning data observed by the satellite positioning system, and send the received collar positioning data to the microprocessor 330.

The base station radio antenna 320 is configured to: receive the positioning error correction value sent by the base station, and send the received positioning error correction value to the microprocessor 330.

The microprocessor 330 stores a pet movement boundary region in advance, and the pet is restricted to the pet movement boundary region. The microprocessor 330 performs positioning correction processing according to the positioning error correction value of the collar positioning data, determines whether a distance between the pet and the pet movement boundary region is less than or equal to a preset distance threshold, and when the distance between the pet and the pet movement boundary region is less than or equal to the preset distance threshold, sends an alarm signal to the alarm 340. In this embodiment, the microprocessor performs correction processing on the collar positioning data by using the positioning error correction value, and positioning with centimeter precision can be achieved through comprehensive resolution, thereby greatly improving pet positioning precision.

The alarm 340 is configured to output alarm information according to the alarm signal.

The pet collar system is configured to form a virtual pet fence around the pet movement boundary region to prevent the pet from getting lost. For the pet collar, the satellite positioning system is used to locate the pet, it is not necessary to arrange a line around a boundary, so that implementation operations are simple and convenient, and the pet collar performs correction processing on a positioning result according to a positioning correction value calculated by the base station by processing a continuous differential observation value, so that corrected positioning precision can be greatly improved. A positioning signal of the pet collar system is insusceptible to various interference factors, so that positioning with centimeter precision can be achieved. The pet is precisely located, positioning precision is high, and the pet can be effectively prevented from moving beyond a preset movement boundary region, so as to prevent the pet from getting lost, thereby ensuring safety of the pet.

As shown in FIG. 32, in an embodiment, the microprocessor 330 includes a storage unit 332, a positioning correction unit 334, a position determining unit 336, and an alarm unit 338.

The storage unit 332 is configured to store the pet movement boundary region.

The positioning correction unit 334 is configured to perform positioning correction processing according to the collar positioning data and the positioning error correction value, to obtain current pet position coordinate information.

The position determining unit 336 is configured to: compute the distance between the pet and the pet movement boundary region according to the current pet position coordinate information, and determine whether the distance between the pet and the pet movement boundary region is less than or equal to the preset distance threshold.

Specifically, in an embodiment, the storage unit 332 is further configured to store the preset distance threshold between the pet and the pet movement boundary region. A specific value of the preset distance threshold may be arbitrarily set according to an actual requirement.

The alarm unit 338 is configured to: when the distance between the pet and the pet movement boundary region is less than or equal to the preset distance threshold, output an alarm signal to the alarm.

Specifically, when the distance between the pet and the pet movement boundary region is greater than the preset distance threshold, the pet moves within the pet movement boundary region, there is no risk of getting lost and no potential safety hazard, and no processing is required. When the distance between the pet and the pet movement boundary region is less than or equal to the preset distance threshold, the pet moves to the pet movement boundary region, and there is a risk of getting lost or a potential safety hazard, and the alarm information needs to be output to give the pet an alarm.

In an embodiment, the alarm signal includes a sound-light alarm signal and an electric shock alarm signal. As shown in FIG. 1, the alarm 340 includes a sound-light alarm 342 and an electric shock prod 344. When the distance between the pet and the pet movement boundary region is equal to the preset distance threshold, the alarm unit 338 outputs a sound-light alarm signal to the sound-light alarm 342, and the sound-light alarm 342 outputs sound-light alarm information to prompt the pet. If the pet continues moving, when the distance between the pet and the pet movement boundary region is less than the preset distance threshold, the alarm unit 338 outputs an electric shock alarm signal to the electric shock prod 344 to give the pet an electric shock for warning. As the distance between the pet and the pet movement boundary region is smaller, electric shock intensity is higher. In this embodiment, the sound-light alarm 340 and the electric shock prod 344 are used to give the pet different levels of warning. After the distance between the pet and the pet movement boundary region is less than or equal to the preset distance threshold, as the distance between the pet and the pet movement boundary region decreases, an alarm level is higher, so as to create a conditioned reflex of the pet.

As shown in FIG. 31 and FIG. 32, in an embodiment, the pet collar further includes an acceleration sensor 350. The acceleration sensor is 350 disposed on the collar body 310, and the acceleration sensor 350 is connected to the microprocessor 330. The acceleration sensor 350 is configured to: acquire pet movement acceleration, and send the acquired pet movement acceleration to the microprocessor 330.

The microprocessor 330 further includes a power management unit 339. The power management unit 339 is configured to: receive the pet movement acceleration, compare the pet movement acceleration with a prestored acceleration threshold, and when the pet movement acceleration is less than or equal to the acceleration threshold, start a sleep mode, to enable the microprocessor 330 to enter a sleep state. When the pet movement acceleration is greater than the acceleration threshold, the microprocessor 330 wakes up to work, and the microprocessor 330 works normally.

In this embodiment, the pet movement acceleration is detected to determine a movement state of the pet, and a working state of the microprocessor 330 is adjusted according to the movement state of the pet. Specifically, the pet movement acceleration during walking is greater than acceleration amplitude when the pet stops or lies down. When the pet is in a stationary state, the pet does not get lost. When the pet moves slowly, the pet usually does not get lost either. Therefore, the acceleration threshold is preset, and the microprocessor starts and enters a working mode only when the detected pet movement acceleration is greater than the acceleration threshold. Otherwise, the microprocessor is in a power-saving sleep mode to reduce power consumption of the microprocessor, so that power conservation of the system is implemented, and a volume of a battery can be reduced. In this way, the pet collar has a lighter weight and is more suitable for wear by the pet, and costs can be effectively reduced.

In an embodiment, the pet collar further includes a terminal communications module 360. The microprocessor 330 exchanges information with a remote terminal by using the terminal communications module 360. The remote terminal includes one or more of a mobile phone, a tablet or a computer. Specifically, the terminal communications module 360 establishes a communication connection with the remote terminal by using a wireless network, a mobile communications network or the Internet.

In an embodiment, the pet movement boundary region is drawn in map software on the mobile phone, tablet or computer. Specifically, the map software may be Google Map, Baidu map and the like.

Specifically, the pet movement boundary region includes boundary coordinate information of a movement region and boundary coordinate information of a pet movement prohibition region in the movement region. The pet movement prohibition region includes a region such as a flower bed and a swimming pool that the pet cannot enter. In this embodiment, according to specific facilities in a region, the pet movement region is defined in Google Map on the mobile phone, tablet or computer. The microprocessor 330 receives, by using the terminal communications module 360, boundary information that is sent by the mobile phone, tablet or computer and is related to the defined pet movement region, and stores the boundary information in the storage unit 332.

In an embodiment, the base station 600 is a base station of an autonomous lawn mower, and the boundary region is a map boundary region learned by the autonomous lawn mower.

Specifically, in this embodiment, the pet collar uses the base station of the autonomous lawn mower. The pet collar and the autonomous lawn mower share one base station, and costs of the base station can be effectively reduced. Moreover, the pet collar may directly use the map boundary region learned by the autonomous lawn mower, and it is not necessary to define the pet movement boundary region, the pet movement region may be flexibly adjusted, and use of a user is greatly facilitated. When the base station 600 uses the base station of the autonomous lawn mower, the map boundary region learned by the autonomous lawn mower is read from the mobile phone, tablet or computer, and the read map boundary region is sent to the pet collar for storage. Further, the user may further set, according to an actual requirement, the map boundary region learned by the autonomous lawn mower, and choose the pet movement region. For example, the map boundary region learned by the autonomous lawn mower includes a lawn and a house in a region of the lawn, and the user may set a boundary around the house as the pet movement boundary region, and the pet can only move in the house. The user may alternatively shield the boundary around the house to enable the pet to move in the region of the lawn and the house.

It should be noted that in another embodiment, an initial boundary region may be directly defined on an electronic map of the pet collar. An electronic device including an electronic map is installed in the pet collar. The microprocessor 330 includes a receiving unit. The electronic device is connected to the receiving unit. The pet movement region is directly defined on the electronic map of the electronic device. The electronic device sends boundary information of the defined pet movement region to the receiving unit. The microprocessor 330 receives the boundary information of the pet movement region and stores the boundary information in the storage unit 332.

In an embodiment, the pet collar further includes a battery 370 configured to supply power to the mobile satellite antenna 310, the base station radio antenna 320, the microprocessor 330, the sound-light alarm 342, and the electric shock prod 344.

Figure 33:
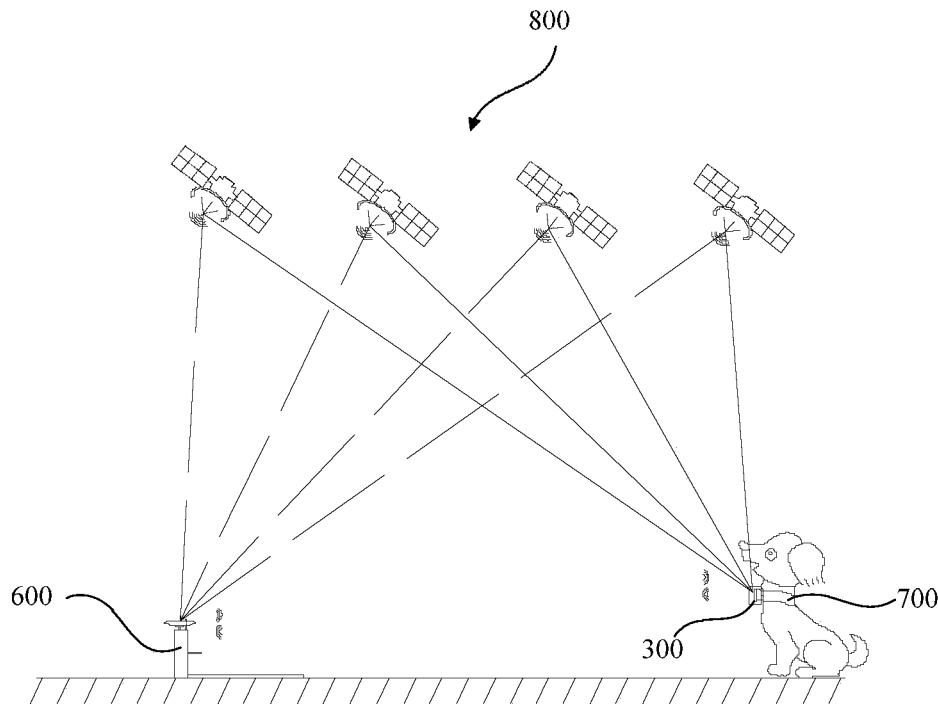
FIG. 33 is a schematic diagram of an application scenario of a pet collar system according to an embodiment.

FIG. 33 is a schematic diagram of an application scenario of a pet collar system according to an embodiment. In this embodiment, the base station 600 receives base station positioning data observed by a satellite positioning system 800. The training apparatus 300 receives collar positioning data observed by the satellite positioning system and base station coordinate information and the base station positioning data that are sent by the base station 600. The training apparatus 300 processes a differential observation value according to the collar positioning data, the base station coordinate information, and the base station positioning data, to obtain current pet position coordinate information, determines whether a distance between a pet and a pet movement boundary region is less than or equal to the preset distance threshold, and when the distance between the pet and the pet movement boundary region is less than or equal to the preset distance threshold, outputs alarm information to train a pet to create a conditioned reflex of the pet, so as to prevent the pet from getting lost. A specific structure and working principle of the pet collar system are discussed above, and details are not described herein.

Specifically, in an embodiment, the satellite system includes the Beidou satellite navigation system, the GPS, the Russian GLONASS satellite navigation system or the Galileo satellite positioning system.

Figure 34:
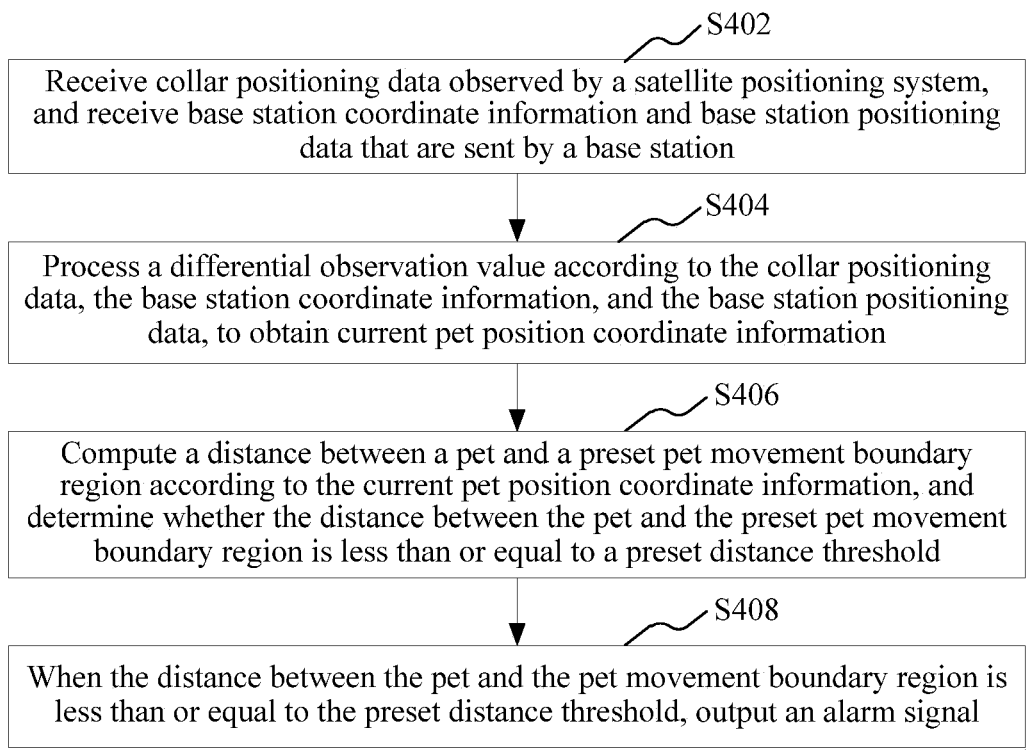
FIG. 34 is a principle flowchart of a pet collar control method according to an embodiment.

Referring to FIG. 34, in an embodiment, a pet collar control method is provided, including the following steps.

S402: Receive collar positioning data observed by a satellite positioning system, and receive a positioning error correction value sent by the base station.

Specifically, the base station stores base station coordinate information, the base station receives base station positioning data observed by the satellite positioning system, and the base station computes a differential observation value according to the base station coordinate information and the base station positioning data, obtains the positioning error correction value, and sends the positioning error correction value to a training apparatus. The training apparatus receives the collar positioning data observed by the satellite positioning system and the positioning error correction value sent by the base station.

S404: Perform positioning correction processing according to the collar positioning data and the positioning error correction value, to obtain current pet position coordinate information.

The training apparatus processes the differential observation value according to the collar positioning data, the base station coordinate information, and the base station positioning data, to obtain the current pet position coordinate information.

S406: Compute a distance between a pet and a preset pet movement boundary region according to the current pet position coordinate information, and determine whether the distance between the pet and the preset pet movement boundary region is less than or equal to a preset distance threshold.

S408: When the distance between the pet and the pet movement boundary region is less than or equal to the preset distance threshold, output an alarm signal.

Further, before S402, the method includes the following steps: receiving, by the base station, the base station positioning data observed by the satellite positioning system, computing the differential observation value according to the base station positioning data and prestored base station coordinate information, and obtaining the positioning error correction value.

Further, the pet collar control method further includes the following steps:

detecting pet movement acceleration, and comparing the pet movement acceleration with a prestored acceleration threshold, so that when the pet movement acceleration is less than or equal to the acceleration threshold, a sleep mode is started to enable a microprocessor to enter a sleep state, and when the pet movement acceleration is greater than the acceleration threshold, the microprocessor wakes up to work.

Specifically, the acceleration sensor acquires the pet movement acceleration to determine a movement state of the pet, adjusts a working state of the microprocessor according to the movement state of the pet. When the detected pet movement acceleration is less than or equal to the preset acceleration threshold, the microprocessor starts a sleep mode to enter a sleep power conservation state, so as to reduce power consumption of the system.

Further, before S402, the method further includes the following step: receiving a pet movement boundary region sent by a remote terminal from storage, where the remote terminal includes one or more of a mobile phone, a tablet or a computer.

Specifically, the pet movement boundary region is drawn in map software on the mobile phone, tablet or computer and sent to the training apparatus for storage. Further, in an embodiment, the base station may use the base station of the autonomous lawn mower. The pet movement boundary region directly uses a map boundary region learned by the autonomous lawn mower. The mobile phone, tablet or computer sends the stored map boundary region learned by the autonomous lawn mower to the training apparatus for storage.

Further, in an embodiment, the pet collar system is in communication connection with the remote terminal by using a network. The pet collar control method further includes the following steps: sending, by a pet collar, the current pet position coordinate information to the remote terminal in real time, and when the distance between the pet and the pet movement boundary region is less than or equal to the preset distance threshold, sending, by the pet collar, an alarm signal to the remote terminal; and receiving, by the remote terminal, the current pet position coordinate information and the alarm signal, and outputting, by the remote terminal, a control instruction to the pet collar according to the current pet position coordinate information or the alarm signal.

Specifically, the pet collar may be in communication connection with the remote terminal such as the mobile phone, tablet, and computer by using a Wi-Fi wireless communications network or a 3G/4G mobile communications network. The pet collar sends a position of the pet to the remote terminal in real time. When the pet is near a boundary, the pet collar sends an alarm signal to the remote terminal. A user may check a movement position of the pet in real time by using the remote terminal to learn about in time whether the pet moves beyond the boundary, so that it is further convenient for the user to check the movement of the pet and effectively prevent the pet from getting lost. Moreover, the user may further send a control instruction to the pet collar by using the remote terminal, so that the user remotely controls movement of the pet.

The pet collar system and the pet collar control method are separately described above. For ease of understanding, the pet collar system and pet collar control method are described below by using specific application embodiments with reference to both FIG. 35 and FIG. 36. For ease of description, in this embodiment, for example, the satellite positioning system is the GPS, the terminal is a mobile phone, and the map software is Google Map.

Figure 35:
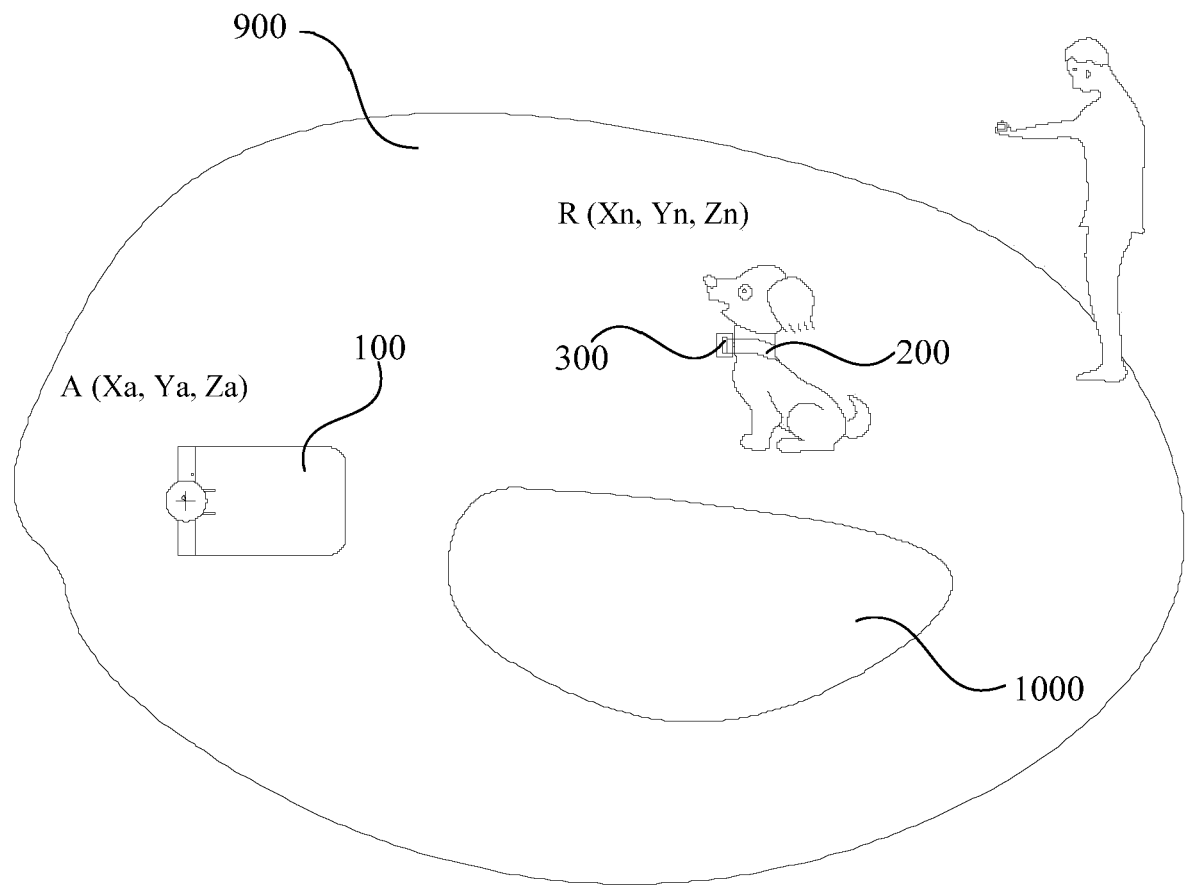
FIG. 35 is a schematic diagram of an application environment of using a pet collar system to train a pet according to an embodiment.

In an embodiment, the pet collar system is used to train the pet, so that the pet has a conditioned reflex for moving in only a set movement region. As shown in FIG. 35, it is predefined that a lawn 900 is the pet movement region, and there is a swimming pool 1000 in the lawn.

Figure 36:
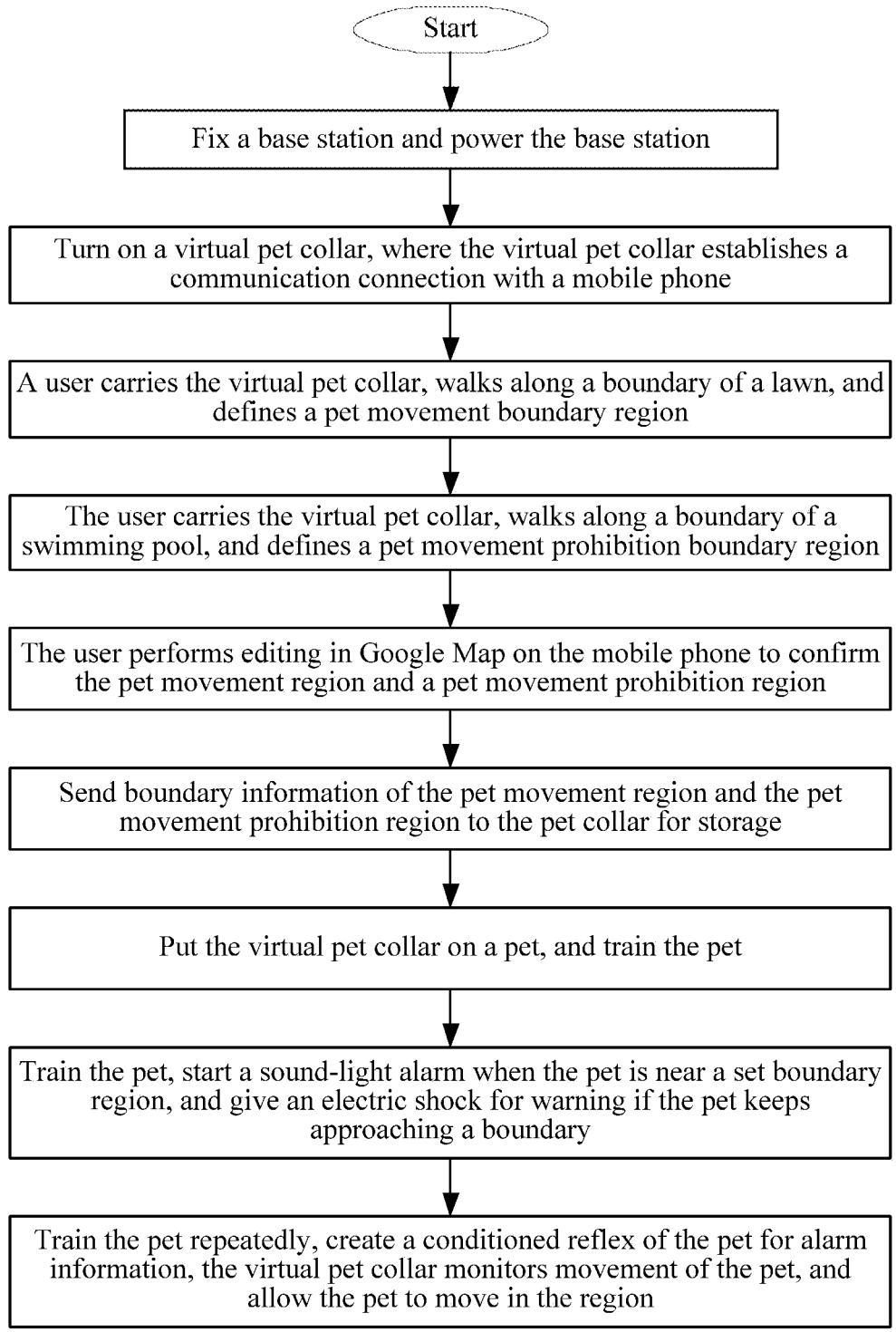
FIG. 36 is a flowchart of using a pet collar system to train a pet according to an embodiment.

As shown in FIG. 35 and FIG. 36, the system needs to be set first and the pet movement boundary region needs to be defined before the pet is trained. First, the base station 600 is disposed at a point A in the lawn 900, and the base station 600 is powered to record coordinates A (Xa, Ya, Za) of the point A. Subsequently, the pet collar is turned on. The pet collar establishes a communication connection with the mobile phone. The pet movement boundary region is then defined. That is, a range of a virtual pet fence is defined. To define the pet movement boundary region, a map boundary is drawn first, the user removes the pet collar from the pet and sets the pet collar to a region boundary setting mode. The user carries the pet collar to walk to a boundary of the lawn 900 and walks one lap along the boundary. As the user walks through the boundary, the pet collar automatically sends geographical coordinate data of points of the boundary observed by the GPS to the mobile phone, so as to draw the boundary of the lawn, and a map of the boundary is formed on the mobile phone. In addition, if the pet needs to be kept away from a dangerous region such as a swimming pool, the user may walk one lap along the swimming pool, and then set a boundary of the swimming pool as an entry prohibition region. Specifically, after the boundary of the lawn 900 is drawn, the user then carries the pet collar and walks one lap along the boundary of the swimming pool 1000 to draw the boundary of the swimming pool. After the boundary map is drawn, the user performs editing in Google Map on the mobile phone to confirm that a region inside the boundary of the lawn and outside the boundary of the swimming pool is the pet movement region, and a region outside the boundary of the lawn and a region inside the boundary of the swimming pool are movement prohibition regions. After the map is edited, boundary information of the pet movement region and a pet movement prohibition region are sent to the pet collar for storage. The pet collar records the range of the virtual pet fence. Subsequently, the pet collar is put on the pet. The pet collar is fastened around the neck of the pet, and the working mode is started to train the pet.

During training, the pet moves inside the pet movement boundary region. The pet collar receives the collar positioning data observed by the satellite positioning system and the base station coordinate information and the base station positioning data that are sent by the base station, processes the differential observation value according to the collar positioning data, the base station coordinate information, and the base station positioning data, computes coordinates of a current position of the pet to obtain coordinates R (Xn, Yn, Zn) of a position point R of the pet, computes a distance between the pet and the pet movement boundary region according to the coordinates of the current position of the pet, and determines whether the distance between the pet and the pet movement boundary region is less than or equal to the preset distance threshold. When the distance between the pet and the pet movement boundary region is equal to the preset distance threshold, sound-light alarm information is output to give the pet a sound-light alarm. If the pet does not stop and continues moving near the boundary, an electric shock is given to the pet for warning. When the pet is closer to the boundary (that is, the virtual pet fence), electric shock intensity is higher, so as to make the pet stop advancing to prevent the pet from moving beyond the boundary. To create a conditioned reflex of the pet, the pet may be trained repeatedly. When a conditioned reflex of the pet is created for alarm information during training, for example, the pet stops advancing and returns into a movement region when receiving the sound-light alarm information or a mild electric shock, the user may stop training and allow the pet to move in the region as long as the pet collar system detects the movement of the pet.

Specifically, in an embodiment, the preset distance threshold is 2 m, and the user may train the pet in the following manner: First, flags are arranged on the boundary at intervals of 2 m to 3 m. The collar is fastened around the neck of the pet. The pet is led near the boundary in the region. When the distance from the boundary is 2 m, the collar emits beeps as an alarm sound. In this case, the pet is led to keep approaching the boundary. When the distance from the boundary is less than 2 m, the collar gives an electric shock. As the distance from the boundary decreases, electric shock intensity increases or electric shocks are more frequent to cause discomfort to the pet. Generally, after 48 hours during which the pet is trained repeatedly, a conditioned reflex of the pet is created, and the pet will not approach the boundary. The pet can generally know about a distance of the pet from a flag on the boundary, so that the pet stays submissively in a set safe region, and the pet can be effectively prevented from getting lost.

Further, after the pet has been trained, the pet collar system monitors the movement of the pet. The pet collar monitors a movement state of the pet in real time by using the acceleration sensor disposed on the pet collar. When the pet lies still or moves slowly and the detected pet movement acceleration is less than or equal to the preset acceleration threshold, the microprocessor of the pet collar starts a sleep mode and the pet collar stops working and enters a sleep power conservation state. When the pet starts to move and the detected pet movement acceleration is greater than the preset acceleration threshold, the microprocessor is started, and the pet collar monitors the movement of the pet to prevent the pet from moving beyond the boundary.

Further, after the pet has been trained and the pet collar monitors the movement of the pet, the user may further check a position of the pet in real time in Google Map on the mobile phone to monitor a position state of the pet, so as to further prevent the pet from getting lost. Further, a GPS tracker may further be installed on the pet collar. Once the pet is lost, the user may perform GPS tracking by using the mobile phone to track the position of the pet to ensure the retrieval of the pet.

In another embodiment, information exchange between the pet collar and the mobile phone is not limited to only the foregoing transfer of boundary region setting information. In an embodiment, the user may use the mobile phone to establish a communication connection with the pet collar by using a Wi-Fi or 3G/4G mobile communications network. The pet collar may send the position of the pet to the mobile phone in real time. When the alarm raises an alarm, the pet collar may further send an alarm signal to the remote terminal to notify the user. The user may use the mobile phone to remotely check the movement position of the pet to learn about in time whether the pet walks beyond the boundary. Moreover, the user may further use the mobile phone to send a control instruction to the pet collar to remotely control the movement of the pet. For example, in an embodiment, if the user checks the mobile phone to find that the pet is near a boundary region, the user may use the mobile phone to send an alarm instruction to start the alarm to give the pet an early warning. In still another embodiment, for example, the pet is overweight, and the user may periodically start the alarm to make the pet move. Alternatively, the pet collar may further send the acquired pet movement acceleration data to the mobile phone by using a terminal communications module. A pedometer application on the mobile phone computes and keeps a step count of the pet within a period of time. If the step count of the pet is relatively low, the user may send a movement instruction to the pet collar. The pet collar outputs a sound-light alarm signal or gives the pet an electric shock according to the movement instruction to make the pet move, so as to keep the pet from getting excessively fat due to the lack of exercise.

In this embodiment, the pet movement boundary region is set on the mobile phone, and then the set boundary information is sent to the pet collar for storage. In another embodiment, the pet movement boundary region may be directly set on the pet collar. The pet collar then sends the set boundary information to the mobile phone to make it convenient for the user to use the mobile phone to perform monitoring. Specifically, a boundary definition apparatus is disposed on the pet collar. The boundary definition apparatus is connected to an electronic device including an electronic map in the pet collar. The boundary definition apparatus may be a button or a touch display screen. For example, the boundary definition apparatus is a button. When defining the pet movement boundary region, the user carries the pet collar and walks to a boundary of a region, and presses the button, so that the electronic device records a starting position of the boundary. The user continues to walk along the boundary. When reaching an end point of the boundary, the user presses the button again, so that the electronic device records an end point position of the boundary. The electronic device records a path covered by the user as the boundary of the region, generates boundary coordinate information, and sends the boundary coordinate information to the mobile phone. Further, a quantity of times of pressing the button may further be preset to distinguish whether a defined boundary region is the pet movement region or a pet movement prohibition region. For example, if the button is pressed once at a starting position and once at an end position of the boundary of the region, it is defined that the region in the boundary is the pet movement region. If the button is continuously pressed twice at a starting position and twice at an end position of the boundary of the region, the region in the defined boundary is the pet movement prohibition region. In another embodiment, a specific region distinguishing rule may be set according to an actual requirement. In this embodiment, a quantity of times of pressing the button used to distinguish a region is only an example. This is not specifically limited. In this embodiment, when the pet movement boundary region is directly defined on the pet collar, it can be ensured that the pet collar can be normally used when a fault occurs in communication between the pet collar and the mobile phone, thereby further facilitating use by the user.

The technical features in the foregoing embodiments may be randomly combined. For simplicity of description, all possible combinations of the technical features in the foregoing embodiments are not described. However, it should be considered that these combinations of technical features fall within the scope recorded in the specification provided that these combinations of technical features do not have any conflict.

The foregoing embodiments only describe several implementations of the present invention, and their description is specific and detailed, but cannot therefore be understood as a limitation to the patent scope of the present invention. It should be noted that a person of ordinary skill in the art may further make variations and improvements without departing from the conception of the present invention, and these all fall within the protection scope of the present invention. Therefore, the patent protection scope of the present invention should be subject to the appended claims.

What is claimed is:

1. A pet collar system comprising:
  a base station in communication with an autonomous lawn mower;
  a collar body configured to be worn by a pet, the collar body being in communication with the base station; and
  a training apparatus disposed on the collar body, the training apparatus including:
    a mobile satellite antenna;
    a training apparatus communications module;
    a microprocessor; and
    an alarm,
  wherein the mobile satellite antenna is configured to:
    receive collar positioning data observed by a satellite positioning system; and
    send the received collar positioning data to the microprocessor;
  wherein the microprocessor is configured to:
    store a pet movement boundary region, the pet movement boundary region being based on at least part of a map boundary region learned by the autonomous lawn mower;
    perform positioning correction processing according to the collar positioning data;
    determine whether a distance between a pet and the pet movement boundary region is less than or equal to a preset distance threshold; and
    when the distance between the pet and the pet movement boundary region is less than or equal to the preset distance threshold, send an alarm signal to the alarm; and
  wherein the alarm is configured to output alarm information according to the alarm signal.

2. The pet collar system of claim 1, wherein the base station is configured to:
  store base station coordinate information;
  receive base station positioning data observed by the satellite positioning system;
  compute a differential observation value according to the base station coordinate information and the base station positioning data;
  obtain a positioning error correction value; and
  send the positioning error correction value to the training apparatus via a base station communications module;
  wherein the training apparatus communications module is configured to:
    receive the positioning error correction value sent by the base station; and
    send the received positioning error correction value to the microprocessor, and
  wherein the microprocessor is further configured to perform further positioning correction processing according to the positioning error correction value.

3. The pet collar system of claim 2, wherein the microprocessor further comprises:
  a storage unit configured to store the pet movement boundary region;
  a positioning correction unit configured to perform positioning correction processing according to the collar positioning data and the positioning error correction value, to obtain current pet position coordinate information;
  a position determining unit configured to:
    compute the distance between the pet and the pet movement boundary region according to the current pet position coordinate information, and
    determine whether the distance between the pet and the pet movement boundary region is less than or equal to the preset distance threshold; and
  an alarm unit configured to output an alarm signal to the alarm when the distance between the pet and the pet movement boundary region is less than or equal to the preset distance threshold.

4. The pet collar system of claim 1, wherein the pet collar system further includes an acceleration sensor, the acceleration sensor is disposed on the collar body, the acceleration sensor is connected to the microprocessor, and the acceleration sensor is configured to acquire pet movement acceleration, and send the acquired pet movement acceleration to the microprocessor.

5. The pet collar system of claim 4, wherein the microprocessor further comprises: a power management unit,
  wherein the power management unit is configured to:
    receive the pet movement acceleration, and
    compare the pet movement acceleration with a prestored acceleration threshold,
  wherein when the pet movement acceleration is less than or equal to the prestored acceleration threshold, a sleep mode is started to enable the microprocessor to enter a sleep state, and
  wherein when the pet movement acceleration is greater than the prestored acceleration threshold, the microprocessor wakes up from sleep mode.

6. The pet collar system of claim 1, wherein the pet collar system further includes a terminal communications module,
the microprocessor exchanges information with a remote terminal by using the terminal communications module, and
the remote terminal includes one or more of a mobile phone, a tablet, and a computer.

7. The pet collar system of claim 2, wherein the pet movement boundary region is the map boundary region learned by the autonomous lawn mower.

8. The pet collar system of claim 1, wherein the pet movement boundary region is adjustable, by a user, from the map boundary region learned by the autonomous lawn mower.

9. The pet collar system of claim 2, wherein the pet movement boundary region is stored in advance.

10. A pet collar control method for restricting a pet to a pet movement boundary region, the pet collar control method comprising:
receiving collar positioning data observed by a satellite positioning system;
performing positioning correction processing according to the collar positioning data, to obtain current pet position coordinate information;
computing a distance between the pet and a preset pet movement boundary region according to the current pet position coordinate information, the preset pet movement boundary region being based on at least part of a map boundary region learned by an autonomous lawn mower;
determining that the distance between the pet and the preset pet movement boundary region is less than or equal to a preset distance threshold; and
in response to determining that the distance between the pet and the preset pet movement boundary region is less than or equal to the preset distance threshold, outputting an alarm signal.

11. The pet collar control method of claim 10, further comprising:
receiving a positioning error correction value sent by a base station; and
performing further positioning correction processing according to the positioning error correction value.

12. The pet collar control method of claim 11, wherein before the receiving the collar positioning data observed by the satellite positioning system, and the receiving the positioning error correction value sent by the base station, the pet collar control method further comprises:
receiving, by the base station, base station positioning data observed by the satellite positioning system;
computing a differential observation value according to the base station positioning data and prestored base station coordinate information; and
obtaining the positioning error correction value.

13. The pet collar control method of claim 10, wherein the pet collar control method further comprises:
detecting a pet movement acceleration;
comparing the pet movement acceleration with a prestored acceleration threshold; and
in response to determining that the pet movement acceleration is less than or equal to the prestored acceleration threshold, starting a sleep mode to enable a microprocessor to enter a sleep state; or
in response to determining that the pet movement acceleration is greater than the prestored acceleration threshold, waking up the microprocessor from sleep mode.

14. The pet collar control method of claim 10, wherein the preset pet movement boundary region is the map boundary region learned by the autonomous lawn mower.

15. The pet collar control method of claim 14, wherein the preset pet movement boundary region is adjustable, by a user, from the map boundary region learned by the autonomous lawn mower.

16. The pet collar control method of claim 11, wherein before the receiving the collar positioning data observed by the satellite positioning system, and the receiving the positioning error correction value sent by the base station, the pet collar control method further comprises receiving the preset pet movement boundary region sent by a remote terminal for storage, wherein the remote terminal includes one or more of a mobile phone, a tablet, and a computer.

17. The pet collar control method of claim 16, wherein a pet collar establishes a communication connection with the remote terminal via a network, and the pet collar control method further comprises:
sending, by the pet collar, the current pet position coordinate information to the remote terminal in real time, and when the distance between the pet and the preset pet movement boundary region is less than or equal to the preset distance threshold, sending, by the pet collar, the alarm signal to the remote terminal; and
receiving, by the remote terminal, the current pet position coordinate information and the alarm signal, and outputting, by the remote terminal, a control instruction to the pet collar according to the current pet position coordinate information or the alarm signal.

18. A method comprising:
receiving collar positioning data observed by a satellite positioning system;
performing positioning correction processing according to the collar positioning data to obtain current pet position coordinate information;
determining a preset pet movement boundary region based on at least part of a map boundary region learned by an autonomous lawn mower;
computing a distance between a pet and the preset pet movement boundary region according to the current pet position coordinate information; and
determining that the distance between the pet and the preset pet movement boundary region is less than or equal to a preset distance threshold.

19. The method of claim 18, further comprising:
in response to determining that the distance between the pet and the preset pet movement boundary region is less than or equal to the preset distance threshold, outputting an alarm signal.

20. The method of claim 18, wherein the preset pet movement boundary region is adjustable from the map boundary region learned by the autonomous lawn mower.

* * * * *